(12) United States Patent
Huntley

(10) Patent No.: US 7,133,401 B2
(45) Date of Patent: Nov. 7, 2006

(54) VIDEO OPTICAL MULTIPLEXER

(75) Inventor: Chris Huntley, West Vancouver (CA)

(73) Assignee: General Electric Company, Schenectady, NY (US)

( * ) Notice: Subject to any disclaimer, the term of this patent is extended or adjusted under 35 U.S.C. 154(b) by 738 days.

(21) Appl. No.: 09/968,059

(22) Filed: Oct. 1, 2001

(65) Prior Publication Data

US 2003/0095210 A1 May 22, 2003

(51) Int. Cl.
- *H04L 12/28* (2006.01)
- *H04J 14/00* (2006.01)
- *H04N 7/173* (2006.01)
- *H04N 7/16* (2006.01)

(52) U.S. Cl. .................... 370/389; 725/86; 725/149
(58) Field of Classification Search ............... None
See application file for complete search history.

(56) References Cited

U.S. PATENT DOCUMENTS

| | | | | |
|---|---|---|---|---|
| 4,831,616 A | * | 5/1989 | Huber ................... 398/100 |
| 5,111,323 A | * | 5/1992 | Tanaka et al. ............. 398/52 |
| 5,227,863 A | * | 7/1993 | Bilbrey et al. ............ 348/578 |
| 5,361,250 A | * | 11/1994 | Nguyen et al. ............ 370/222 |
| 5,684,799 A | * | 11/1997 | Bigham et al. ............ 370/397 |
| 5,720,031 A | * | 2/1998 | Lindsay ................... 714/42 |
| 5,805,682 A | * | 9/1998 | Voit et al. .............. 379/142.16 |
| 6,012,101 A | * | 1/2000 | Heller et al. ............. 709/250 |
| 6,252,886 B1 | * | 6/2001 | Schwager et al. ......... 370/443 |
| 6,272,658 B1 | * | 8/2001 | Steele et al. ............. 714/752 |
| 6,320,588 B1 | | 11/2001 | Palmer et al. |
| 6,348,604 B1 | | 2/2002 | Nelson et al. |
| 6,466,343 B1 | * | 10/2002 | Lahat et al. .............. 398/82 |
| 6,674,744 B1 | * | 1/2004 | Doshi et al. ............. 370/352 |
| 6,795,506 B1 | * | 9/2004 | Zhang et al. .......... 375/240.26 |

* cited by examiner

*Primary Examiner*—Chau Nguyen
*Assistant Examiner*—Cynthia L. Davis
(74) *Attorney, Agent, or Firm*—Rodney M. Young, Esq.; Armstrong Teasdale LLP

(57) ABSTRACT

An optical multiplexer is provided that operates in a synchronous optical network (SONET). The multiplexer includes a plurality of inputs and a processor operationally coupled to the inputs. The multiplexer also includes a plurality of optical outputs coupled to the inputs via the processor, wherein the processor is configured to receive data from at least two of the plurality of inputs. The processor is also configured to packetize the received data and route the packetized data to at least two of the plurality of optical outputs.

51 Claims, 79 Drawing Sheets

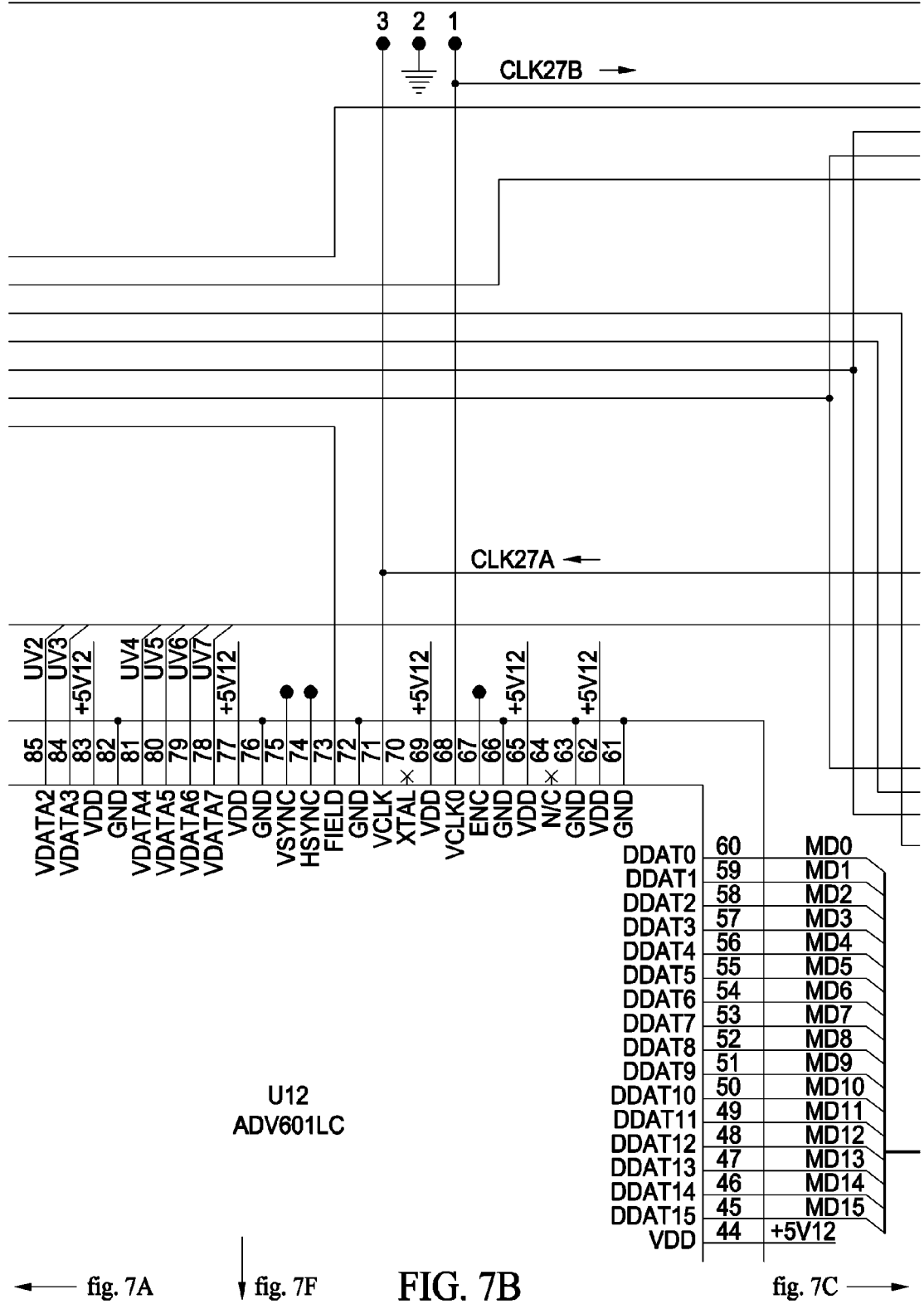

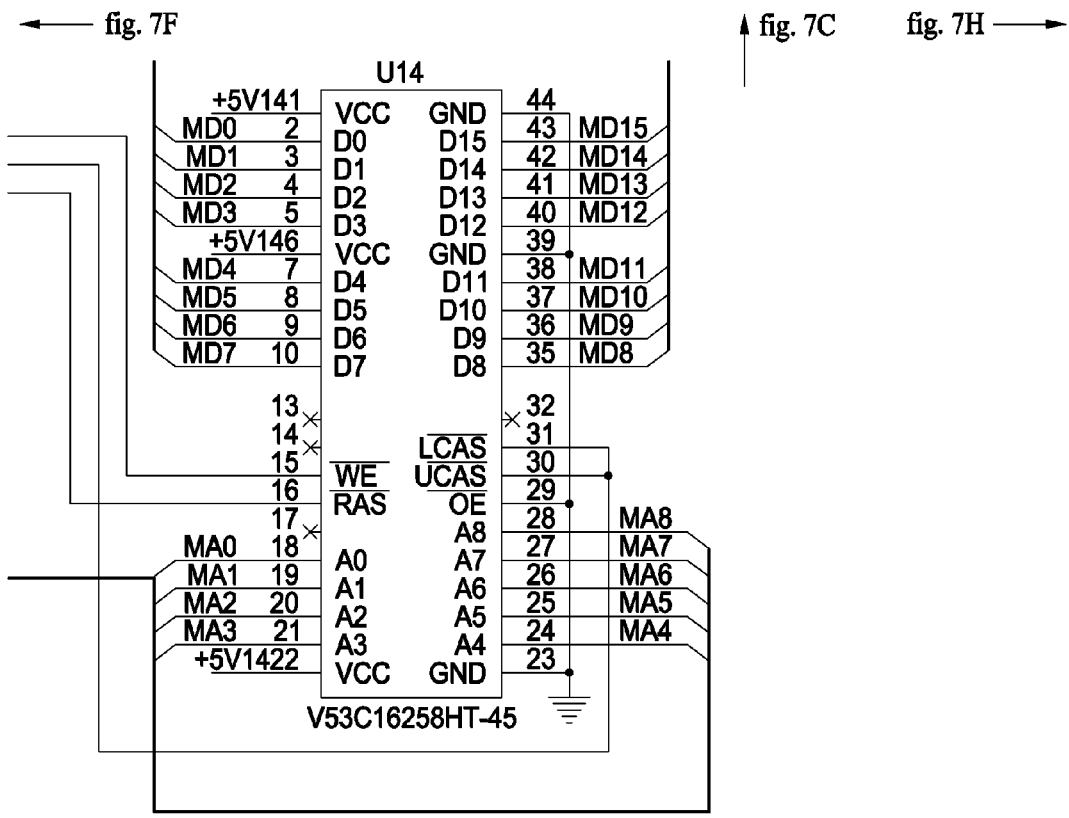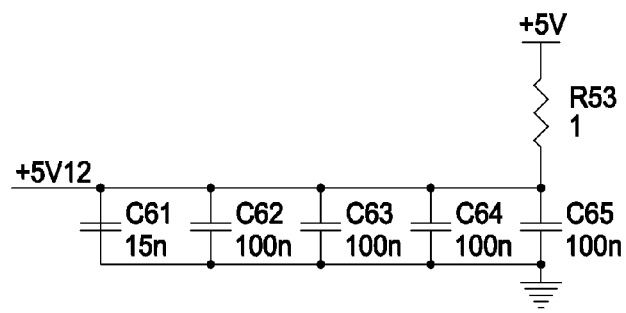
FIG. 7G

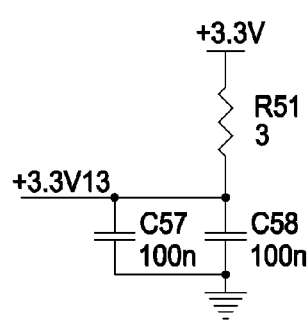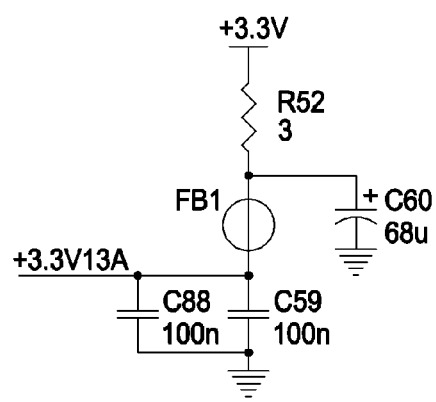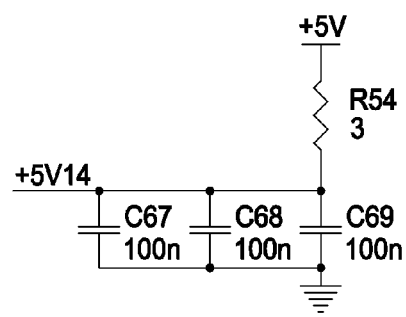
FIG. 7H

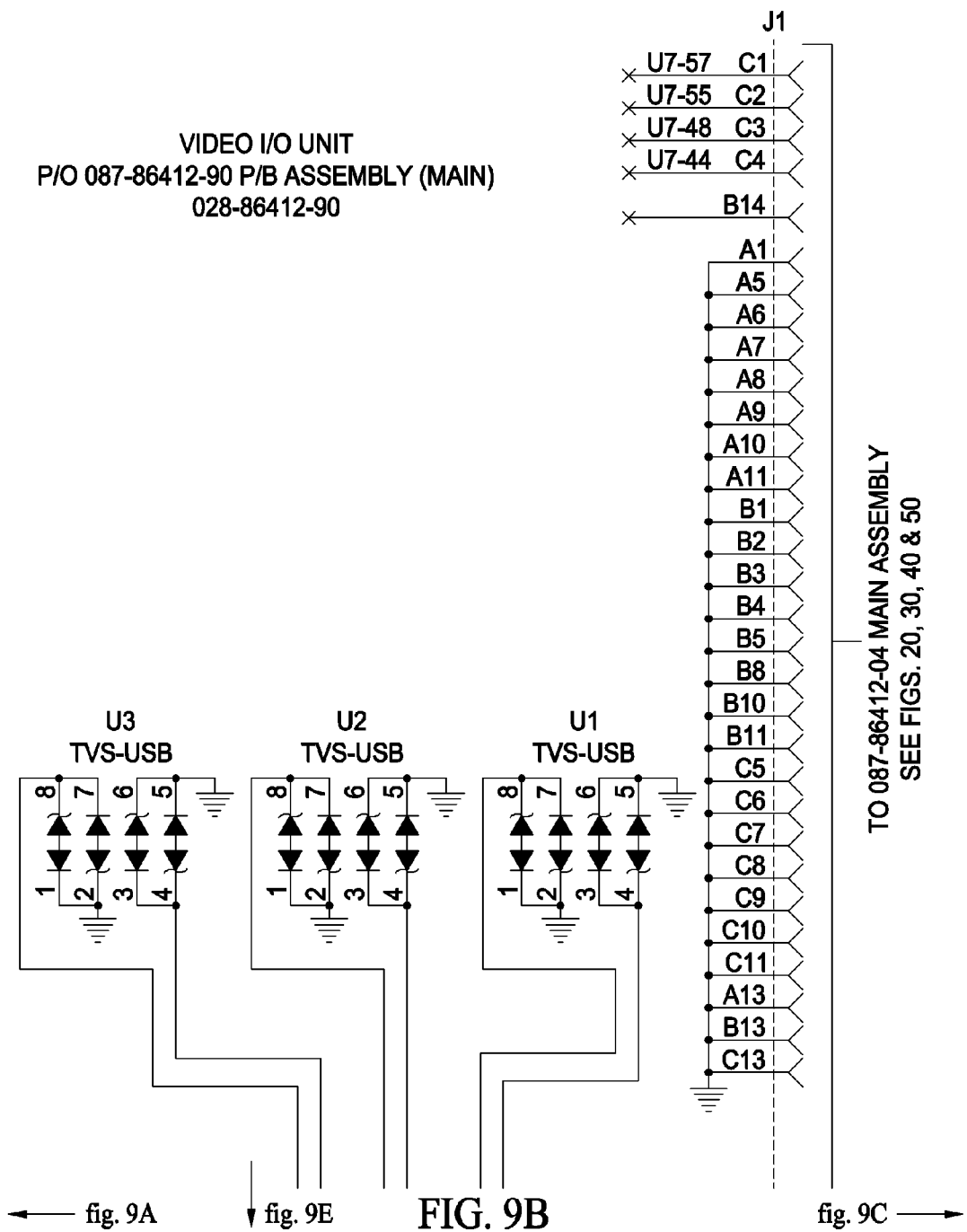

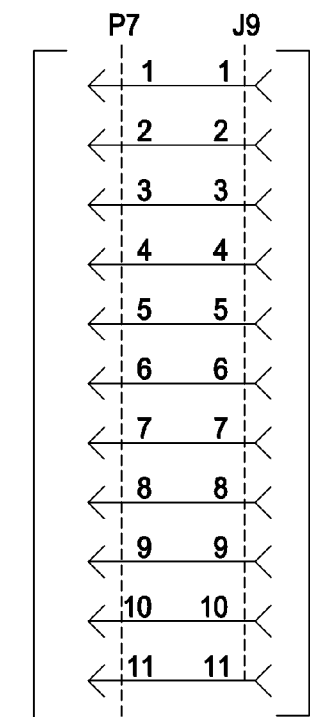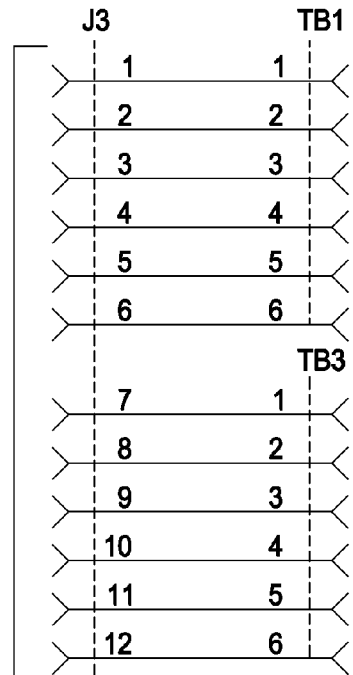
FIG. 9C

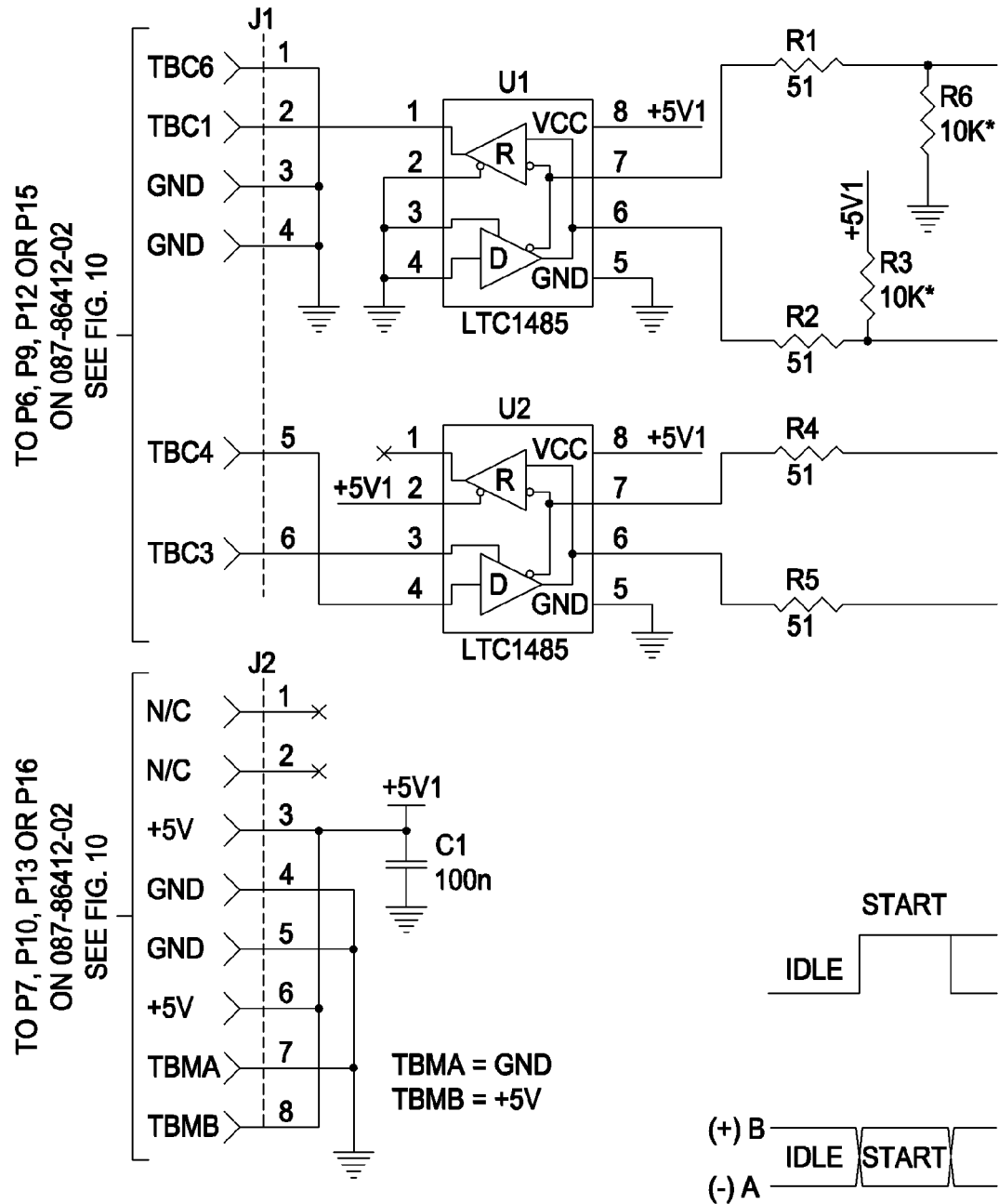
FIG. 11A    fig. 11B →

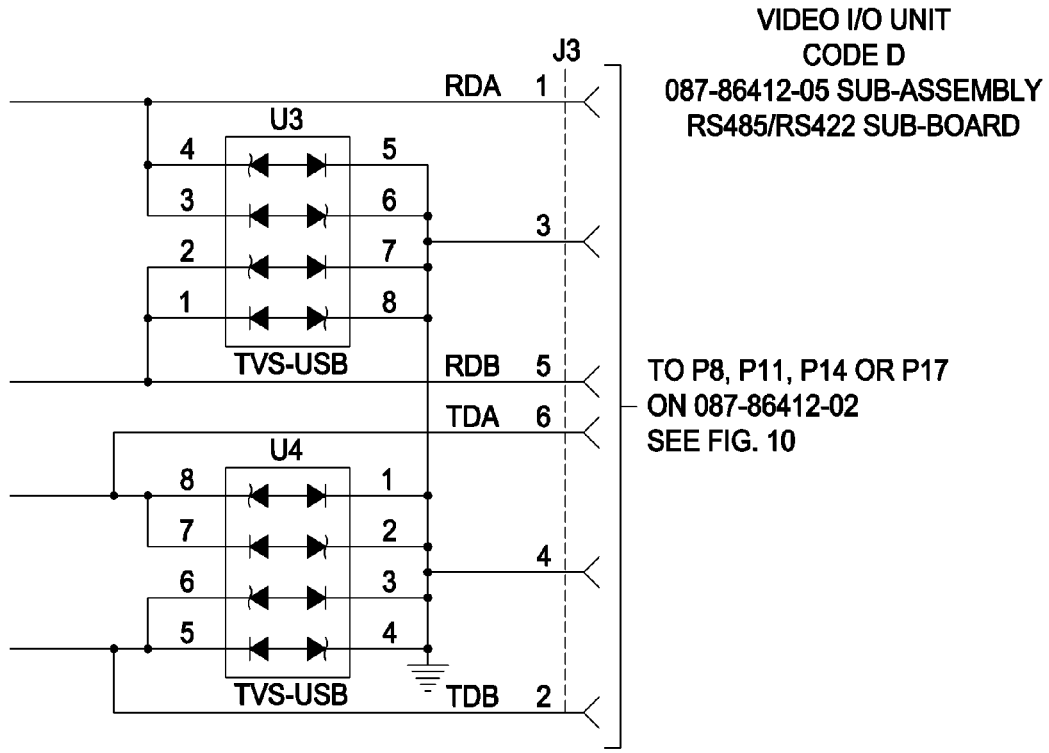
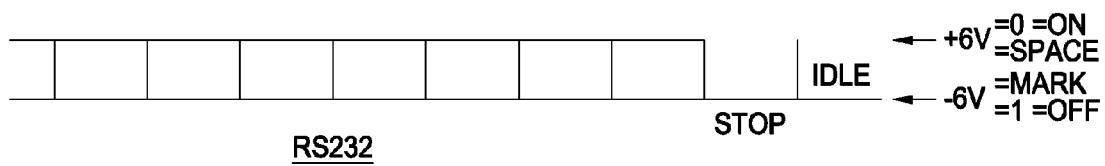
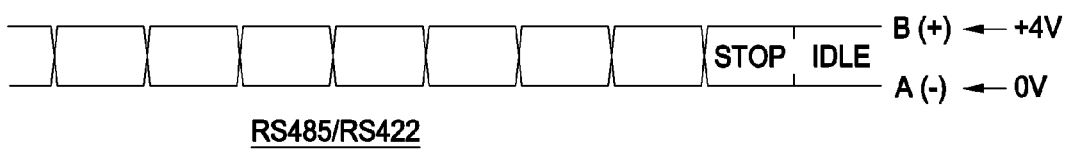
← fig. 11A          FIG. 11B          fig. 11C →

TABLE E
CODE D CONNECTIONS TO PADDLEBOARD

| SUB-BOARD POSITION | J3 PIN ON 087-86412-05 (FIG. 80) | PIN ON 087-86412-02 (SEE FIG. 60) | PIN ON 087-86412-92 P/B (SEE FIG. 102) | PIN ON 087-86412-72 P/B (J7) (SEE EAS-86412-7X) | SIGNAL NAME |
|---|---|---|---|---|---|
| 1 | 6 | P14-6 | TB1-1 | 22 | DATA OUT A (-) |
| | 4 | P14-4 | TB1-2 | 14 | GND(NOT USED) |
| | 2 | P14-2 | TB1-3 | 5 | DATA OUT B (+) |
| | 1 | P14-1 | TB1-4 | 21 | DATA IN A (-) |
| | 3 | P14-3 | TB1-5 | 13 | GND(NOT USED) |
| | 5 | P14-5 | TB1-6 | 4 | DATA IN B (+) |
| 2 | 6 | P11-6 | TB2-1 | 26 | DATA OUT A (-) |
| | 4 | P11-4 | TB2-2 | 18 | GND(NOT USED) |
| | 2 | P11-2 | TB2-3 | 9 | DATA OUT B (+) |
| | 1 | P11-1 | TB2-4 | 24 | DATA IN A (-) |
| | 3 | P11-3 | TB2-5 | 16 | GND(NOT USED) |
| | 5 | P11-5 | TB2-6 | 7 | DATA IN B (+) |
| 3 | 6 | P8-6 | TB3-1 | 19 | DATA OUT A (-) |
| | 4 | P8-4 | TB3-2 | 11 | GND(NOT USED) |
| | 2 | P8-2 | TB3-3 | 2 | DATA OUT B (+) |
| | 1 | P8-1 | TB3-4 | 20 | DATA IN A (-) |
| | 3 | P8-3 | TB3-5 | 12 | GND(NOT USED) |
| | 5 | P8-5 | TB3-6 | 3 | DATA IN B (+) |
| 4 | 6 | P17-6 | TB4-1 | 25 | DATA OUT A (-) |
| | 4 | P17-4 | TB4-2 | 17 | GND(NOT USED) |
| | 2 | P17-2 | TB4-3 | 8 | DATA OUT B (+) |
| | 1 | P17-1 | TB4-4 | 23 | DATA IN A (-) |
| | 3 | P17-3 | TB4-5 | 15 | GND(NOT USED) |
| | 5 | P17-5 | TB4-6 | 6 | DATA IN B (+) |

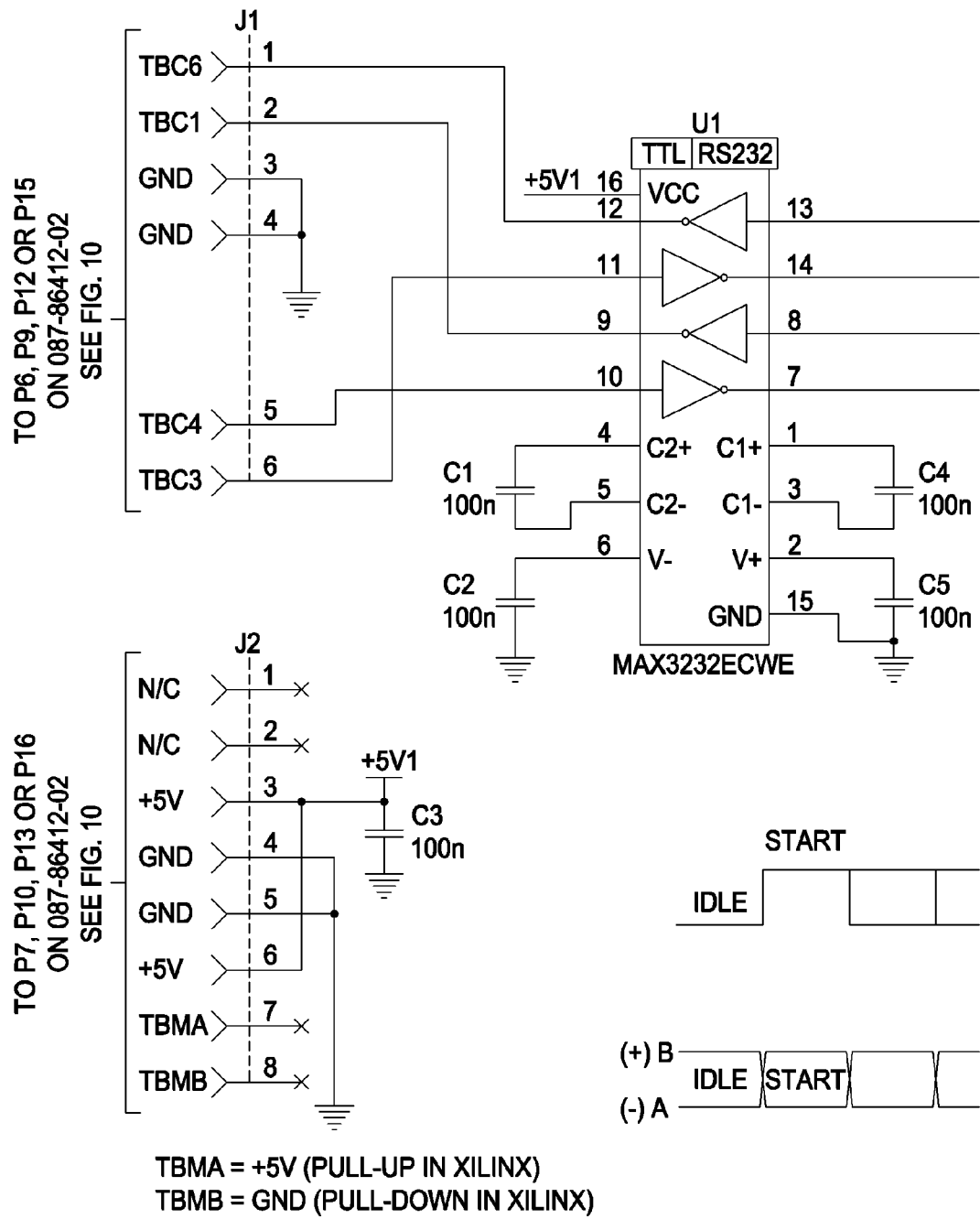
FIG. 12A                    fig. 12B →

TABLE F
CODE F CONNECTIONS TO PADDLEBOARD

| SUB-BOARD POSITION | J3 PIN ON 087-86412-06 (FIG. 90) | PIN ON 087-86412-02 (SEE FIG. 60) | PIN ON 087-86412-92 P/B (SEE FIG. 102) | PIN ON 087-86412-72 P/B (J7) (SEE EAS-86412-7X) | SIGNAL NAME |
|---|---|---|---|---|---|
| 1 | 6 | P14-6 | TB1-1 | 22 | CTS (OUT) |
|   | 4 | P14-4 | TB1-2 | 14 | GND |
|   | 2 | P14-2 | TB1-3 | 5  | RD (DATA-OUT) |
|   | 1 | P14-1 | TB1-4 | 21 | RTS (IN) |
|   | 3 | P14-3 | TB1-5 | 13 | GND |
|   | 5 | P14-5 | TB1-6 | 4  | TD (DATA-IN) |
| 2 | 6 | P11-6 | TB2-1 | 26 | CTS (OUT) |
|   | 4 | P11-4 | TB2-2 | 18 | GND |
|   | 2 | P11-2 | TB2-3 | 9  | RD (DATA-OUT) |
|   | 1 | P11-1 | TB2-4 | 24 | RTS (IN) |
|   | 3 | P11-3 | TB2-5 | 16 | GND |
|   | 5 | P11-5 | TB2-6 | 7  | TD (DATA-IN) |
| 3 | 6 | P8-6 | TB3-1 | 19 | CTS (OUT) |
|   | 4 | P8-4 | TB3-2 | 11 | GND |
|   | 2 | P8-2 | TB3-3 | 2  | RD (DATA-OUT) |
|   | 1 | P8-1 | TB3-4 | 20 | RTS (IN) |
|   | 3 | P8-3 | TB3-5 | 12 | GND |
|   | 5 | P8-5 | TB3-6 | 3  | TD (DATA-IN) |
| 4 | 6 | P17-6 | TB4-1 | 25 | CTS (OUT) |
|   | 4 | P17-4 | TB4-2 | 17 | GND |
|   | 2 | P17-2 | TB4-3 | 8  | RD (DATA-OUT) |
|   | 1 | P17-1 | TB4-4 | 23 | RTS (IN) |
|   | 3 | P17-3 | TB4-5 | 15 | GND |
|   | 5 | P17-5 | TB4-6 | 6  | TD (DATA-IN) | fig. 12B  FIG. 12C

← fig. 13A

TABLE D
CODE C CONNECTIONS TO PADDLEBOARD

| SUB-BOARD POSITION | J3 PIN (AS OUTPUT) (FIG. 70) | J1 PIN (AS INPUT) (FIG. 71) | PIN ON 087-86412-02 (SEE FIG. 60) | PIN ON 087-86412-92 P/B (SEE FIG. 102) | PIN ON 087-86412-72 P/B (J7) (SEE EAS-86412-7X) | SIGNAL NAME |
|---|---|---|---|---|---|---|
| 1 | 6 | 1 | P14-6 | TB1-1 | 22 | CCT#1 |
| 1 | 4 | 3 | P14-4 | TB1-2 | 14 | CCT#1/2COM |
| 1 | 2 | 5 | P14-2 | TB1-3 | 5 | CCT#2 |
| 1 | 1 | 6 | P14-1 | TB1-4 | 21 | CCT#3 |
| 1 | 3 | 4 | P14-3 | TB1-5 | 13 | CCT#3/4COM |
| 1 | 5 | 2 | P14-5 | TB1-6 | 4 | CCT#4 |
| 2 | 6 | 1 | P11-6 | TB2-1 | 26 | CCT#5 |
| 2 | 4 | 3 | P11-4 | TB2-2 | 18 | CCT#5/6COM |
| 2 | 2 | 5 | P11-2 | TB2-3 | 9 | CCT#6 |
| 2 | 1 | 6 | P11-1 | TB2-4 | 24 | CCT#7 |
| 2 | 3 | 4 | P11-3 | TB2-5 | 16 | CCT#7/8COM |
| 2 | 5 | 2 | P11-5 | TB2-6 | 7 | CCT#8 |
| 3 | 6 | 1 | P8-6 | TB3-1 | 19 | CCT#9 |
| 3 | 4 | 3 | P8-4 | TB3-2 | 11 | CCT#9/10COM |
| 3 | 2 | 5 | P8-2 | TB3-3 | 2 | CCT#10 |
| 3 | 1 | 6 | P8-1 | TB3-4 | 20 | CCT#11 |
| 3 | 3 | 4 | P8-3 | TB3-5 | 12 | CCT#11/12COM |
| 3 | 5 | 2 | P8-5 | TB3-6 | 3 | CCT#12 |
| 4 | 6 | 1 | P17-6 | TB4-1 | 25 | CCT#13 |
| 4 | 4 | 3 | P17-4 | TB4-2 | 17 | CCT#13/14COM |
| 4 | 2 | 5 | P17-2 | TB4-3 | 8 | CCT#14 |
| 4 | 1 | 6 | P17-1 | TB4-4 | 23 | CCT#15 |
| 4 | 3 | 4 | P17-3 | TB4-5 | 15 | CCT#15/16COM |
| 4 | 5 | 2 | P17-5 | TB4-6 | 6 | CCT#16 |

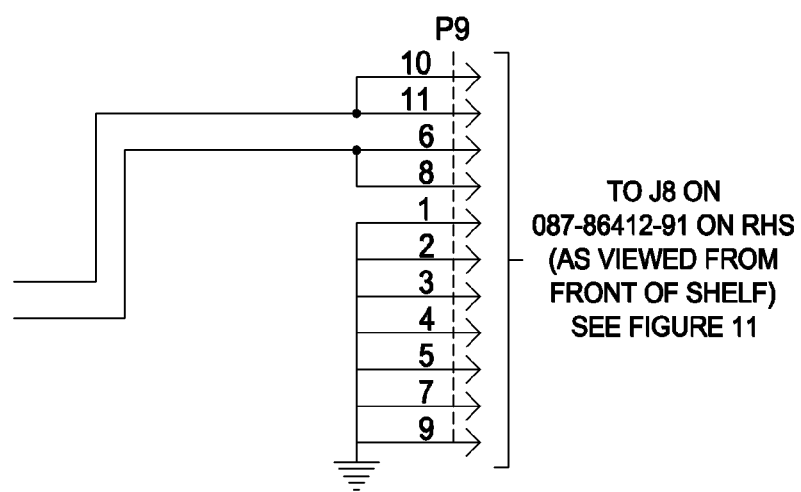
← fig. 14B      FIG. 14C

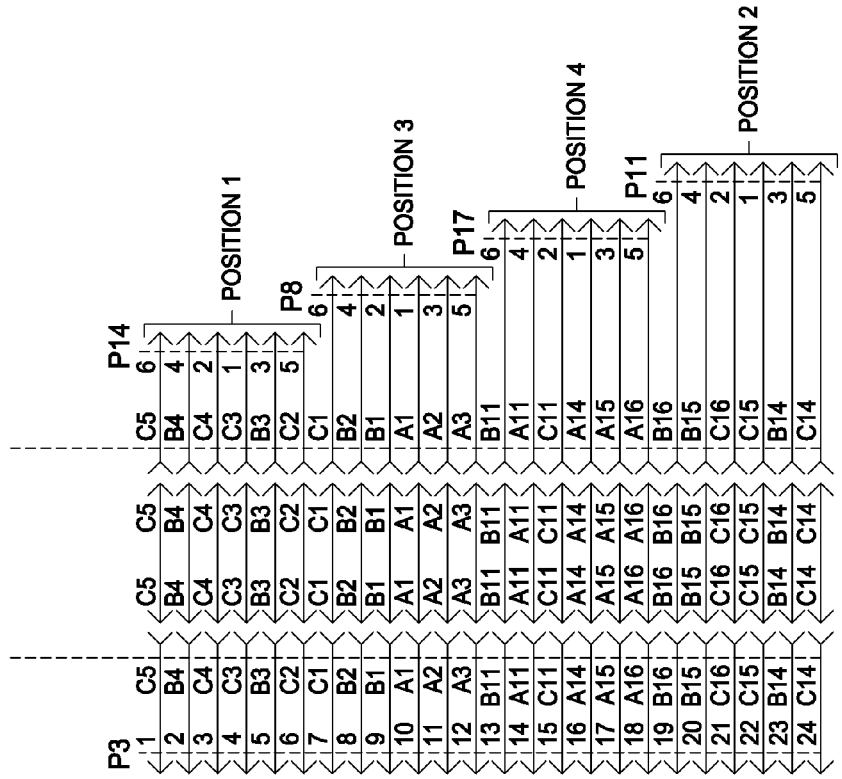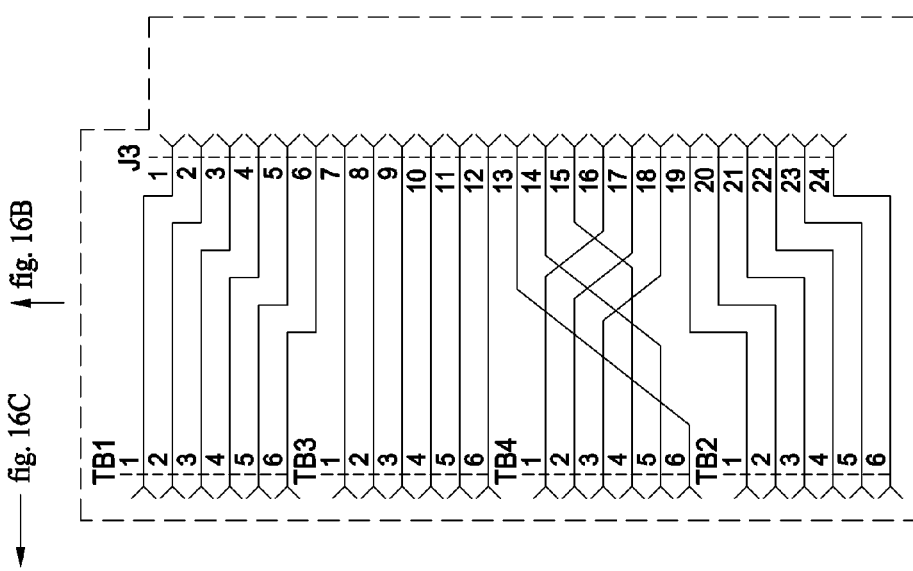
FIG. 16D

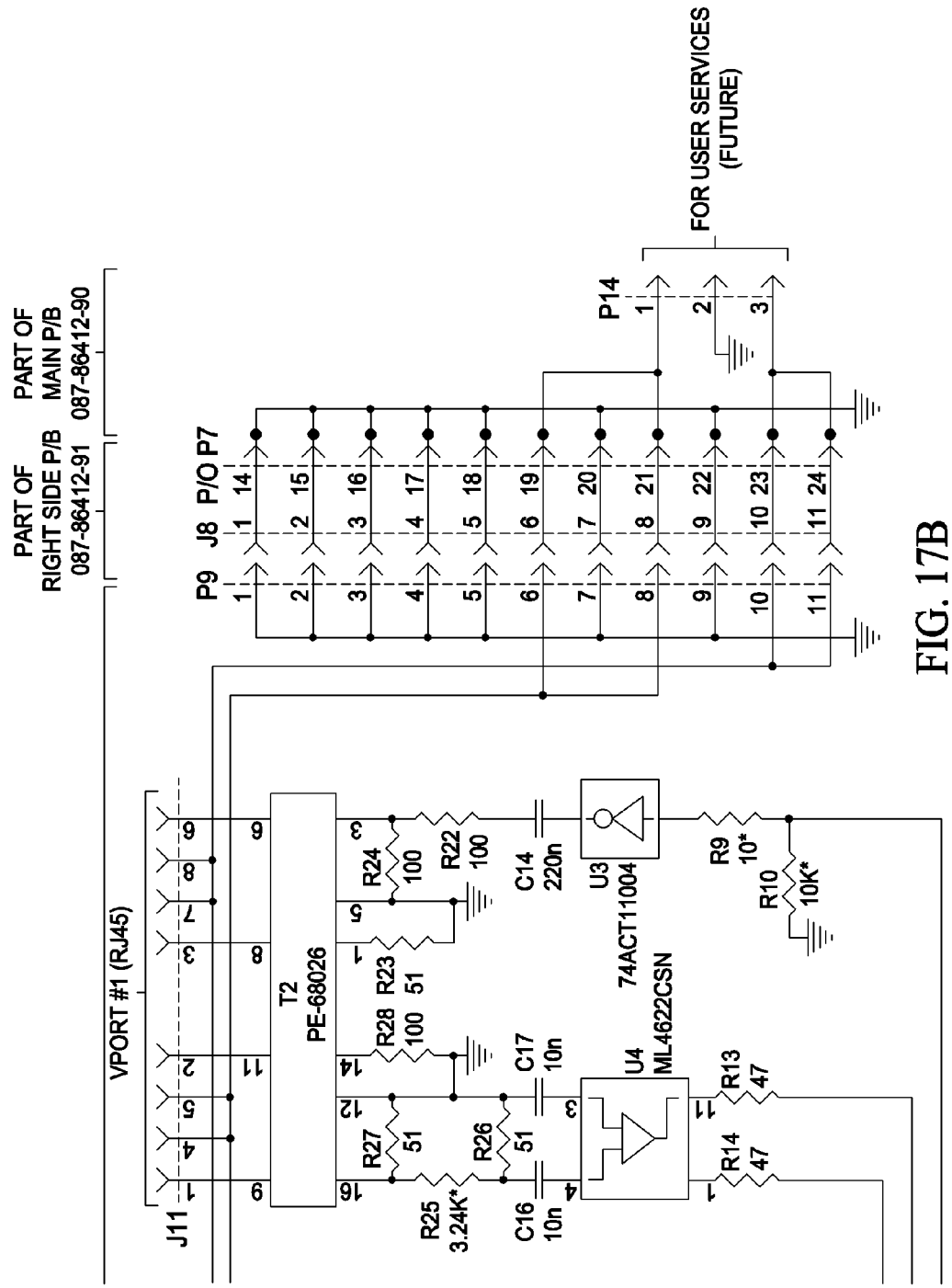

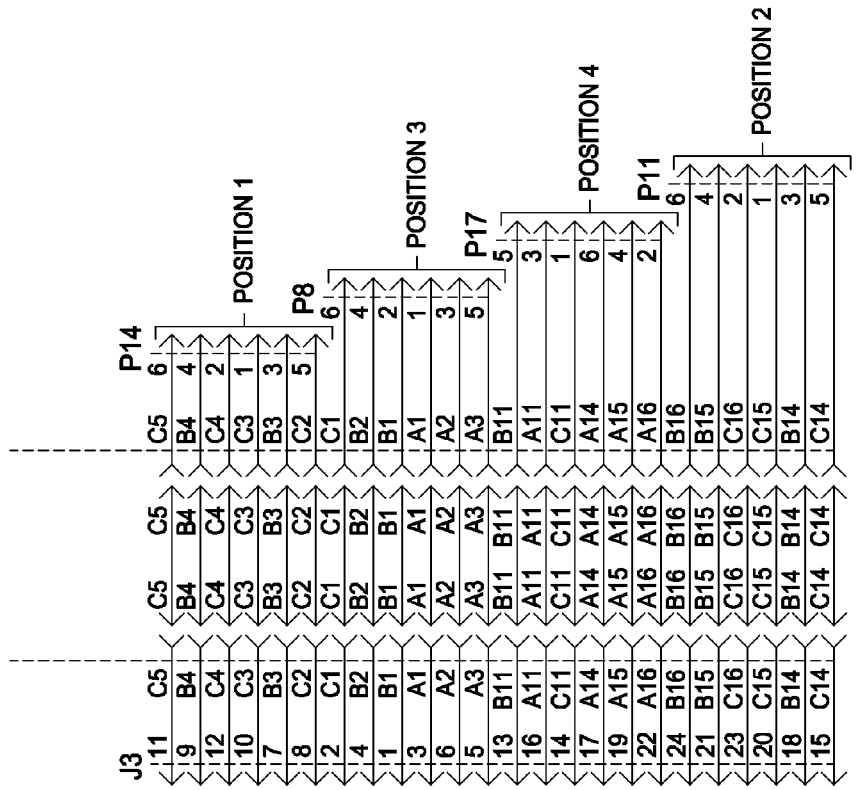
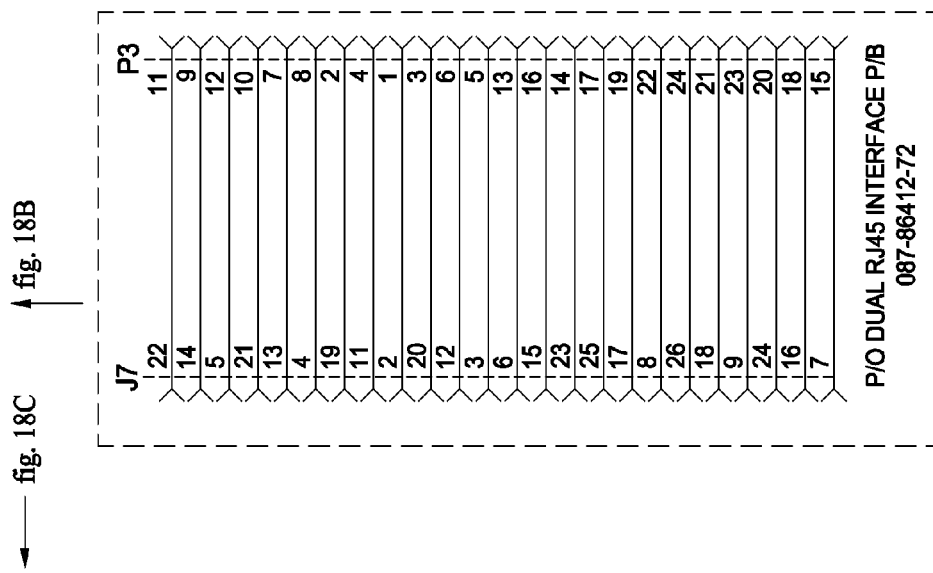
FIG. 18D

TABLE A  [1]

| OPTION | DESCRIPTION | FIG. |
|---|---|---|
| 86412-01 | PROVIDES ENCODING OR DECODING FUNCTIONS FOR THE TRANSMISSION OF ONE VIDEO SIGNAL THROUGH A JUNGLEMUX/TN-1U/TN-1UC SYSTEM. MUST BE USED WITH EITHER 86412-90/A/B PADDLEBOARD (IN JUNGLEMUX/TN--1UC SYSTEM) OR 86412-73 PADDLE-BOARD (IN TN-1U SYSTEM). (FOR 86412-73 DRAWINGS REFER TO EAS-86412-7X.) | 1, 20, 30, 40, 50 |
| 86412-02 | PROVIDES THE ABOVE PLUS TWO AUDIO AND TWO RS232 DATA CHANNELS. | 1, 20, 30, 40, 50, 60 |
| 86412-02/4C SEE NOTE 8 | AS - 02 BUT SUPPLIED WITH 4 CONTACT I/O SUB-BOARDS (FOUR CODE C). | 1, 5, 6, 20, 30, 40, 50, 60, 70 |
| 86412-02/2C/2D SEE NOTE 8 | AS - 02 BUT SUPPLIED WITH 2 CONTACT I/O SUB-BOARDS (TWO CODE C) AND 2 RS485/RS422 SUB-BOARDS (TWO CODE D). | 1, 5, 6, 7, 20, 30, 40, 50, 60, 70, 80 |
| 86412-02/4D SEE NOTE 8 | AS - 02 BUT SUPPLIED WITH 4 RS485/RS422 SUB-BOARDS (FOUR CODE D). | 1, 7, 20, 30, 40, 50, 60, 80 |
| 86412-02/2C/2F SEE NOTE 8 | AS - 02 BUT SUPPLIED WITH 2 CONTACT I/O SUB-BOARDS (TWO CODE C) AND 2 RS232 SUB-BOARDS (TWO CODE F). | 1, 8, 20, 30, 40, 50, 60, 70, 71, 90 |
| 86412-02/2D/2F SEE NOTE 8 | AS - 02 BUT SUPPLIED WITH 2 RS485/RS422 SUB-BOARDS (TWO CODE D) AND 2 RS232 SUB-BOARDS (TWO CODE F). | 1, 8, 20, 30, 40, 50, 60, 80, 90 |
| 86412-02/4F SEE NOTE 8 | AS - 02 BUT SUPPLIED WITH 4 RS232 SUB-BOARDS (FOUR CODE F). | 1, 8, 20, 30, 40, 50, 60, 90 |
| 86412-02/2C/D/F SEE NOTE 8 | AS - 02 BUT SUPPLIED WITH 2 CONTACT I/O SUB-BOARDS (TWO CODE C), 1 RS485/RS422 SUB-BOARD (ONE CODE D), AND 1 RS232 SUB-BOARD (ONE CODE F). | 1, 8, 20, 30, 40, 50, 70, 71, 80, 90 |
| 86412-90/A/B | MAIN PADDLEBOARD ASSEMBLY SUPPLIED WITH 1 CODE A MOUNTED IN THE LOWER POSITION & 1 CODE B MOUNTED IN THE UPPER POSITION. CODE A PROVIDES A DUAL RJ45 INTERFACE AND CODE B PROVIDES A DUAL BNC AND DUAL Y/C INTERFACE TO THE VIDEO I/O UNIT. ONE REQUIRED FOR EACH 86412-0X UNIT IN A JUNGLEMUX OR TN-1UC SYSTEM. | 2, 3, 4, 100, 101, 102, 110, 120 |

FIG. 20A

NOTES :
1. EQUIPMENT
   EQUIPMENT FURNISHED PER TABLES A & C.
2. RESISTORS
   ALL RESISTANCE VALUES ARE SHOWN IN OHMS. THE SUFFIX 'K' (KILO) DENOTES THOUSANDS. ALL RESISTORS ARE 1/8W 5% UNLESS NOTED BY A "*", IN WHICH CASE THEY ARE 1/8W 1%.
3. CAPACITORS
   ALL CAPACITANCE VALUES ARE SHOWN IN MICROFARADS UNLESS OTHERWISE NOTED. SUFFIXES 'n' AND 'p' DENOTE NANOFARADS AND PICOFARADS RESPECTIVELY. CAPACITORS NOTED WITH A "*" ARE 1% TOLERANCE.
4. INDUCTORS
   ALL INDUCTANCE VALUES ARE SHOWN IN HENRIES UNLESS OTHERWISE NOTED. SUFFIXES 'u' AND 'm' DENOTE MICROHENRIES AND MILLIHENRIES RESPECTIVELY.
5. WARRANTY MARKING
   THE WARRANTY MARKING NORMALLY APPEARS ON THE SIDE OF THE SHIELD AND REFERS TO THE START AND END OF THE WARRANTY PERIOD. EG WRNTY 8-97 TO 8-99 REFERS TO THE WARRANTY PERIOD FROM AUG. 1997 TO THE END OF AUG. 1999.
6. ISSUE NUMBER
   ISSUE NUMBER MARKED ON THE EQUIPMENT AGREES WITH THE EAS DRAWING ISSUE NUMBER AT THE TIME OF MANUFACTURE.
7. FUNCTIONAL MARKING
   INFORMATION IN A RECTANGULAR BOX REPRESENTS FUNCTIONAL MARKING ON THE EQUIPMENT.
8. PLACEMENT OF CODES ON -02 OPTION
   ORDER OF CODES IN -02 OPTION IS IN SEQUENCE.
   e.g. 86412-02/2C/2D  CODE C ARE IN POSITIONS 1 AND 2
   CODE D ARE IN POSITIONS 3 AND 4

FIG. 20B

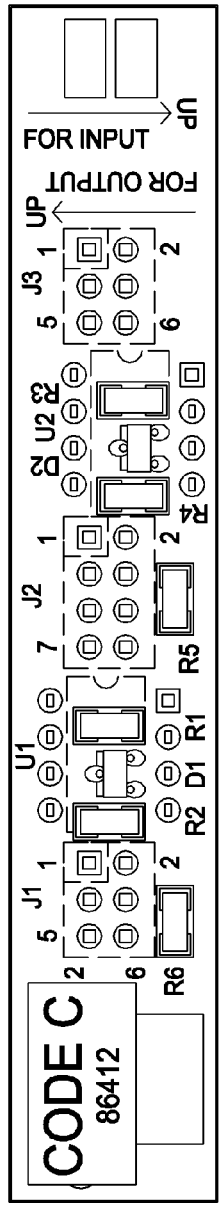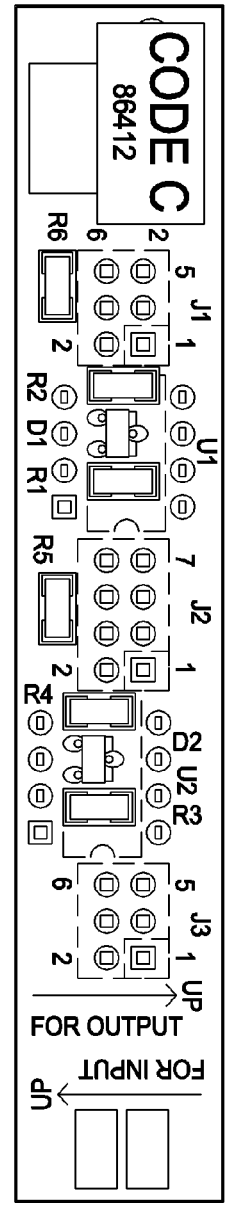
FIG. 20G

VIDEO OPTICAL MULTIPLEXER

BACKGROUND OF THE INVENTION

This invention relates generally to multiplexers, and more particularly to an optical multiplexer. The optical multiplexer has a feature set of video I/O for applications in a synchronous optical network (SONET) and other networks.

At least some known video applications include a video source (e.g., a video camera) connected to a video output (e.g., a monitor). In at least some known configurations with multiple video sources and multiple monitors, the configurations do not facilitate any monitor watching any camera at any desired quality (bit-rate or "bandwidth") within the total bandwidth available in any particular configuration.

BRIEF DESCRIPTION OF THE INVENTION

In one aspect, an optical multiplexer is provided that operates in a synchronous optical network (SONET). The multiplexer includes a plurality of inputs and a processor operationally coupled to the inputs. The multiplexer also includes a plurality of optical outputs coupled to the inputs via the processor, wherein the processor is configured to receive data from at least two of the plurality of inputs. The processor is also configured to packetize the received data and route the packetized data to at least two of the plurality of optical outputs.

In another aspect, a video optical multiplexer is provided that operates in a synchronous optical network (SONET). The video optical multiplexer includes a plurality of optical inputs, and a processor operationally coupled to the optical inputs. The optical multiplexer also includes a plurality of optical video outputs coupled to the optical inputs via the processor. The processor is configured to receive video data from at least two of said plurality of optical inputs, and packetize the received video data. The processor is also configured to route the packetized video data to at least two of said plurality of optical video outputs.

In yet another aspect, a method for operating a synchronous optical network (SONET) is provided. The method includes providing a plurality of optical video inputs, and operationally coupling a processor to the optical video inputs. Te method also includes operationally coupling a plurality of optical video outputs to the optical video inputs via the processor, and configuring the processor to receive video data from at least two of the plurality of optical video inputs. The method also includes configuring the processor to packetize the received video data, and route the packetized video data to at least two of the plurality of optical video outputs.

In another embodiment, an optical system includes a plurality of cameras, and a plurality of optical video inputs operationally coupled to the cameras. The system also includes a processor operationally coupled to the optical video inputs, and a plurality of optical video outputs coupled to the optical video inputs via the processor. The optical video outputs are also coupled to a plurality of video monitors, and the processor is configured to receive video data from at least two of the plurality of optical video inputs. The processor is also configured to packetize the received video data and route the packetized video data to at least two of the plurality of optical video outputs.

BRIEF DESCRIPTION OF THE DRAWINGS

FIGS. 7A through 7H show a schematic for one implementation for the Video I/O shown in FIG. 4.

FIGS. 9A through 9F show a schematic for one implementation for the Video I/O shown in FIG. 4.

FIGS. 11A through 11C show a schematic for one implementation for the Video I/O shown in FIG. 4.

FIGS. 13A through 13C show a schematic for one implementation for the Video I/O shown in FIG. 4.

FIGS. 14A through 14E show a schematic for one implementation for the Video I/O shown in FIG. 4.

FIGS. 16A through 16D show a schematic for one implementation for the Video I/O shown in FIG. 4.

FIGS. 17A through 17B show a schematic for one implementation for the Video I/O shown in FIG. 4.

FIGS. 18A through 18D show a schematic for one implementation for the Video I/O shown in FIG. 4.

FIGS. 20A through 20H show a schematic for one implementation for the Video I/O shown in FIG. 4.

DETAILED DESCRIPTION OF THE INVENTION

Figure 1:
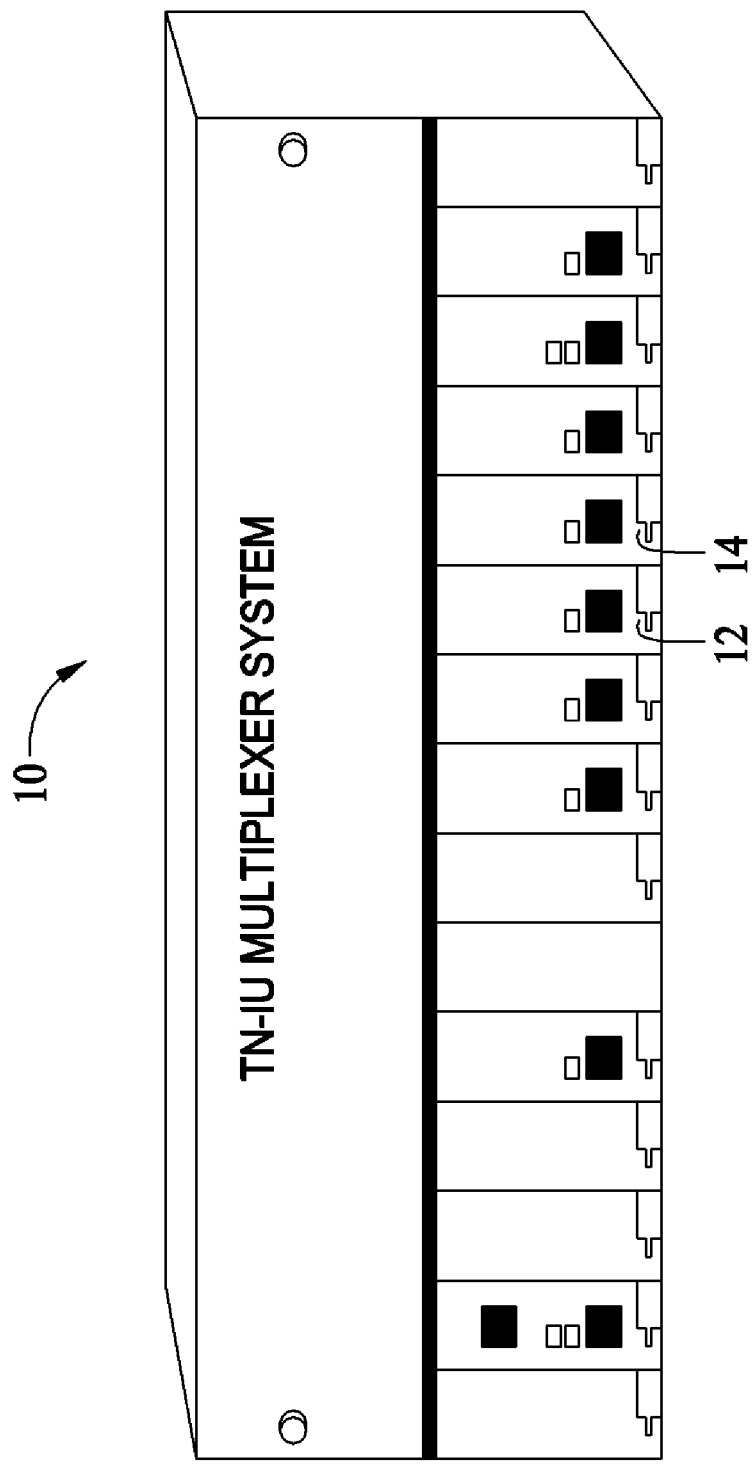
FIG. 1 is a perspective view of one embodiment of a video optical multiplexer.

FIG. 1 is a perspective view of one embodiment of an optical multiplexer 10 which receives a plurality of inputs from a plurality of sources including analog sources, such as, but not limited to, radio frequency, microwave, and infrared. The plurality of sources also includes digital sources including electronic digital sources and optical digital source such as, but not limited to, a fiber optic line.

Multiplexer 10 processes these inputs, and sends them along to plurality of optical outputs. A video I/O feature set for a network includes multiplexer 10 having at least one video Input Output (I/O) unit 12 and at least one VMapper unit 14 operationally coupled to Video I/O 12. In one embodiment, VMapper unit 14 is one of a VMapper-10 unit (not shown) and a VMapper-40 unit (not shown in FIG. 1) as described in detail below. In an exemplary embodiment, multiplexer 10 is configured to operate in a telecommunications network, for example, under a JungleMUX protocol or, more particularly, under a TN-1U protocol configured for a SONET network both available from The General Electric Company, Schenectady N.Y. In an alternative embodiment, multiplexer 10 is configured to operate under a Synchronous Optical Network (SONET) other than a JungleMux network, such as, but not limited to a TN-1U network.

The VMapper-40 Unit provides an interface between Video I/O units 12 and at least one OC-3 JMUX unit also available from The General Electric Company. The VMAPPER-40 maps a compressed video signal into a bandwidth available for transport over a network. The VMapper-40 unit is a high speed packet switching router with a high speed (<1 second) automatic setup and tear down of virtual circuit paths for enhanced bandwidth utilization.

To transport video signals in the network a WAN (wide area network) of 48 Mb/s is created. Multiplexer 10 facilitates providing a single WAN with a plurality of video sources and a plurality of monitors, wherein all video sources are able to inject their video data into the WAN, and all monitors are able to extract the desired video data from the WAN as explained in greater detail below. This network WAN is created by equipping all nodes in a system (requiring video access) with a VMapper-40 unit which connects to other VMapper-40 units at any adjacent nodes using a portion (48 Mb/s) of an inter-node Synchronous Optical Network (SONET) payload bandwidth. In one embodiment, the WAN has a linear topology with only one path between a video source and any destination. This linear topology allows for bandwidth to be reused provided that the total bandwidth of 48 Mb/s on any link (between VMapper-40 units) is not exceeded. The VMapper-40 units are able to handle optical packets of varying data type and the 48 Mb/s limit is the sum of all the packet types, not just video data packets. The video sources can be analog or digital, and can be supplied optically, electronically, by radio frequency communication, and by infrared communication to a paddleboard (not shown) which digitizes the incoming signal (if not already digital) and converts the digital signal to an optical signal (if not already optical).

The VMapper-40 utilizes an intelligent bandwidth allocation which allows more bandwidth to be nearly instantly assigned to specific video sources/cameras, allows incident management, a higher resolution of the video multiplexed, and more frames/sec for what an observer is actually viewing on a monitor.

The VMapper-40 unit occupies one shelf slot in an 86430-01 Common Equipment Shelf available from The General Electric Company. The VMapper-40 unit uses a two shelf slot wide paddleboard assembly. Either a STS-1#2 or a STS-1#3 (both available from The General Electric Company) or both may be used to transport video signals in an OC-3 JungleMUX system.

Each VMapper-40 unit has two Synchronous Payload Ports (SPEPORTs) and four Video ports (Vports). The SPEPORTs on the VMapper-40 may connect to the SPEPORTs (SPE-Y or SPE-Z) on the OC-3 JMUX unit or the SPEPORTs on an adjacent VMapper-40 unit. At a node, up to four VMapper-40 units may be cascaded thus supporting up to 16 Vports. Each Vport supports a bandwidth up to 12.8 Mb/s and connects to a far end Vport on either Video I/O unit 12 or a Vmapper-40 unit. A video source or a monitor may be connected to Video I/O unit 12.

Connections to Video I/O 12 unit or the VMapper-40 unit are made on a two shelf slot wide paddleboard assembly. The paddleboard assembly includes a main paddleboard and one or two subassembly boards. Some subassembly boards may be a Code A subassembly board (not shown in FIG. 1) which supports two RJ45 connectors.

Multiplexer 10 includes a plurality of front panel light emitting diodes (LEDs) 12 which provide a visual indication of one or more of a received STS-1 signal; a far end received STS-1 signal status, an incoming signal status from at least one Video I/O unit 12, and an internal status of Video I/O unit 12. Additionally, a setup, a status, and a port activity for Video I/O 12 are reported via a JungleMUX Craft Interface (JCI) and/or JungleMUX Network Craft Interface (JNCI) software, both of which are available from The General Electric Company.

When multiplexer 10 is configured in a linear system, at a terminal (end) node or at an add/drop (intermediate) node where up to four Video I/O units 12 can be accessed, one VMapper-40 unit and one paddleboard assembly are typically utilized. At the add/drop (intermediate) node, video traffic may be dropped from either direction. The bandwidth available between adjacent nodes is 48 Mb/s. Bandwidth may be reused provided that the total bandwidth of 48 Mb/s on any link is not exceeded.

When Multiplexer 10 is configured in a ring system, at a node where up to four Video I/O units 12 can be accessed, one VMapper-40 unit and one paddleboard assembly typically are utilized. The VMapper-40 unit at one of the nodes is configured for "Ring Closer" while the VMapper-40 units at all the other nodes are configured for "Normal". This facilitates that video traffic in the ring is protected against a path failure and/or a fiber failure. The VMapper-40 units use the Path User Channel byte (POH byte F2) to determine if the ring is operational (OK) or non-operational (Broken). Under normal operating conditions, the byte 35H (hex) should be seen at IN for both SPEPORTs. If this is not the case, a break in the ring has occurred and path protection switching is initiated. Note, if ring protection is desired then the total bandwidth assigned should not exceed 48 Mb/s.

In a system which consists of two or more networks (ring and/or linear) and the application is to pass video traffic between the networks, at the co-located nodes the Vport on the VMapper-40 units are connected using a crossover cable.

The VMapper-40 unit is capable of end-to-end SONET Payload Envelope (SPE) path integrity monitoring. A predetermined, user selectable pattern can be inserted into the POH Byte H4 of the outgoing SPE without affecting the normal Video traffic. By monitoring the incoming POH Byte H4 at the remote site, a valid SPE path can be confirmed. This end-to-end SPE path monitoring is performed through the JCI software or through the JNCI. The SPE paths are typically terminated at VMapper-40 units.

Figure 2:
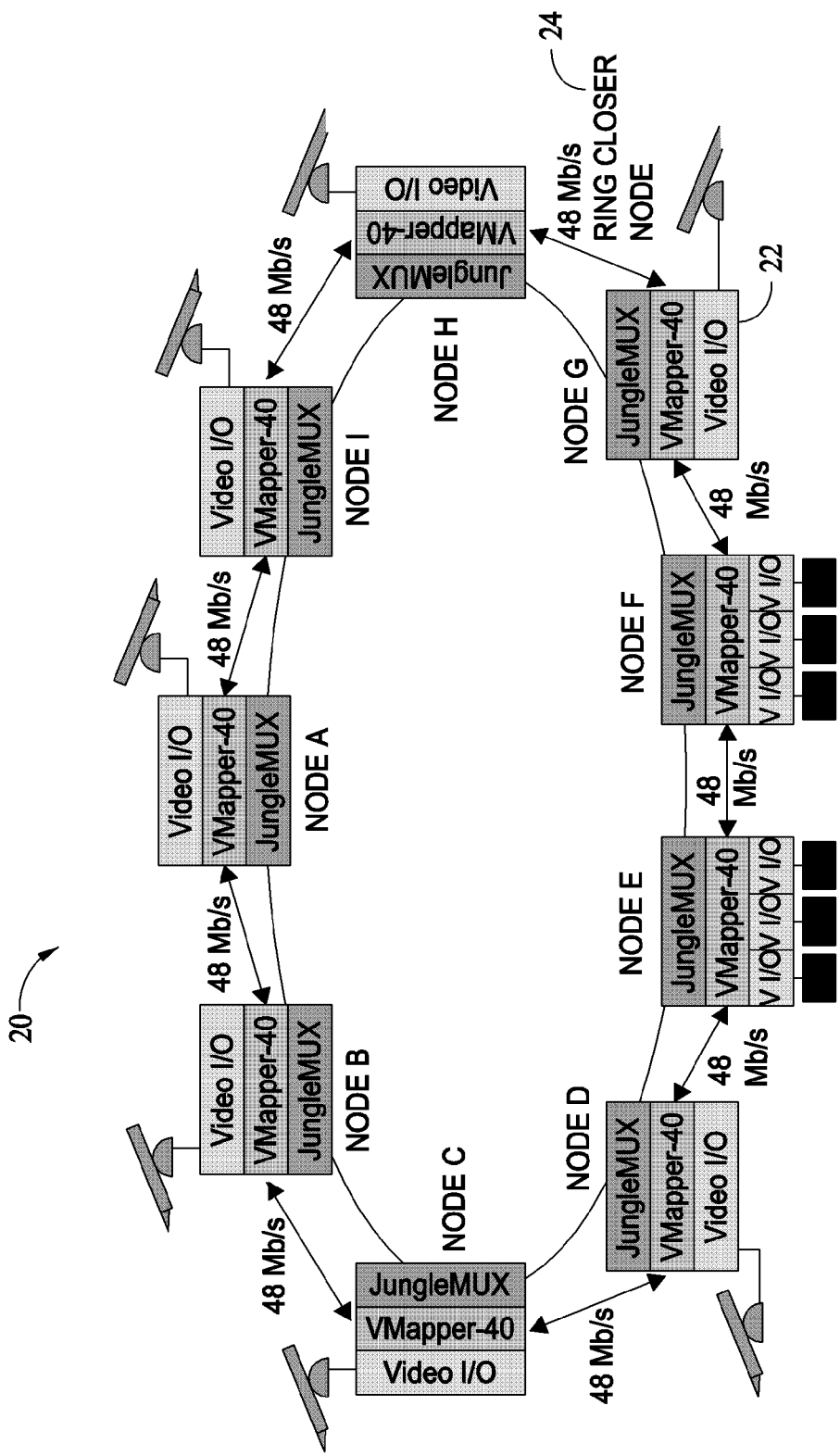
FIG. 2 illustrates how bandwidth may be assigned in a JungleMUX ring with a Node G as a Ring Closer Node.

FIG. 2 illustrates how bandwidth may be assigned in a JungleMUX ring 20 with a Node G 22 as a Ring Closer Node 24 as Table 1 details.

TABLE 1

| From Node | To Node | Bandwidth Assigned (Mb/s) |
|---|---|---|
| A | E | 6 |
| C | E | 1 |
| H | F | 6 |
| B | F | 6 |
| I | E, F | 3 |

The available bandwidth between VMapper-40 units is 48 Mb/s. For traffic between Node A and Node E the Through nodes are B, C and D. Since the bandwidth required is 6 Mb/s the unused bandwidths on links A-B, B-C, C-D, and D-E is 42 Mb/s. Note that the bandwidth on I-A are still 48 Mb/s.

For traffic between Nodes C and E, the only links affected are links C-D and D-E. Since the video traffic is 1 Mb/s the unused traffic on these links are 41 Mb/s.

The bandwidth unused between nodes is shown below in Table 2.

TABLE 2

Unused Bandwidth between Nodes

| From Node | To Node | Band Width (MB/s) | Through Nodes | Bandwidth Unused between Nodes in MB/s | | | | | | | | |
|---|---|---|---|---|---|---|---|---|---|---|---|---|
| | | | | A–B | B–C | C–D | D–E | E–F | F–G | G–H | H–I | I–A |
| | | | | 48 | 48 | 48 | 48 | 48 | 48 | 48 | 48 | 48 |
| A | E | 6 | B, C, D | 42 | 42 | 42 | 42 | 48 | 48 | 48 | 48 | 48 |
| C | E | 1 | D | 42 | 42 | 41 | 41 | 48 | 48 | 48 | 48 | 48 |
| H | F | 6 | I, A, B, C, D, E | 36 | 36 | 35 | 35 | 42 | 48 | 48 | 42 | 42 |
| B | F | 6 | C, D, E | 36 | 30 | 29 | 29 | 28 | 48 | 48 | 42 | 42 |
| I | E, F | 2 | A, B, C, D | 34 | 28 | 27 | 27 | 26 | 48 | 48 | 40 | 40 |

If ring protection is desired then the total bandwidth assigned in the ring should not exceed 48 Mb/s. As explained above, the VMapper-40 unit provides the interface between an SPEPORT (SPEPORT-Y or SPEPORT-Z) of an 86432 OC-3 JMUX unit or a VMapper-40 unit and up to four Vports (four Video I/O units 12). The Vmapper-40 uses one STS-1 channel of a SONET OC-3 signal. The Vmapper-40 unit occupies one shelf slot in a JungleMUX equipment shelf available from The General Electric Company.

Figure 3:
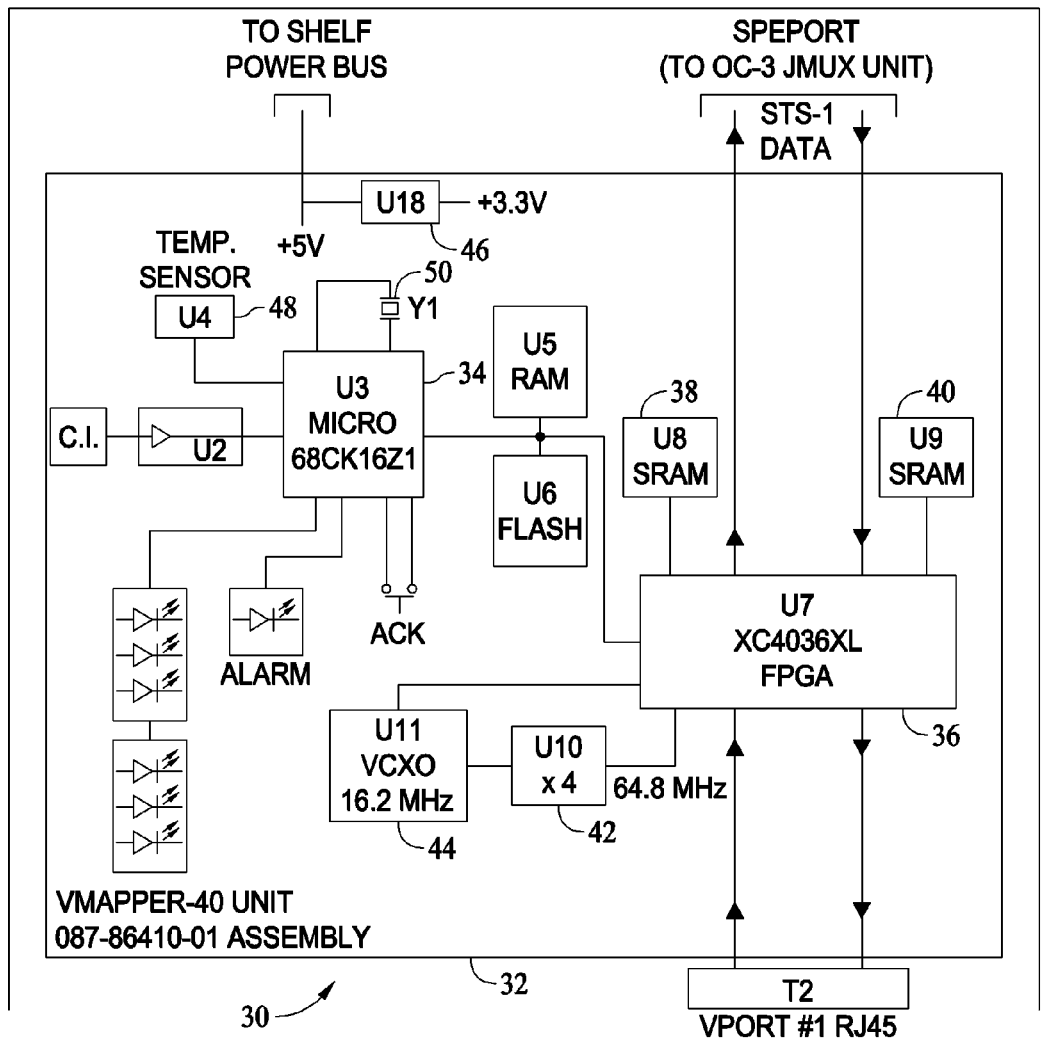
FIG. 3 is a block diagram of one embodiment of a VMapper-40.

FIG. 3 is a block diagram of one embodiment of a VMapper-40 30 hereinafter referred to as Vmapper 30. Vmapper 30 includes an 087-86491-01 main assembly board 32 which houses a microprocessor 34, a Field Programmable Logic Gate Array 36 (FPGA), a first Static Random Access Memory (SRAM) 38, a second SRAM 40, a Voltage-Controlled Crystal Oscillator (VCXO) (U10 and U11) 42 and 44, and a DC/DC Converter 46.

Vmapper 30 performs functions including interfacing to the two SPEPORT signals, interfacing to the four Vport signals, and buffering the incoming packets from all the six ports of the unit. Vmapper 30 also routes incoming packets to the correct destination ports, automatically setups and teardowns packet routing switches, and stores a Video Network Address (VNA) table plus a "to-do" list for each of the 6 output ports and for microprocessor 34. Vmapper 30 also monitors a temperature sensor 48, controls the front panel LEDs and ACK push-button, reports the unit status and responding to configuration requests from the Craft Interface or Network Management System (NMS), and provides a visibility of Video I/O unit 12 alarms. As used herein, the terms processor and microprocessor broadly mean microprocessors, computers, microcontrollers, reduced instruction set circuits (RISC), application specific integrated circuits (ASICs), programmable logic controllers (PLCs), and all other programmable circuits capable of executing the methods described herein.

A plurality of Vport connections are typically made on a 86412-90/Code A or a 86412-90/Code 2A paddleboard assemblies available from The General Electric Company. A Vport DATA IN signal is received on a RJ 45 paddleboard and passed through a coupling transformer (not shown) and a backplane connector (not shown) to main assembly board 32. The incoming data is monitored for Code Violations of the Basic Encoding Rules (BER) and for level below a predetermined level. The incoming data is typically synchronous and the Vports signal format includes a framing pattern, followed by eight 25-byte packets, ending with a check bit for error monitoring, per 125 µs frame.

For the Vport-OUT Signal Path, packets from FPGA 36 are fed to the paddleboard assembly via the backplane connector where the packets are passed through the coupling transformer and outputted on the RJ 45 connector as Data Out.

For the SPEPORT-IN Signal Path, a signal is received on the SPEPORT and through at least one balun device and sent to FPGA 36. As used herein a "balun device" refers to any device, including, but not limited to, transformers, that joins a balanced line (one that has two conductors, with equal currents in opposite directions) to an unbalanced line (one that has just one conductor and a ground). FPGA 36 terminates the STS Path OverHead (POH), and the POH bytes supported include a JI which is set to 56 HEX and is the path trace byte (displayed as V), a C1 which is set for 01 HEX, for a generic "equipped" path label, and a B3 which is set according to a pre-specified algorithm for detecting SPE Path Code Violations. Additional POH bytes supported include a GI which is 00 except for far end SPE path failure, a H4 which is used as the Test Byte for SPE Path confirmation, and a F2 which is set to 35 HEX for monitoring the integrity of Ring systems.

FPGA 36 also terminates the NMS information and passes any incoming packets. For the SPEPORT-OUT Signal Path, the signal is outputted through ay least one balun device to a SPEPORT connector on a top (not shown) of Vmapper 30. The SPEPORT connection includes a transmit (XMT) and receive (RCV) pair of balanced 10 line bi-directional buses (40 wires total). The buses are balanced for electromagnetic interference (EMI) and radio frequency interference (RFI) immunity.

Microprocessor 34 is the central processor unit (CPU) for Vmapper 30. CPU 34 provides a plurality of functions including communication with a user through the Craft Interface port, control of all front panel LEDs and monitoring of the ACK push button switch, and monitoring of unit temperature sensor 48 and reporting local unit temperature. CPU 34 also provides configuration of FPGA 36, monitoring data from FPGA 36, communication of unit status 30 and alarm information to the OC-3 JMUX unit for the Network Management System (JNCI), and processing any configuration requests from JCI and JNCI.

A 32.768 kHz crystal 50 forms an oscillator with microprocessor 34, which multiplies the 32.768 kHz signal providing an internal 16.78 MHz CPU clock for microprocessor 34.

In one embodiment, Vmapper 30 uses a Xilinx Field Programmable Gate Array (FPGA) 36 to sample and drive the SPEPORT interface and Vports, facilitate the NMS communications, and implement a Phase locked loop circuit in conjunction with an external phase-locked loop (PLL) and multiplier (×4) to synchronize the on-board 16.2 MHz clock (provided by voltage-controlled crystal oscillator 44) to the SPEPORT data rate. FPGA 36 is also utilized to use a 64.8 MHz signal to over sample the 16.2 MHz input Vports and recover incoming data, and to perform all packet generation and processing functions.

In one embodiment, first SRAM 38 is a 128 k×8 high speed SRAM 38 and is used for buffering incoming packets from all six ports of second SRAM 40. In another embodiment, second SRAM 40 is a 64 k×16 high speed SRAM 40 for an 8192 entry VNA# table, seven 4096 entry "to-do" lists for each of the six output ports, and a "to-do" list for microprocessor 34.

In an exemplary embodiment, all data on the Video WAN is encoded in 25 byte packets. Wherein, the first three bits of the first packet byte identify the type of packet while the remaining five bits of the first packet and the eight bits of the next packet are used to form a thirteen bit Packet Address Header (PHA). Thus there are total of 8192 Addresses available of which the upper 511 (m1 to m511) are assigned to Vmapper 30 units, and the rest (1 to 7679) are assigned to Video I/O units 12. There are six different types of packets and their functions are listed below in Table 3.

TABLE 3

Packet Types

| Packet Type | Header Bytes | Description | Function |
|---|---|---|---|
| LINK | 01 1 + VNA# | Regularly broadcast by each unit, and are not passed on. | Helps each unit to learn the VNA# of its Neighbors (unless the unit is to right of a Ring Closer unit) and be able to identify any dead links. |
| HELLO | 001 + VNA# | Regularly broadcast by each unit, and passed through every other unit, to reach all other units in the network. | Each unit keeps a table so that it knows the entry port of each VNA#. |
| Hello-Z | 001 + 13 zeros | Broadcast by Video-IN units when an event (e.g. motion is detected) and enabled. | Alerts monitor end to event. |
| WANTED | 010 + VNA# | Broadcast by each unit wanting to receive video from another unit<br>-Each VMapper-40 unit receiving a WANTED packet looks at its table to see if it has an entry for the VNA#; if so, it passes the packet to the recorded port (producing the VNA# HELLO).<br>-The units routing this packet puts an entry in the table to flag the port producing the packet. If more than one monitor wants the same source, there will be more than one flagged port in the table for that particular VNA#.<br>-Remove the flags if the "WANTED" packets cease.<br>-The third byte in the "WANTED" packet indicates the spare capacity of the path by having each VMapper-40 unit compare the byte with its port's idle rate. | WANTED packets find their way to the other unit.<br>-quick tear down of obsolete paths to maintain the full bandwidth for the active paths.<br>-allows the source unit to know whether it can accommodate a request for more bandwidth. |
| PAY-LOAD | 1OX + VNA# | Broadcast by each Video I/O unit transmitting data.<br>-Each VMapper-40 unit receiving a PAYLOAD packet looks at its table to see if it has any flagged ports for the VNA#; if so, it passes the packet to the recorded port(s) producing the VNA# "WANTED" | PAYLOAD packets find their way directly to (all) the destination(s). |
| MES-SAGE | 110 + VNA# | Used for inter unit messages. After the first two bytes the next two bytes carry the source unit's VNA# so that the recipient can return a response. Each VMapper-40 unit receiving a MESSAGE packet looks at its table to see if it has an entry for the VNA#; if so, it passes the packet to the recorded port (producing the VNA# HELLO. | MESSAGE packets find their way directly to the other unit. |
| Idle | 000 + 13 zeros | Each Vmapper 40 and Video I/O unit transmits IDLE packets as desired. | To maintain continuous packets on all ports. |

For Input Packet Processing, as each packet is written to its buffer area (the Packet Start Address—PSA is noted), the packet 3 bit header is used to control which of the actions to invoke. For example, for a 001 HELLO packet, the packet's VNA# is used as an index to the unit's VNA table. For each VNA, the table has four fields including a 1-bit HFLAG field set by each incoming HELLO packet, a 3-bit HPORT field to encode the source port for HELLO packets, a 6-BIT WPORT field wherein 1 bit is used for each of the six ports of Vmapper 30, and a 6-bit WFLAG field again wherein 1 bit is used for each of the ports.

Each Video I/O unit 12 and/or VMapper-40 unit outputs a HELLO packet at least once per minute (<once per second for normal video). An HFLAG is set by each incoming HELLO packet. A polling routine checks and clears the H FLAG bit for each VNA# once per minute; if the routine finds an entry with the bit already cleared, it deletes the remaining fields. This ensures that the 4096 array is kept reasonably current.

The HPORT field is updated with the port originating the HELLO packets. If this changes and it happens repetitively the "Duplicate-Hello" alert is activated. For each of the 6 bits, if both the WPORT and WFLAG fields are set, the WFLAG field's bit is cleared (this starts the "tear down" of an obsolete path to a monitor). If the WPORT field is set and the WFLAG field bit is already cleared, then the NPORT field bit is cleared (this completes the "tear down" of an obsolete path).

Also the packet's PSA is placed on the "to-do" list of either 5 or 6 of the 6 output ports (hairpinning is suppressed on the SPEPORTs, and on any Vports connected to Vmapper 30). For 010 WANTED PACKETS, the packets VNA# is used as an index to the unit's VNA table. As used herein "unit" refers to Video I/O unit 12, Vmapper 30 (VMapper-40), and VMapper-10 (described below). The WPORT and WFLAG fields' bit for the packet source port is set, and the packet's PSA is placed on the "to-do" list for the port whose bit is set in the HPORT field.

For 10× PAYLOAD packets, the packets VNA# is used as an index to the unit's VNA table. The packets PSA is placed on the "to-do" list for the ports whose bits are set in the WPORT field.

For 10 MESSAGE packets, the packets VNA# is used as an index to the unit's VNA table. If the VNA# matches that of the unit, the packet's PSA is placed on the "to-do" list for microprocessor 34, otherwise it is put on the "to-do" list for the H PORT field port. For 011 LINK PACKETS, the packet's PSA is placed on the "to-do" list of microprocessor 34. For 000 IDLE PACKETS, no action is taken, i.e., these incoming packets go nowhere.

For Output Packet Processing, for each of the six output ports, when a new packet is required, the oldest waiting entry on its "to-do" list is used. If the "to-do" list is empty, an idle packet is sent.

As stated above, multiplexer 10 includes a Video I/O unit 12. In one embodiment, Video I/O unit 12 allows the transport of NTSC video signal over a network. In another embodiment, Video unit 12 allows the transport of European video signals in a European standard I²C 2-wire bus for SDA and SCL networks. Video I/O 12 unit provides the interface between analog video signals and a Video WAN on OC-3/OC-1 JungleMUX system via Vmapper 30. An 86412-02 option available from The General Electric Company allows an audio signal to be transmitted along with video.

Video I/O unit 12 may be configured as a Video-IN unit or a Video-OUT unit. All video inputs and outputs have zap-busters, with no effects on the video quality, for protection against electrostatic discharge (ESD) and serge withstand capability (SWC) transients.

In one embodiment, Video I/O unit 12 supports only one video circuit (with or without accompanied audio). The Video-IN unit can accept video plus (optional) audio signals from sources such as cameras, VCRs, DVD players or broadcast signal sources. The Video-IN unit provides both composite video (BNC) and S-video (Y/C) interfaces. Three composite inputs allow three cameras to be connected to the Video I/O unit. The selection of camera that feeds the unit input can be done dynamically and remotely. The camera can be a digital camera or an analog camera.

Video I/O 12 is configurable for mono or stereo audio signals, with a selection of sampling rates and quantizing resolutions, for a flexible tradeoff between audio quality and transmission bandwidths. An AGC (Automatic Gain Control) circuit can be configured for either fixed gains, or variable gains (up to 42 dB) for better signal-to-noise performance.

The Video-OUT unit may be configured to generate video plus (optional) audio to devices such as monitors, VCRs or broadcast feeds. The unit provides both composite video (BNC) and S-video (Y/C) interfaces. The signal between the Video-IN unit at one node and the Video-OUT unit at another node is in a compressed digitized form packetized into the VMapper's 25-byte packet format. The bit rate for each video signal is dynamically user-configurable from 10 Mb/s down to 25 kb/s to provide full motion high quality video transport down to low scan surveillance monitoring. The intelligent bandwidth allocation allows more bandwidth to be nearly instantly assigned to specific video sources/cameras, allowing incident management, a higher resolution and more frames/sec for what is actually being viewed.

Video I/O 12 is typically coupled to a paddleboard assembly which includes of a main paddleboard and two sub-boards. An upper sub-board provides user connections for video, audio and RS-232 data while a lower sub-board provides connections to Vmapper 30. A plurality of connections for a contact I/O and RS-422 data are provided on the main paddleboard.

A plurality of front panel LEDs provide a visual indication of received Vport signal from VMapper unit 30, unit's 12 internal status and Video Loss Of Signal (LOS). Video I/O 12 unit's setup, status and port activity are reported via the JCI software. Additionally, Video I/O unit 12 is configurable to allow for motion detection which may be used in surveillance applications. More specifically, motion detection for Video I/O 12 includes detection of intruders, detection of vehicles, detection of stalled machinery (e.g. conveyor belts), and detection of lack of activity. Additionally, the motion detection is sensitive to both color and brightness movements. An adjustable threshold may be set and should this threshold be exceeded actions may be independently enabled including an alarm to the local node's summary alarm and JNCI alarm engine, and an alert message broadcast to all other Video I/O units 12 in the system.

Multiplexer 10 is configured to provide On-Screen Information Display. For example, if an attached video monitor supports a "Closed Caption" display, the on screen information display may be used for displaying the name of the camera location, and warning of an alarm condition. Alternatively, if the monitor does not support closed-capture, an external decoder box can be used.

To facilitate displaying the name of the camera location, the camera location may be entered using JCI in two lines of text with each line supporting up to 32 characters. This information may be displayed on local monitors connected to the Video-IN unit or monitors connected to the Video-OUT unit. The text may be placed anywhere on the screen; however, using JCI the text may be placed either at the top or at the bottom.

To facilitate warning of an alarm condition, a flashing message centered at the top of the screen is displayed. To facilitate using video sources, the Video-IN unit can accept video through the BNC connector or the Y/C (S-Video) connector. If a splitter cable on the Y/C connector is used, two separate composite video signals may be accepted on the Y/C connector. Thus, at a Video-IN unit, a maximum of three video sources can be connected with the transmission to a far end from any one video source at a time.

Additionally, the Video-IN unit can provide the incoming video signal to both of its video output ports (BNC and Y/C). Thus, by connecting a monitor to one of these ports, a user can locally monitor the quality of the input video signal. In one embodiment, the Video-IN unit feeds its audio output with the input audio signal with quality equal to the quality of the signal being sent to the far end.

Both Video-IN and Video-OUT units have a video test mode. In the test mode the unit provides an internally generated color-bar test signal to both local video output connectors (BNC and Y/C). During this mode, the Video-IN unit will also send a Color-Ramp test signal to the far-end Video-OUT unit.

Video I/O unit 12 also supports an Audio Channel Test mode which allows the user to override the Video-IN unit's audio input with a tone from the unit's built-in tone generator or to mute its audio input. This test can be enabled from the far-end (Video-OUT) unit or forced locally. Additionally, the Video-OUT unit supports a Local Test mode which allows the user to test the audio portion of the unit locally. The unit can be programmed to override the audio signal from the far end with a tone from the unit's built-in tone generator, to loopback a tone that may be locally provided at its audio input, or to mute its audio output.

Figure 4:
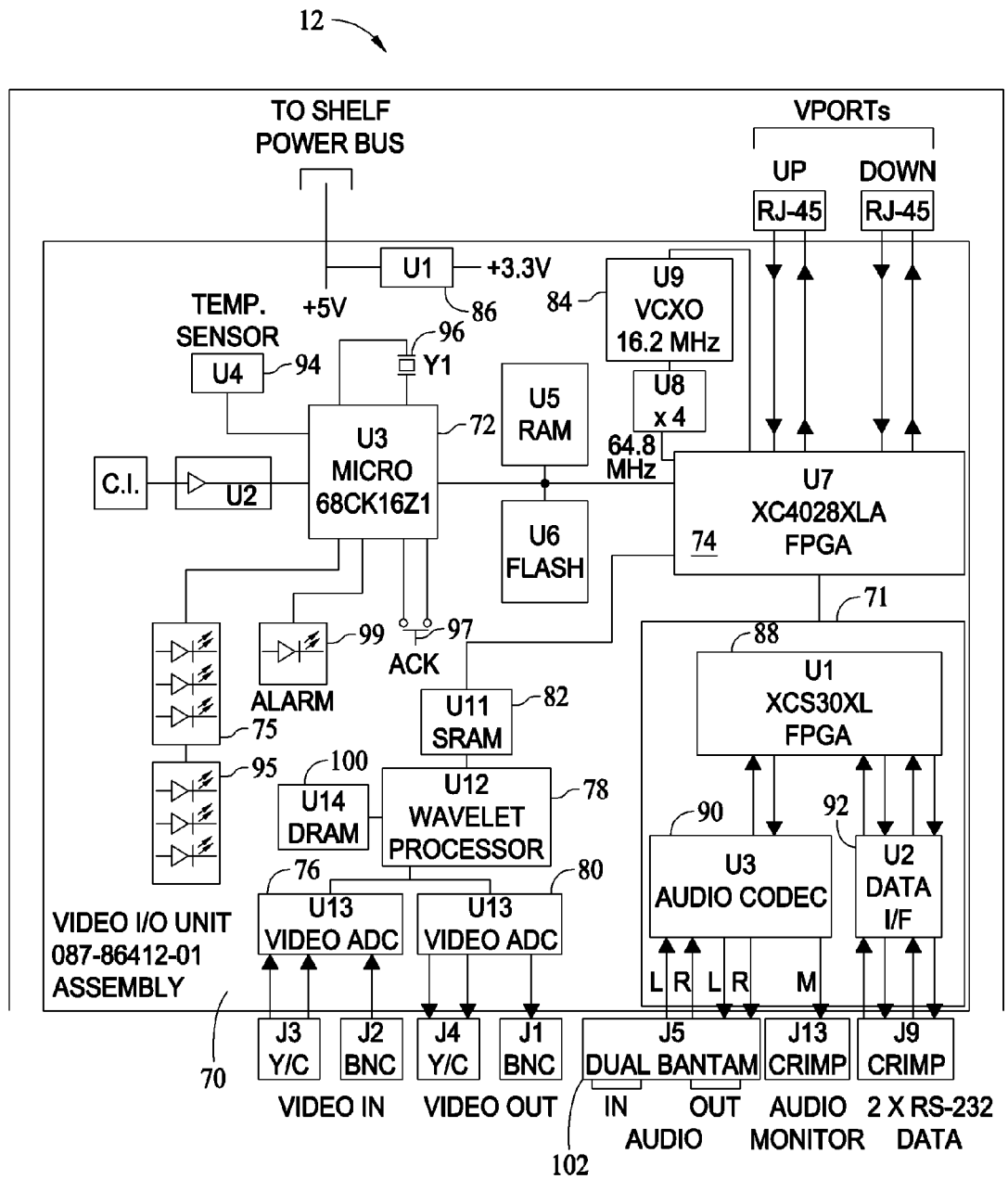
FIG. 4 is a block diagram of a Video I/O including a main assembly board and a sub-assembly board.
Figure 5A:
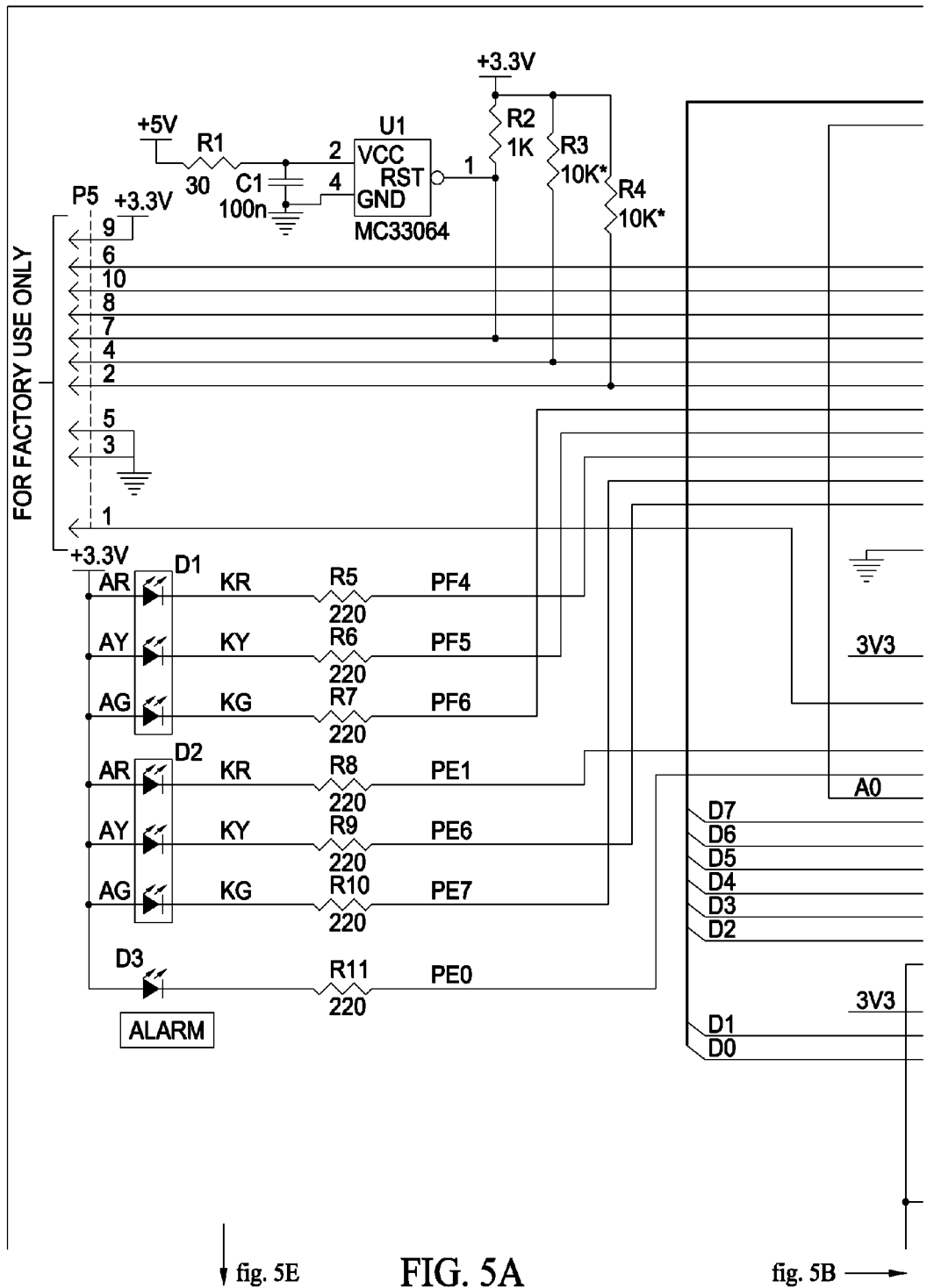
FIGS. 5A through 5H show a schematic for one implementation for the Video I/O shown in FIG. 4.
Figure 5B:
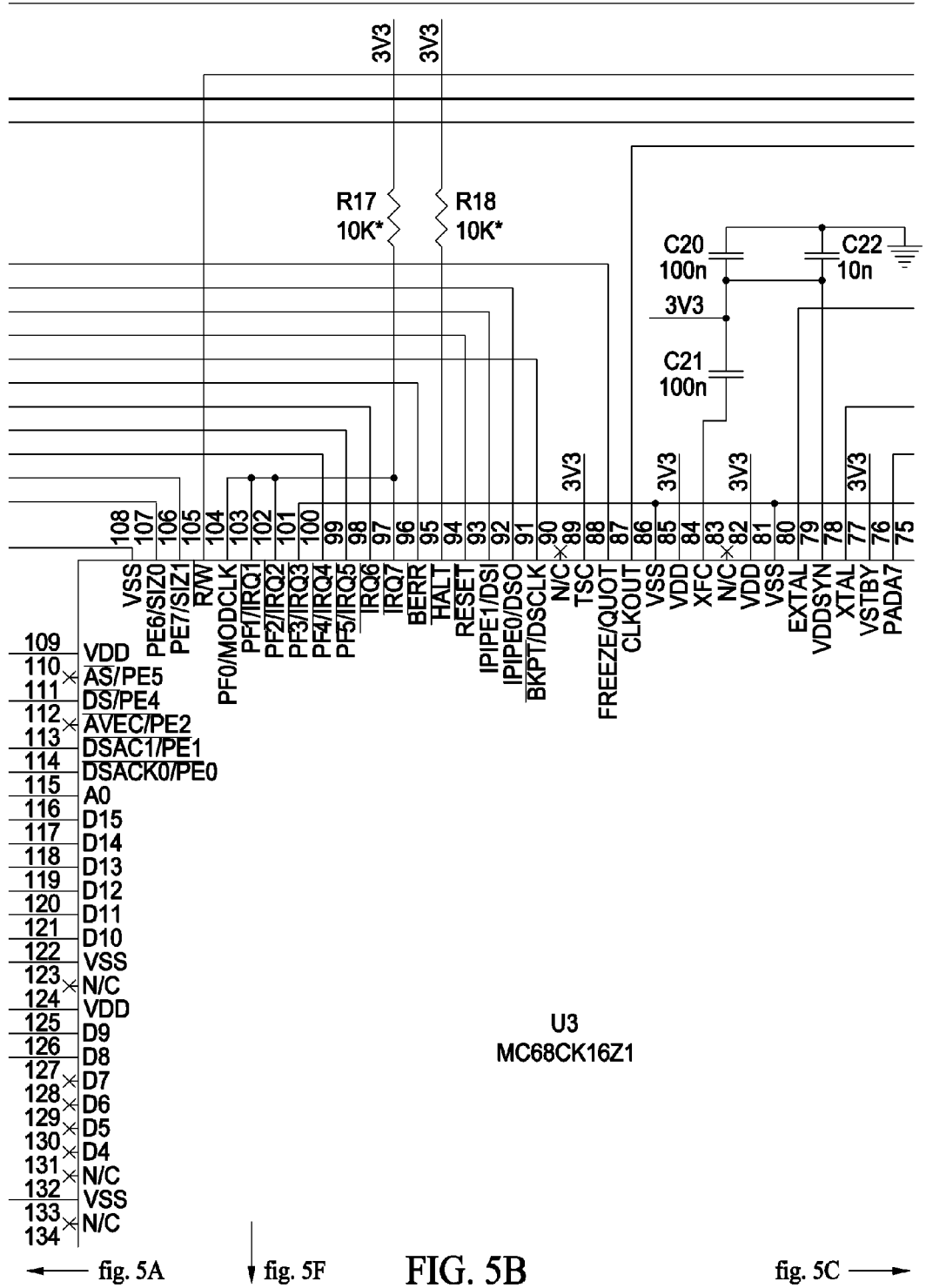
Figure 5C:
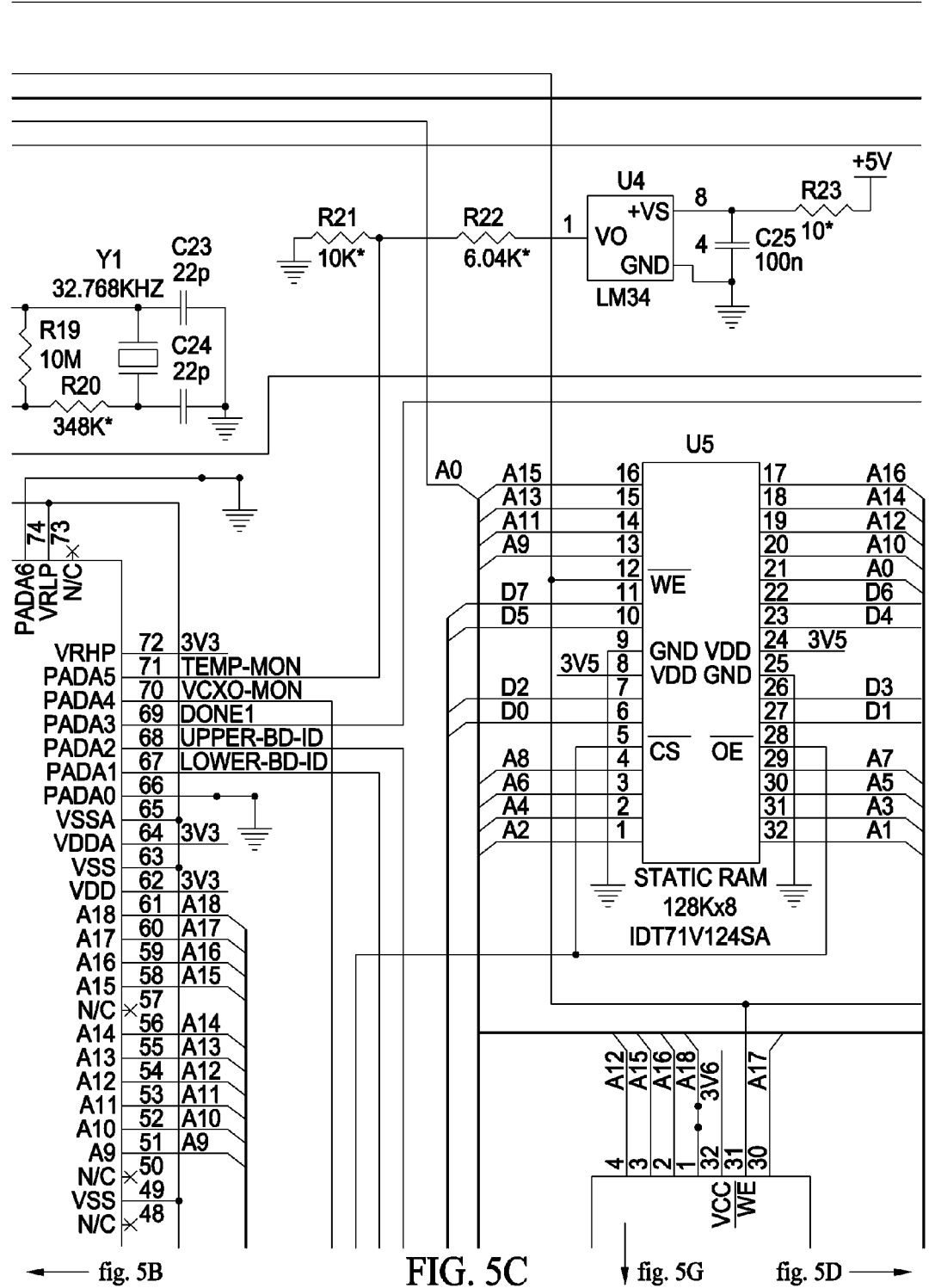
Figure 5D:
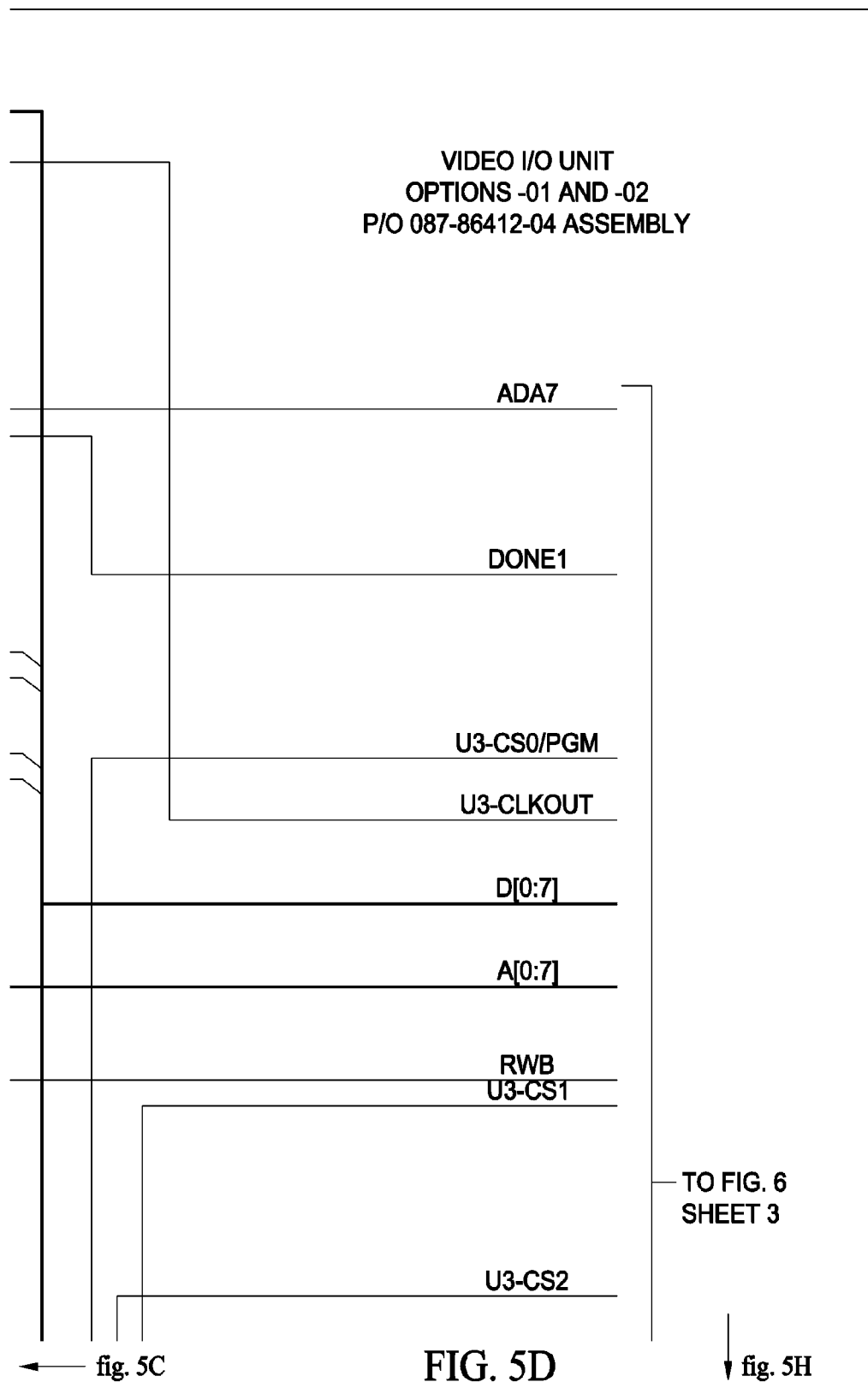
Figure 5E:
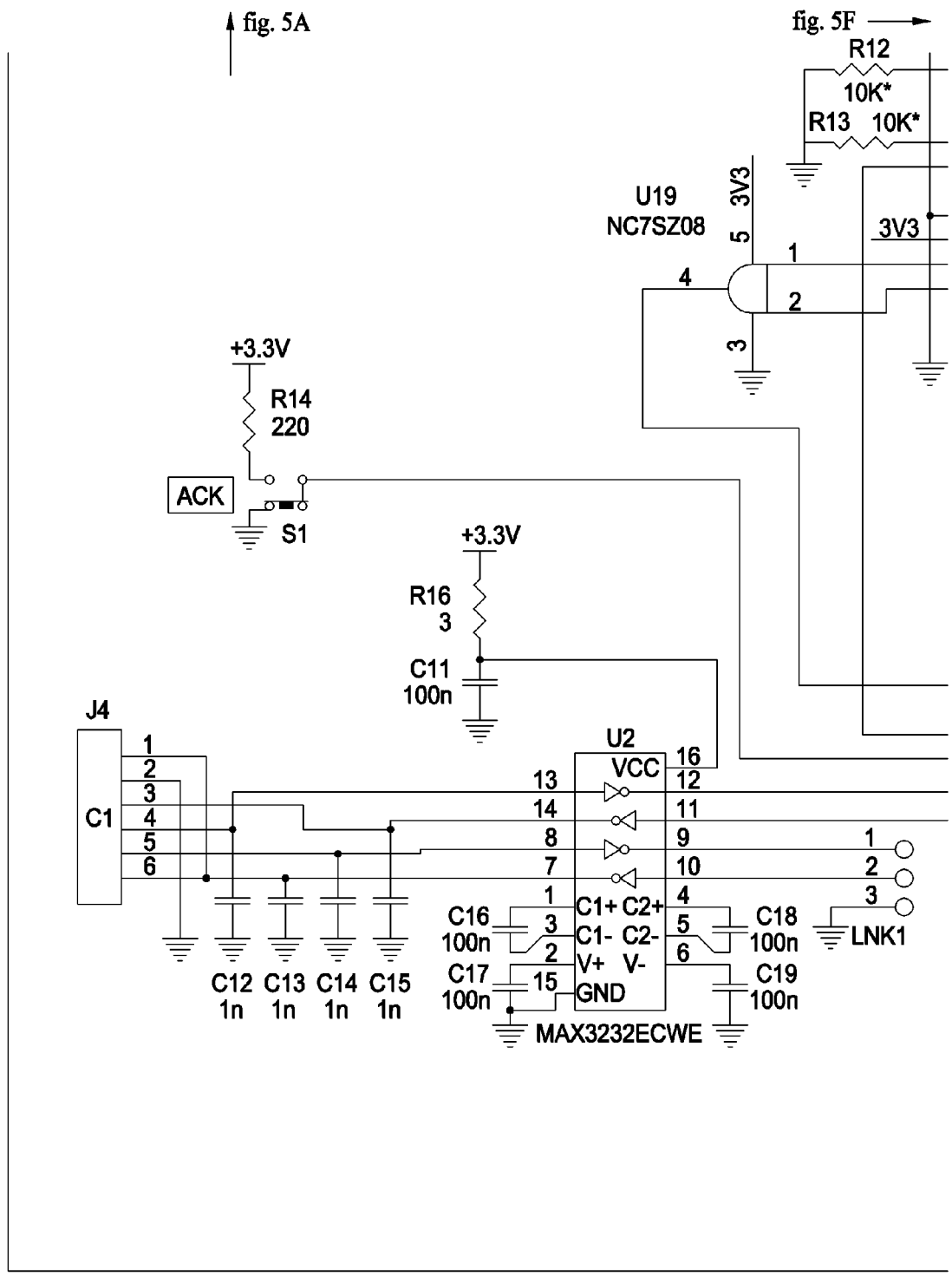
Figure 5F:
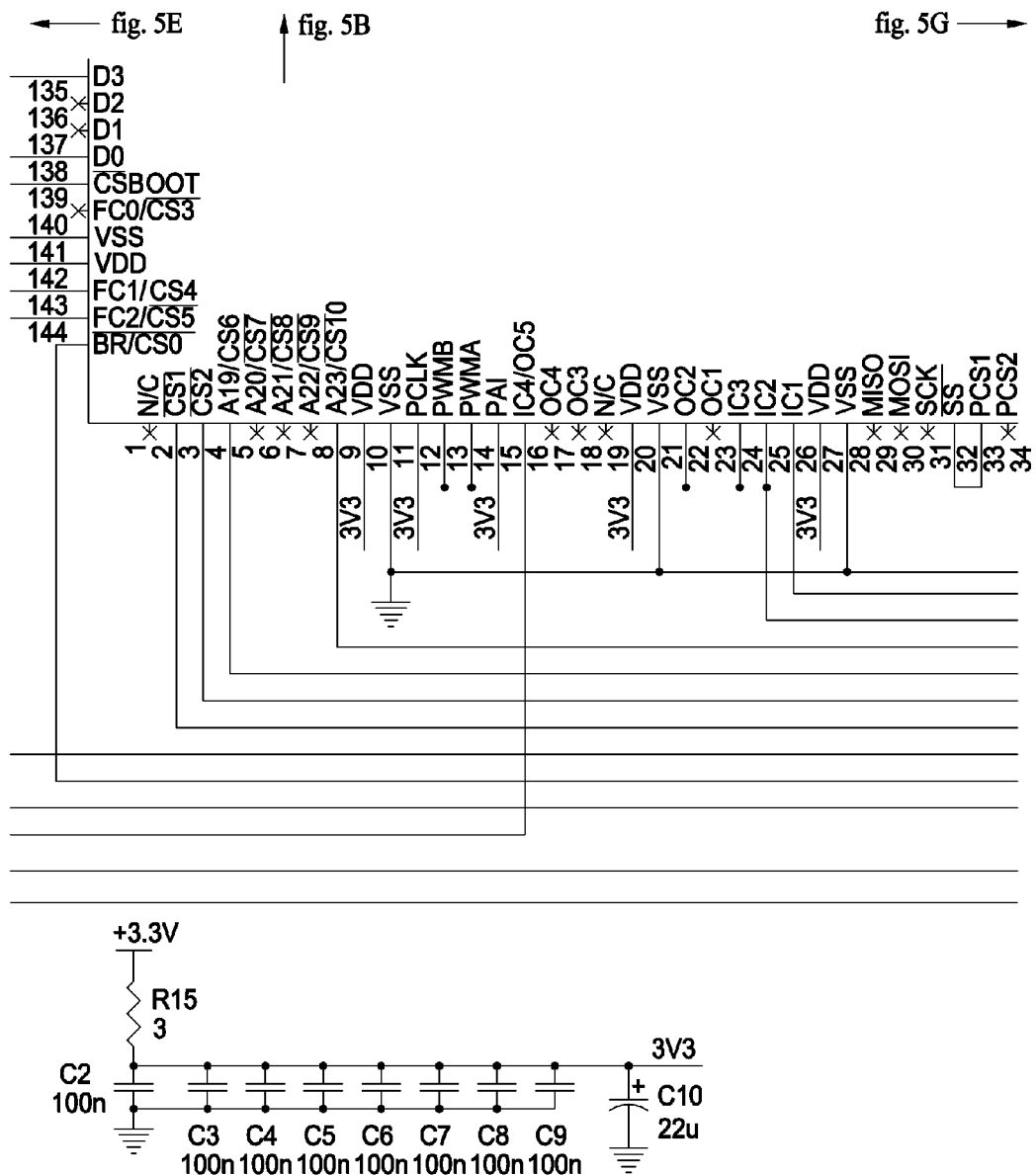
Figure 5G:
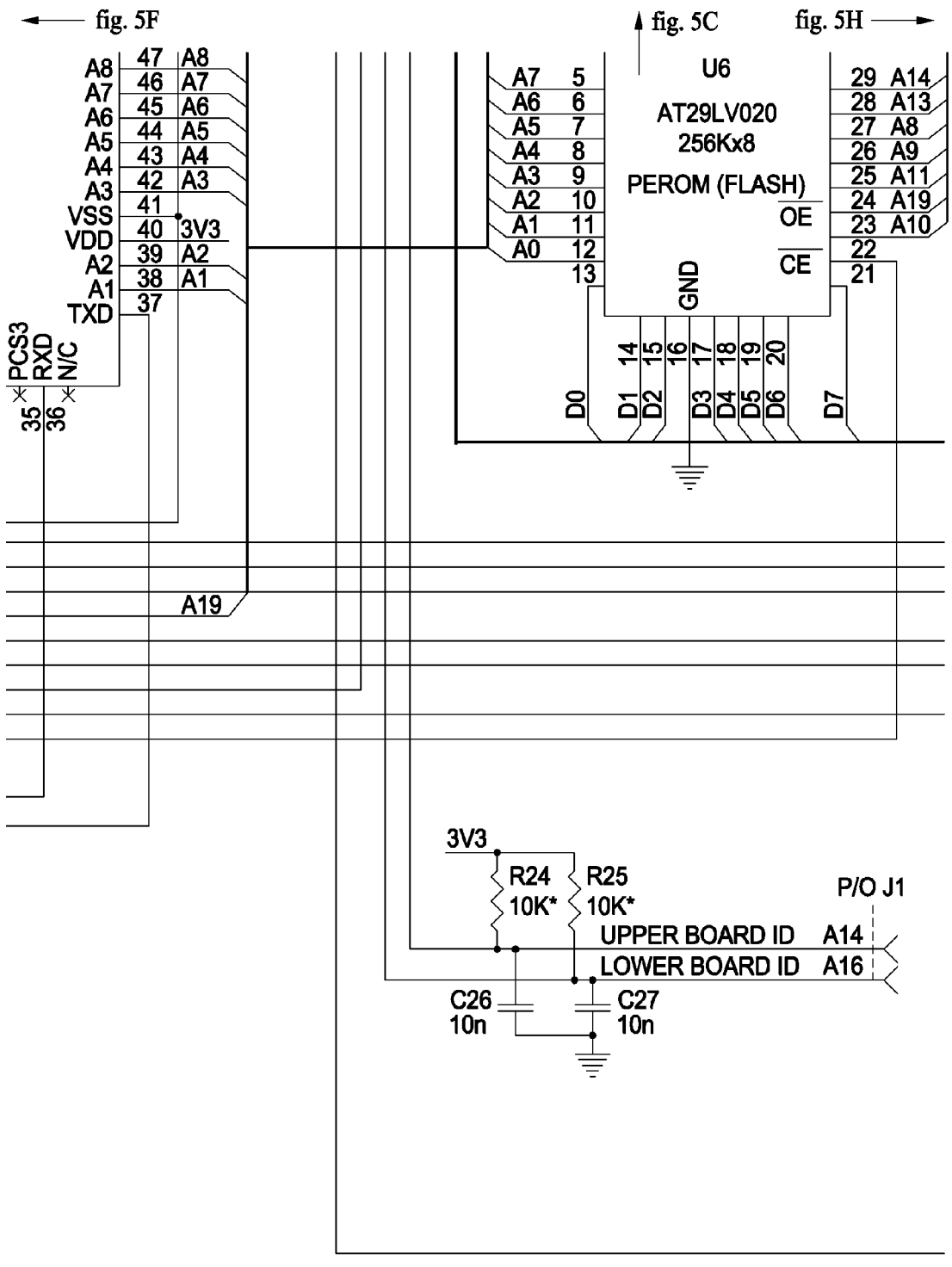
Figure 5H:
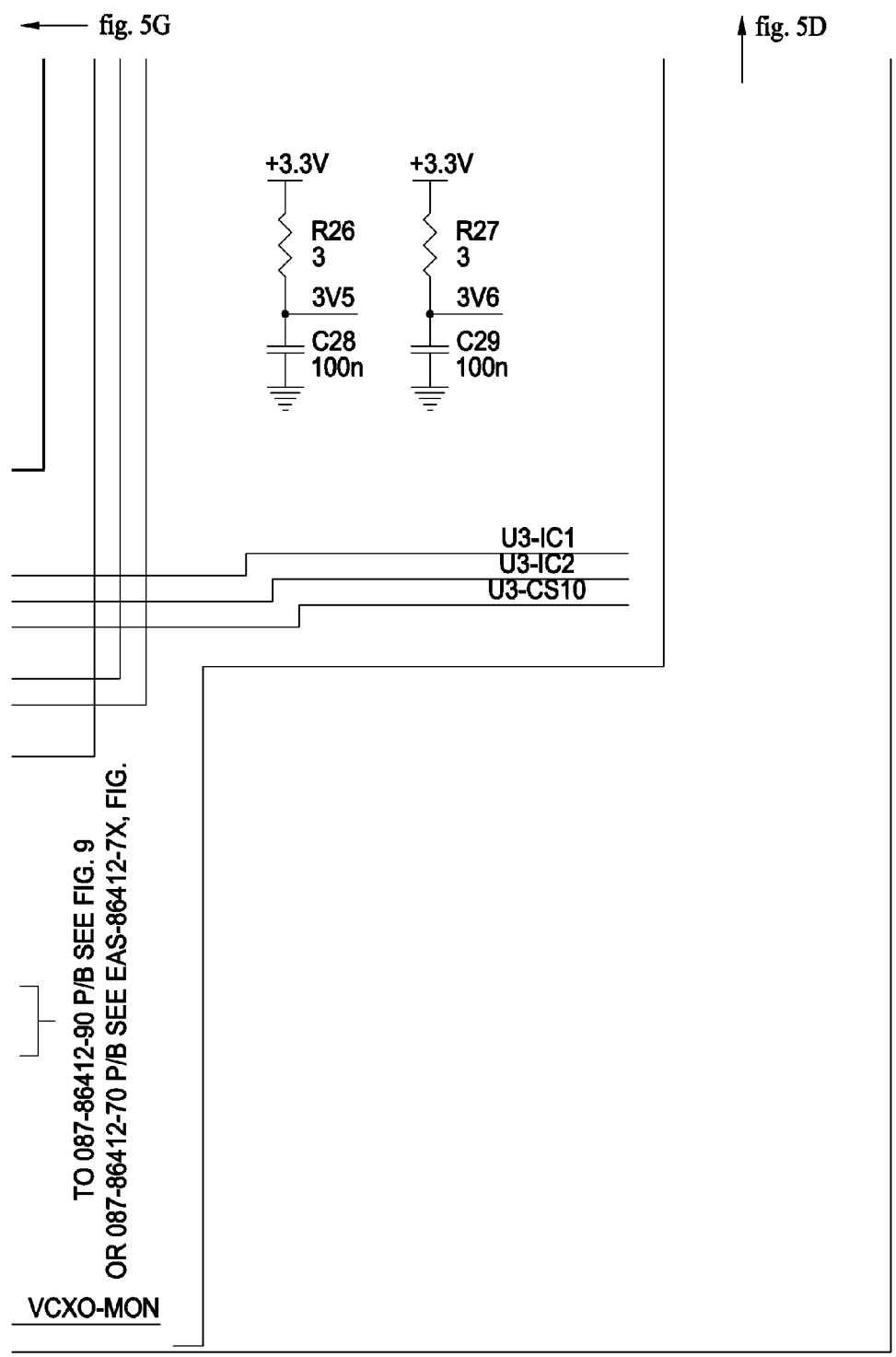
Figure 6A:
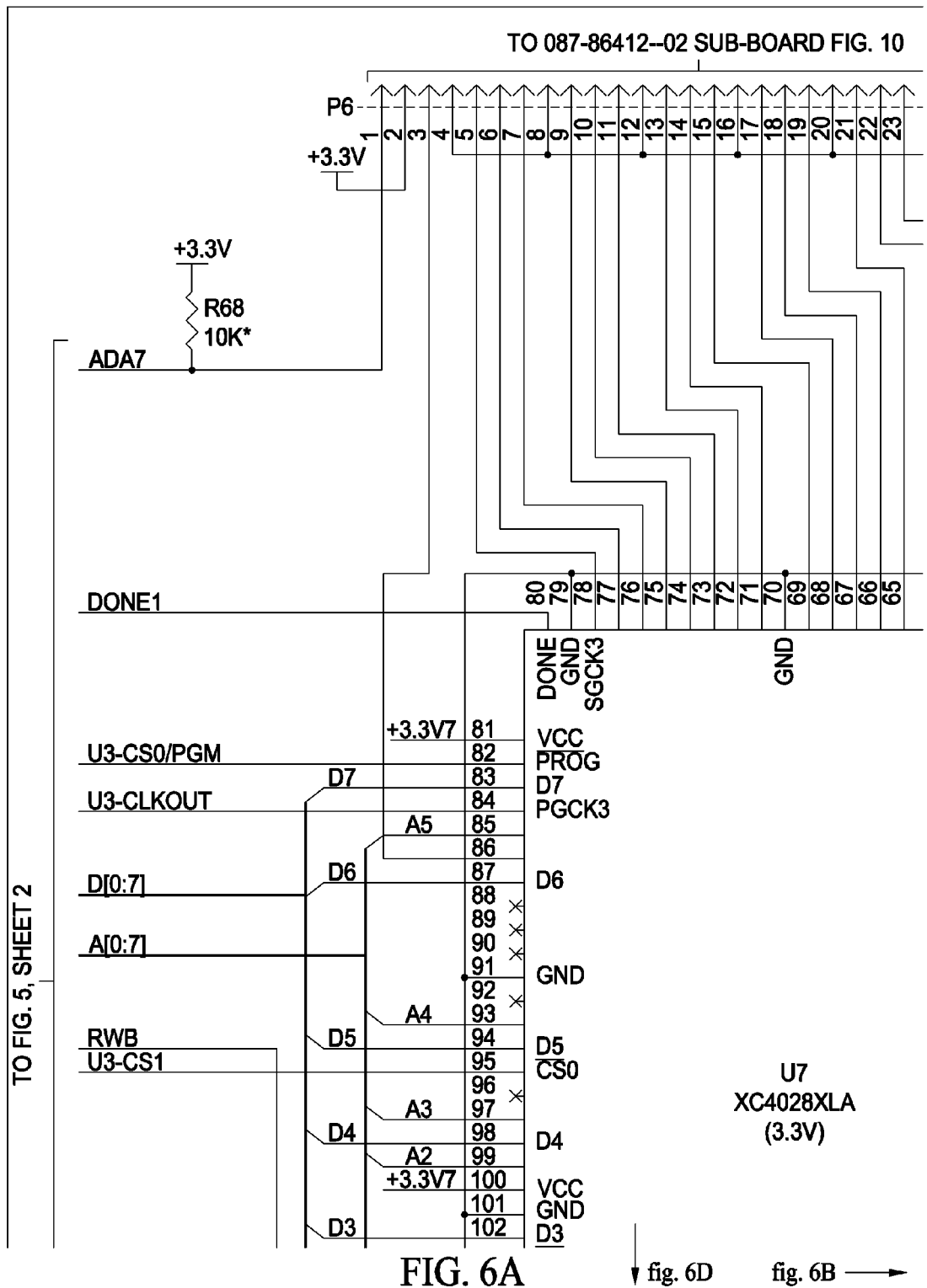
FIGS. 6A through 6F show a schematic for one implementation for the Video I/O shown in FIG. 4.
Figure 6B:
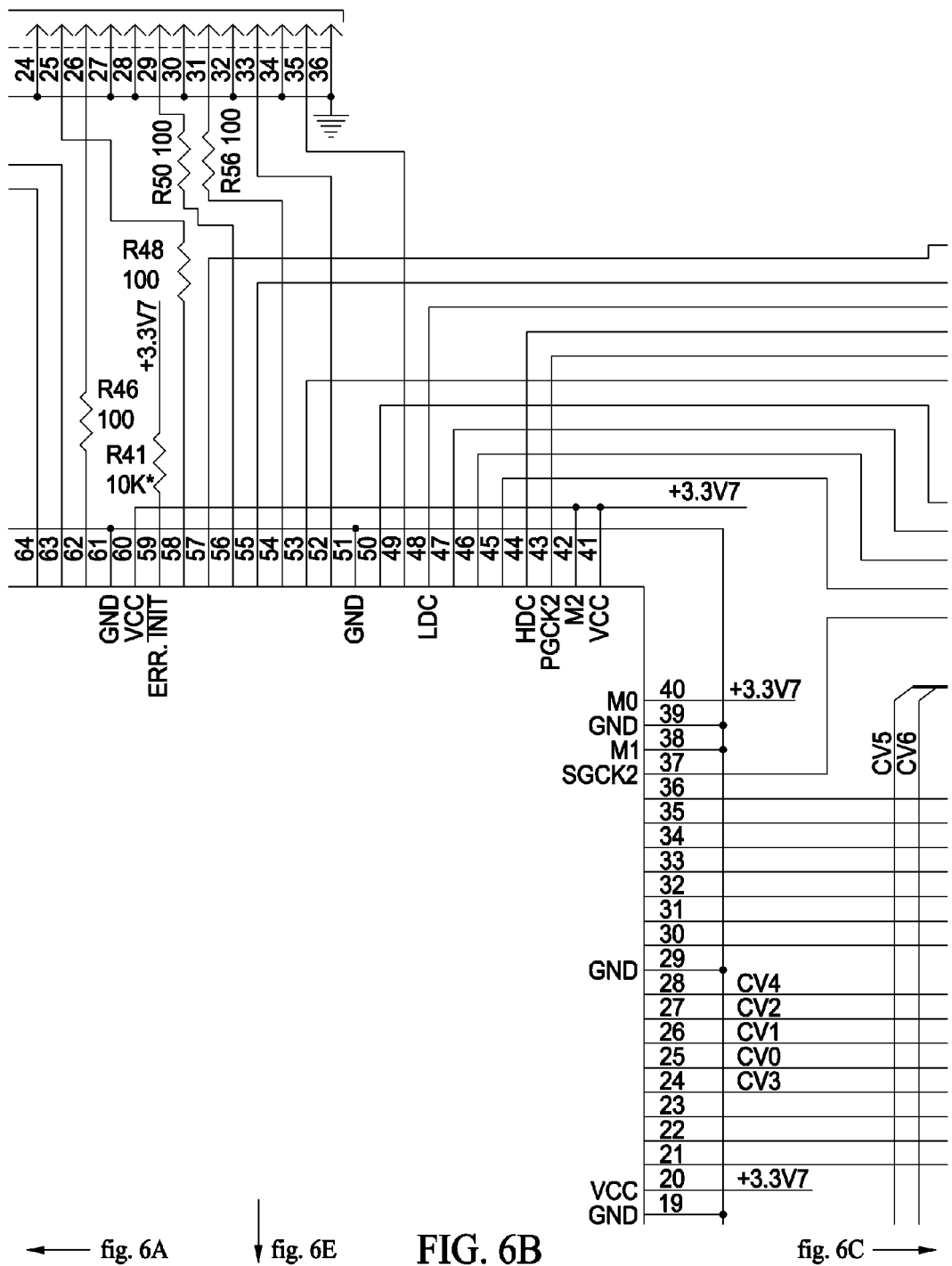
Figure 6C:
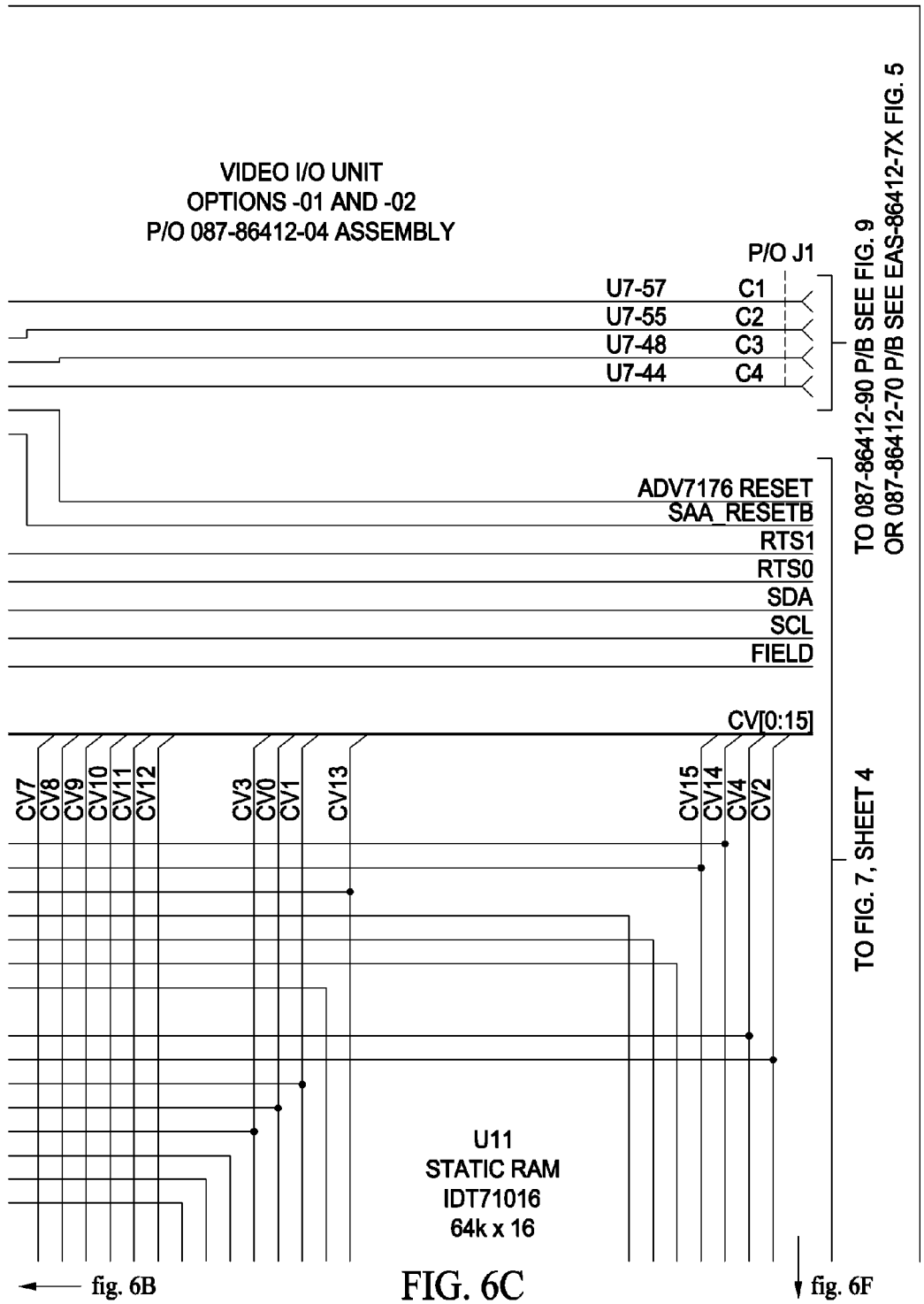
Figure 6D:
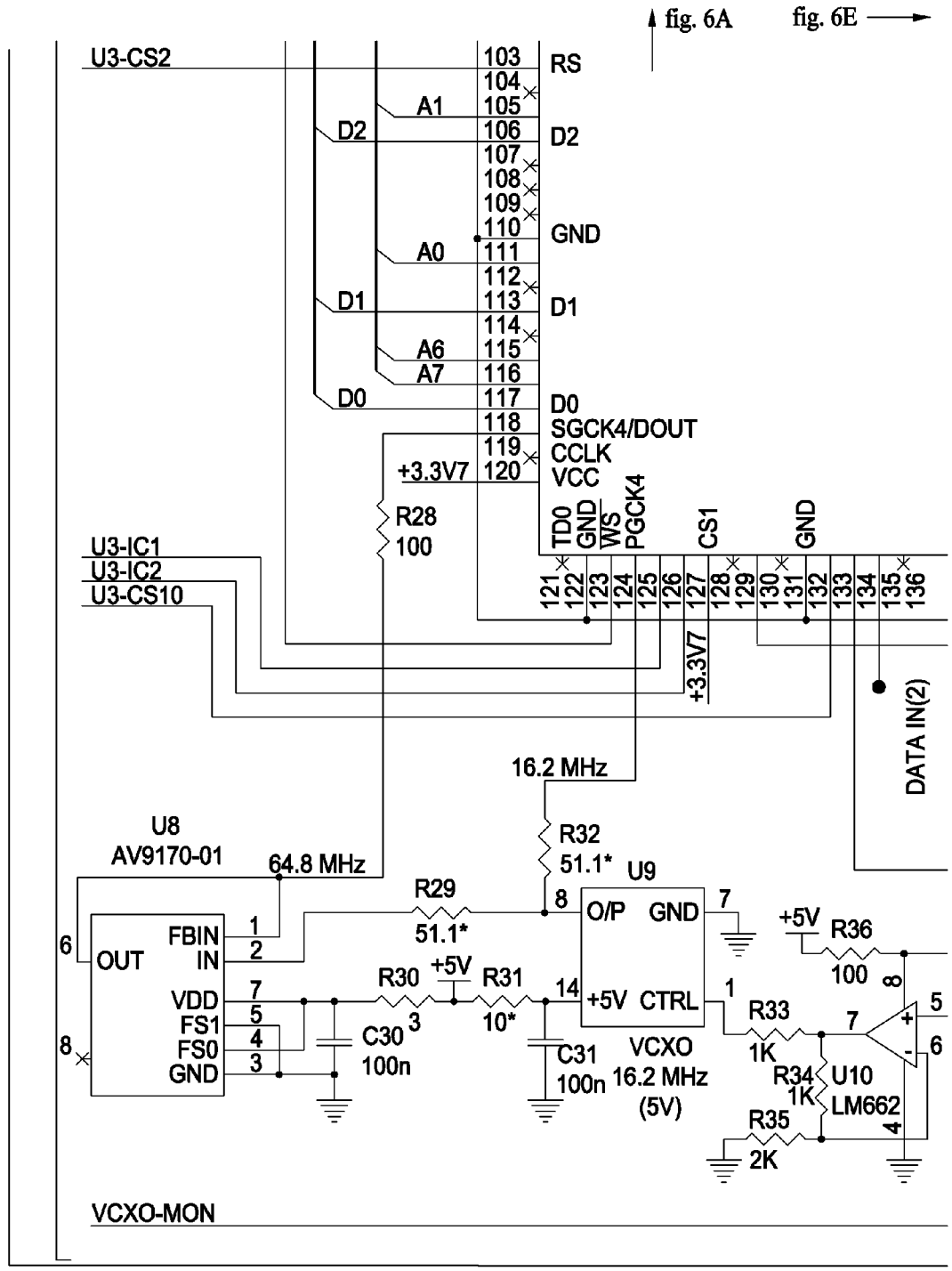
Figure 6E:
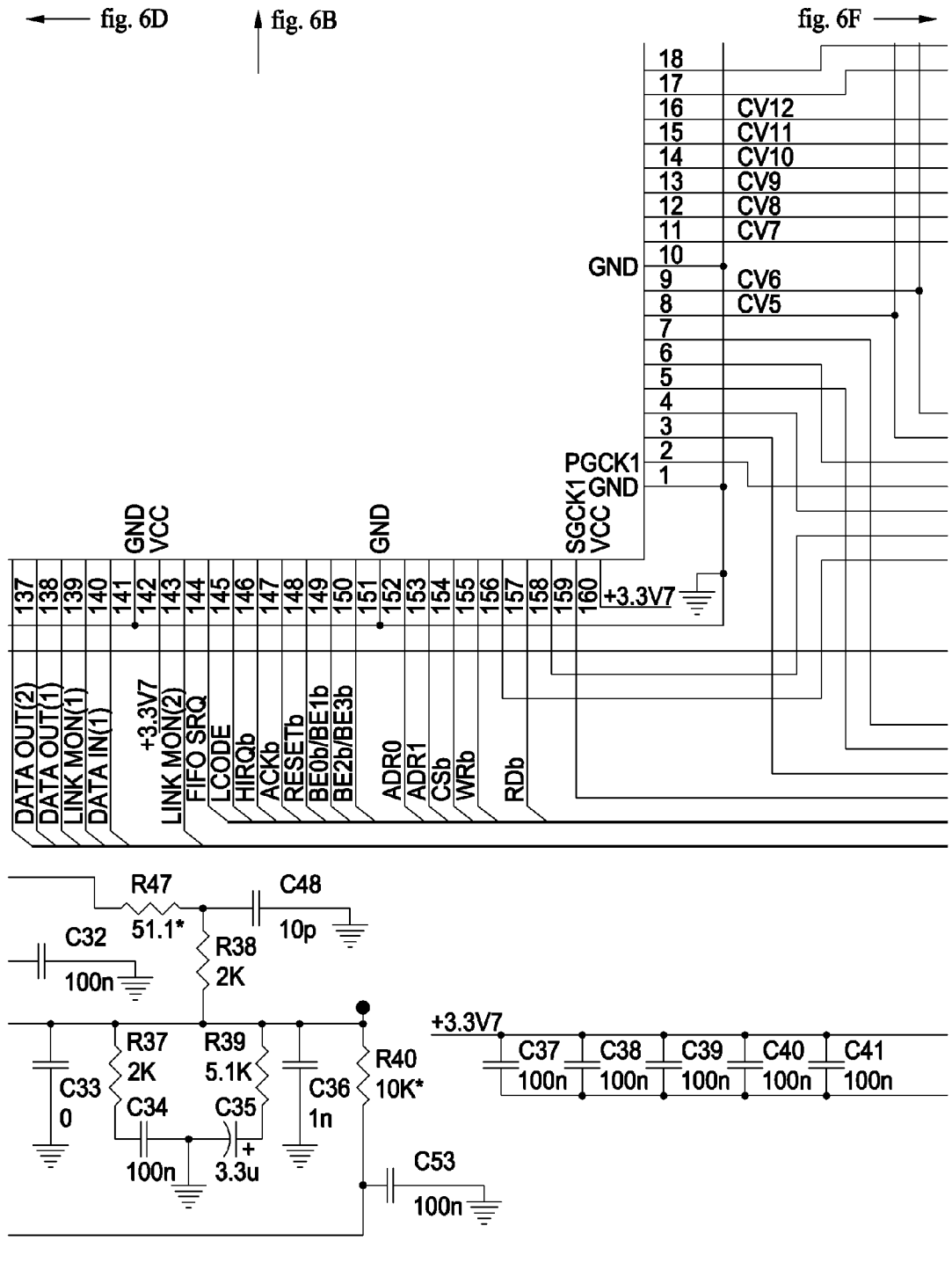
Figure 6F:
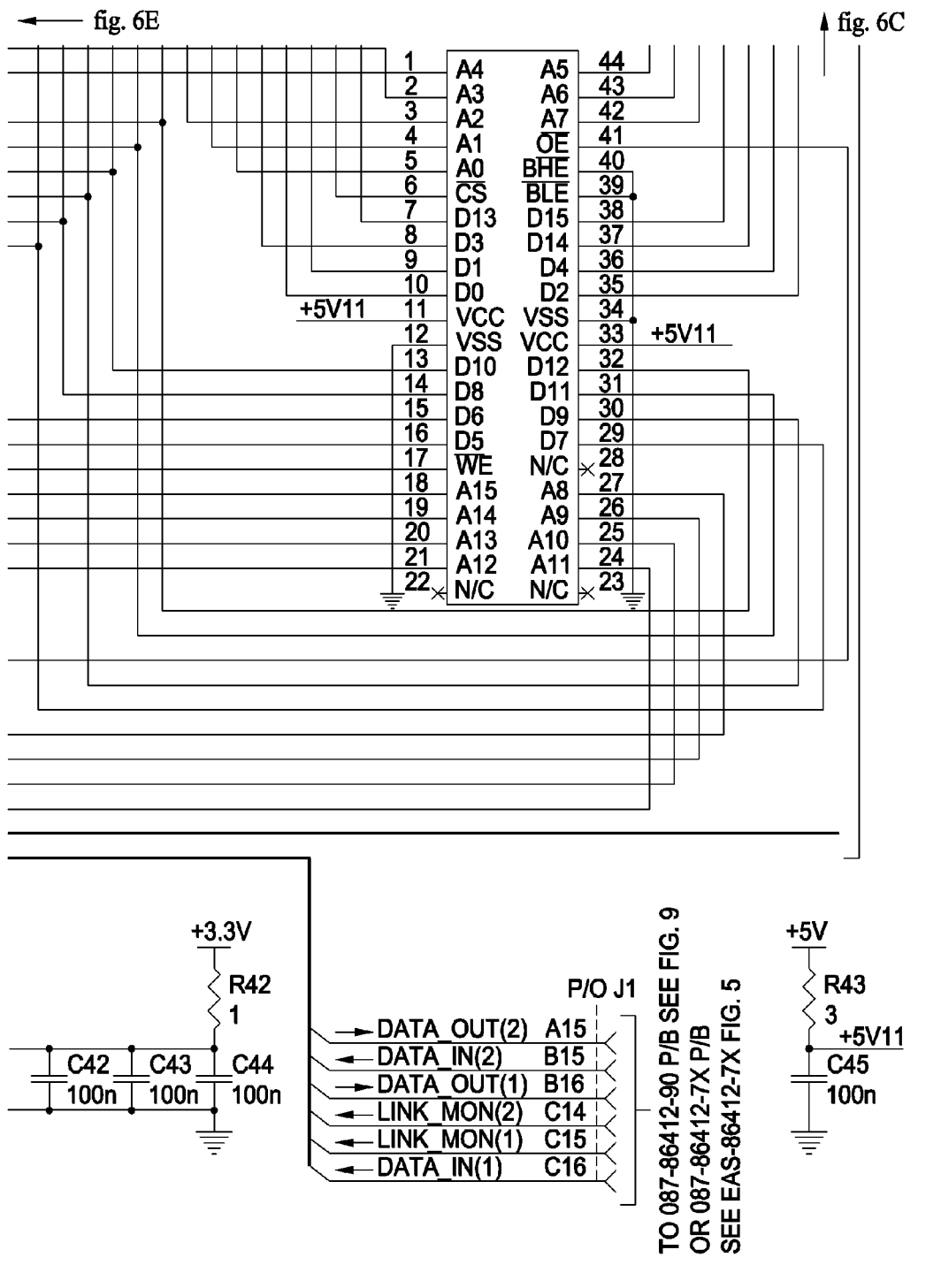
Figure 7A:
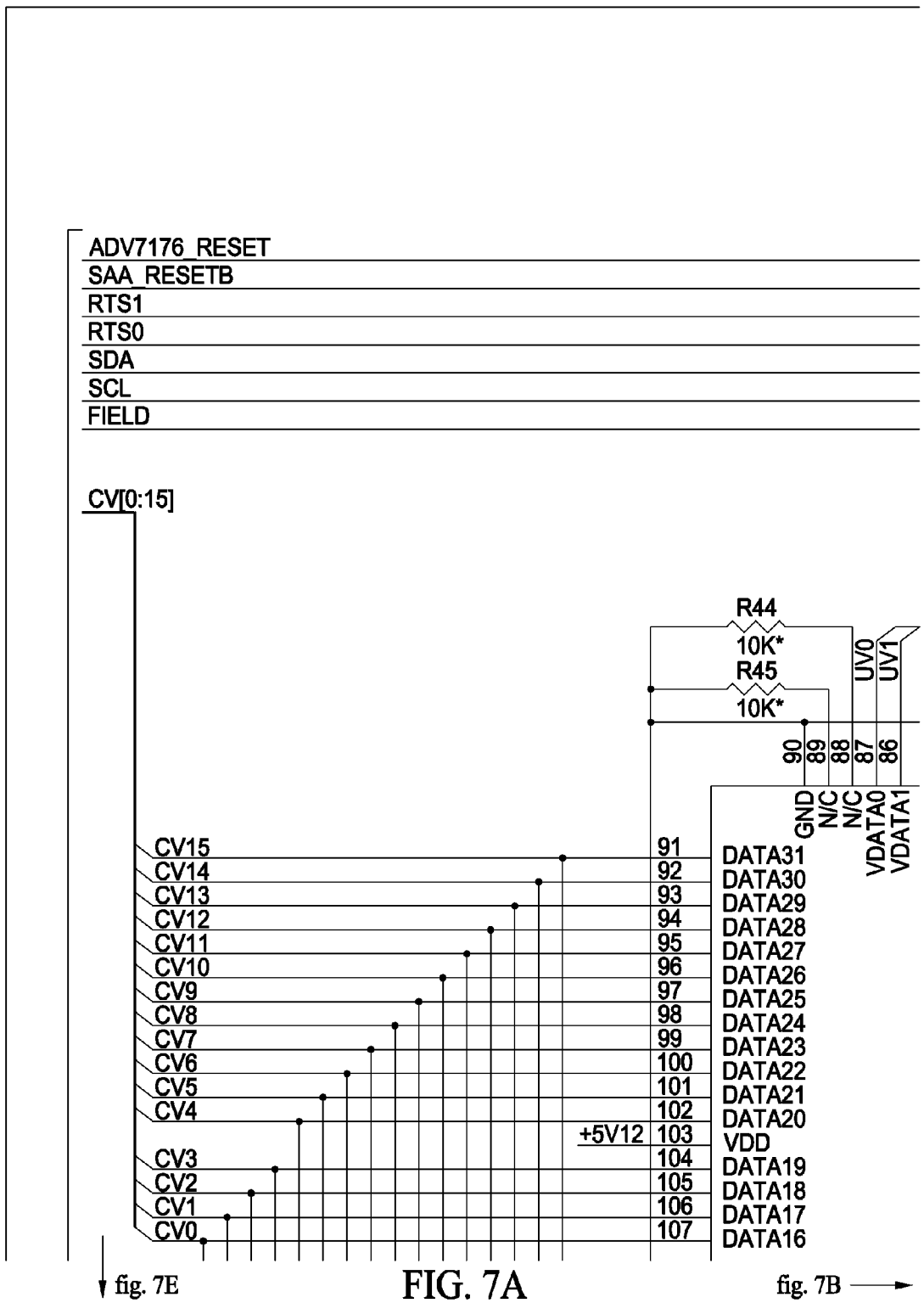
Figure 7C:
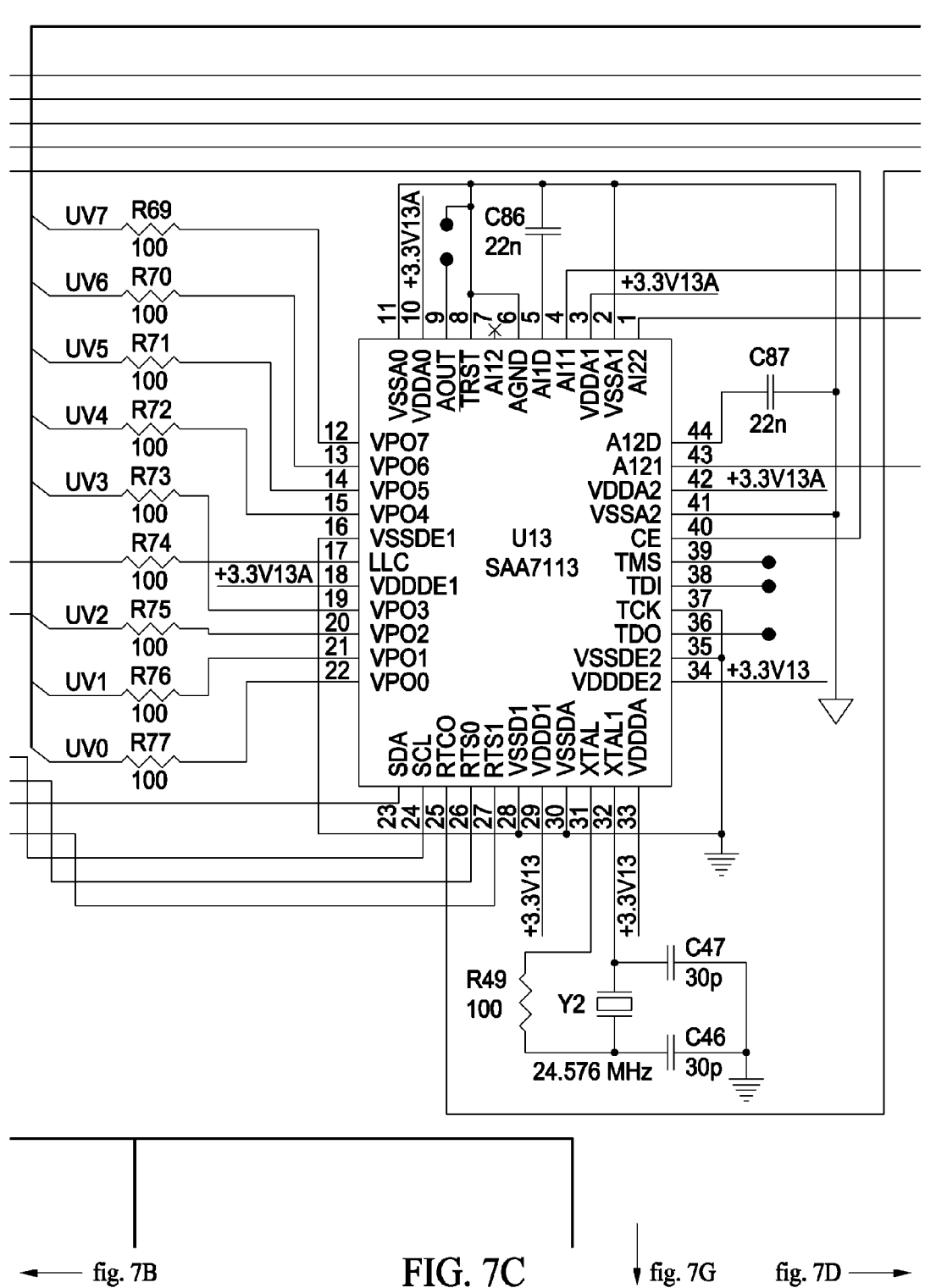
Figure 7D:
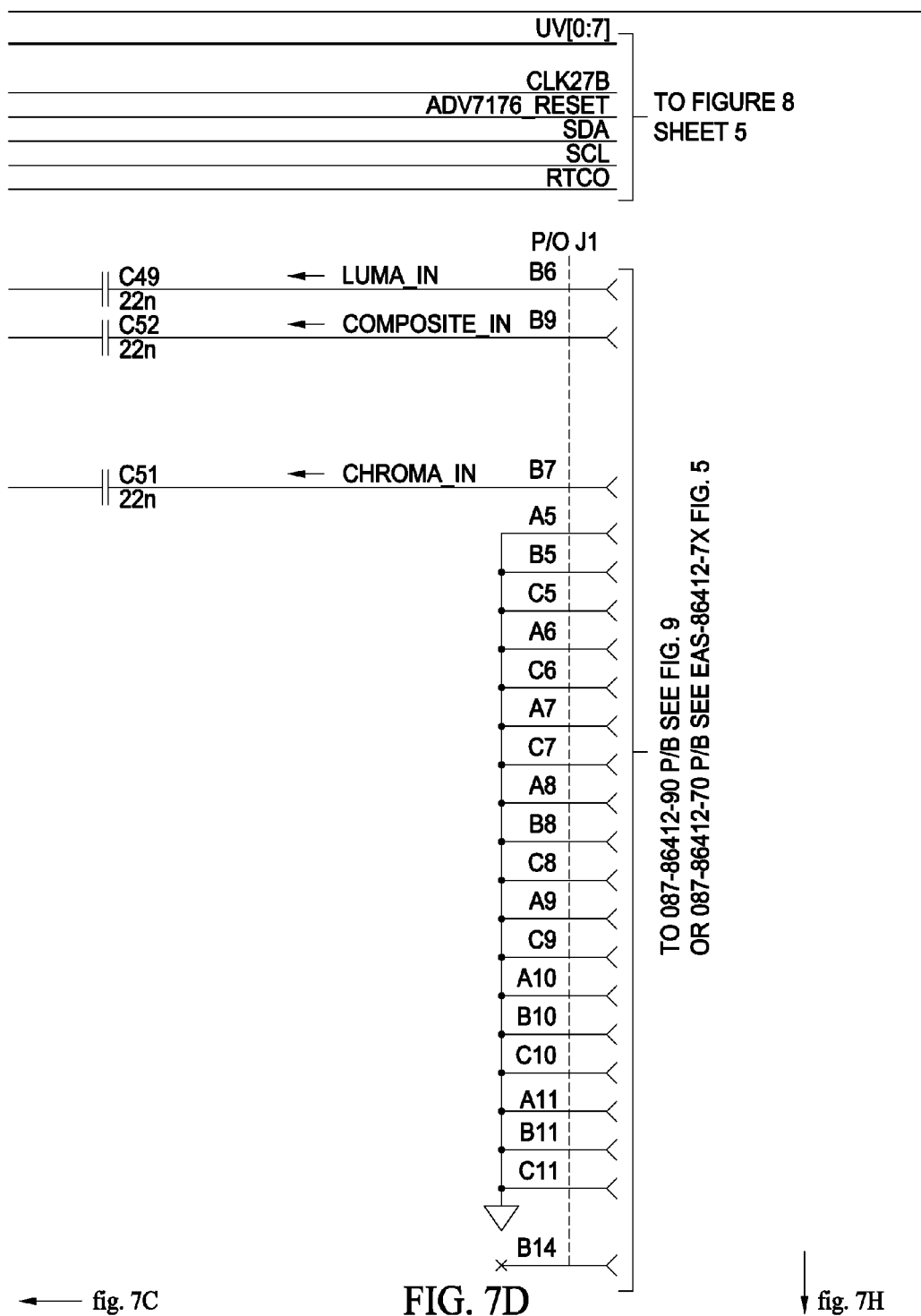
Figure 7E:
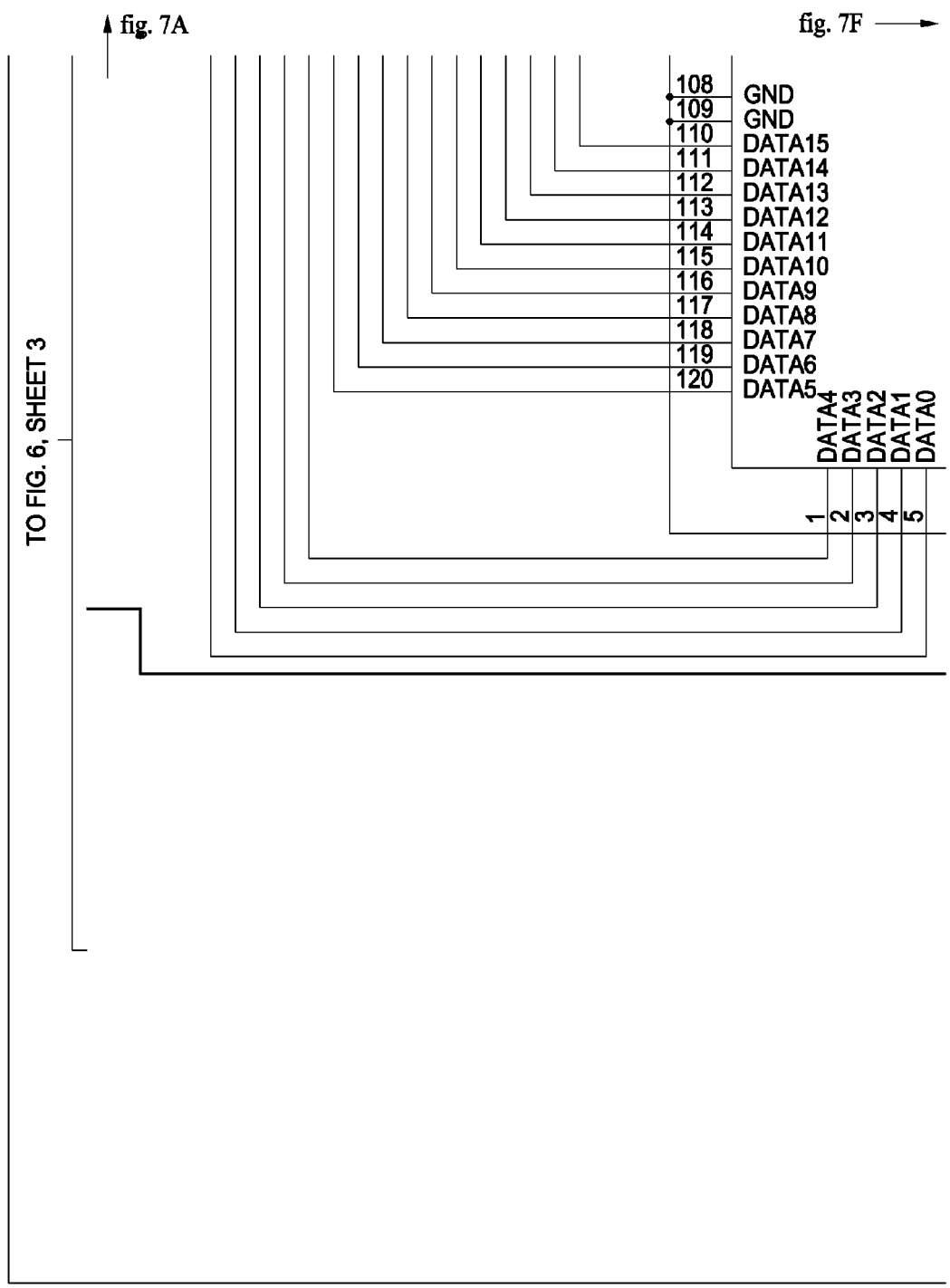
Figure 7F:
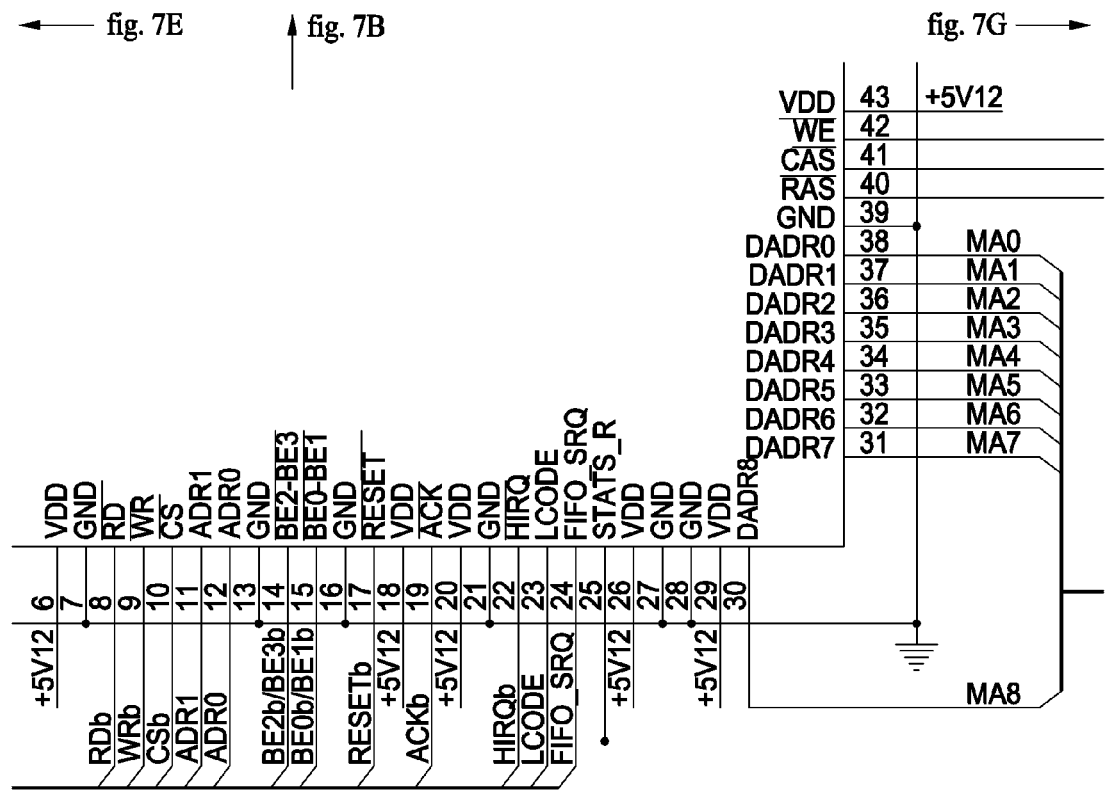
Figure 8A:
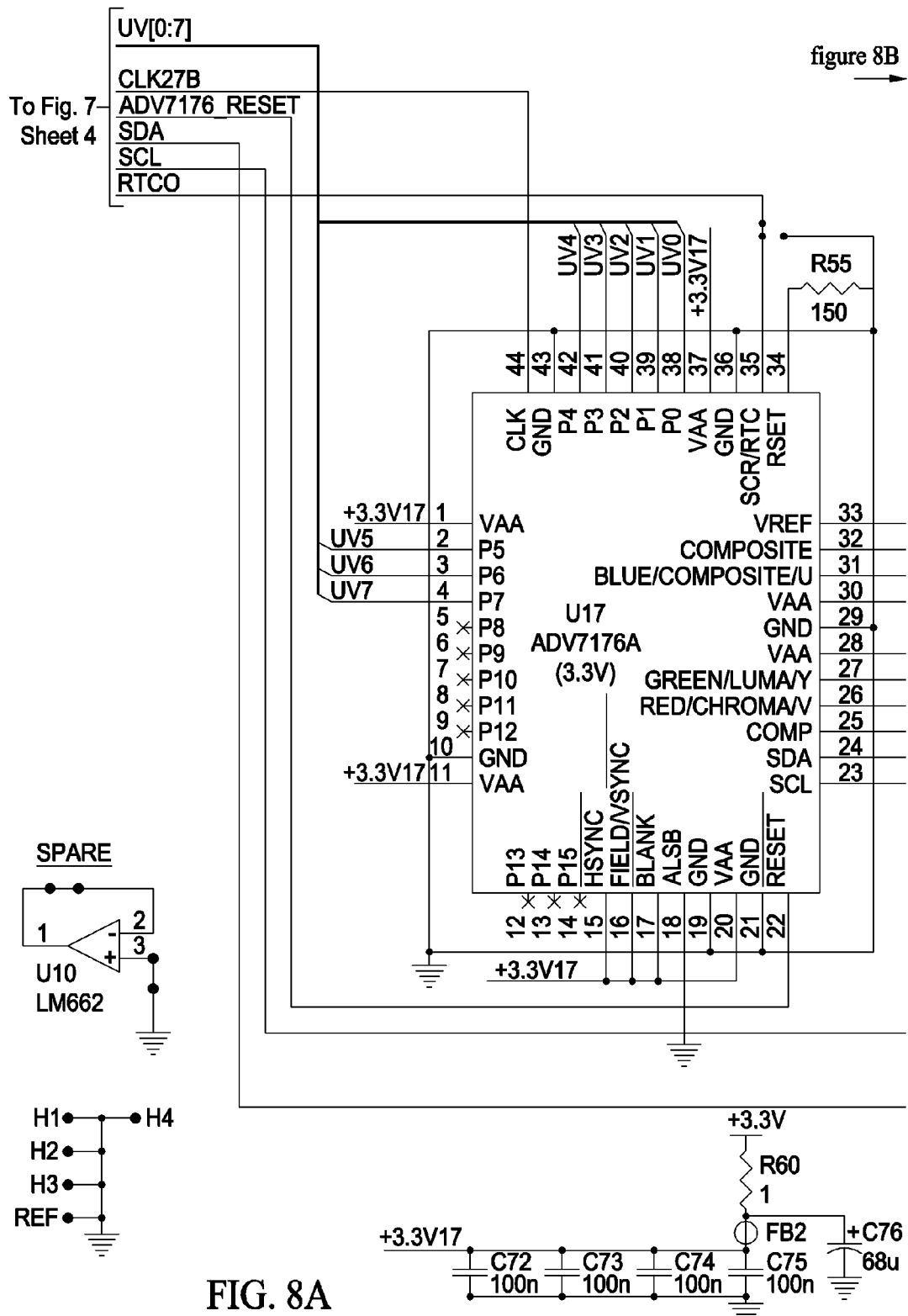
FIGS. 8A through 8B show a schematic for one implementation for the Video I/O shown in FIG. 4.
Figure 8B:
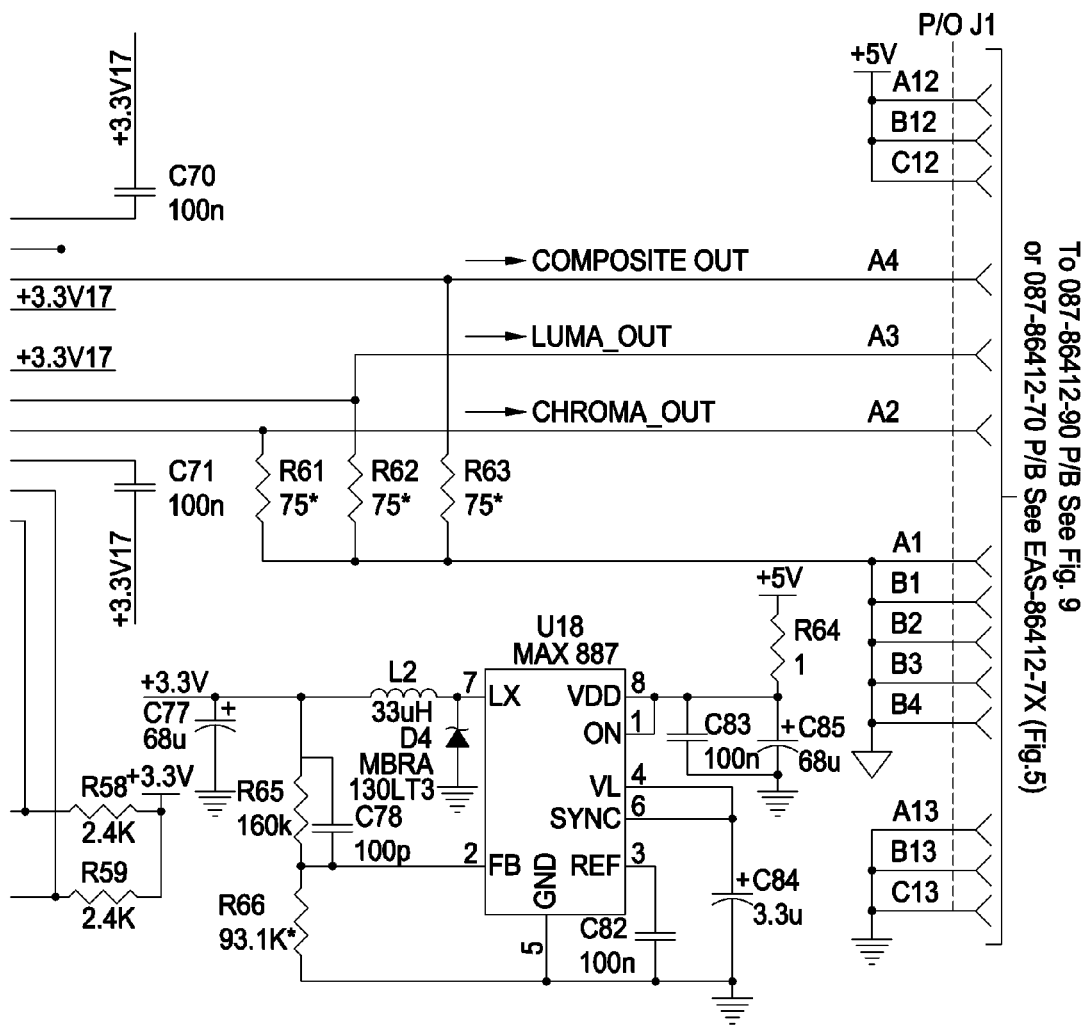
Figure 9A:
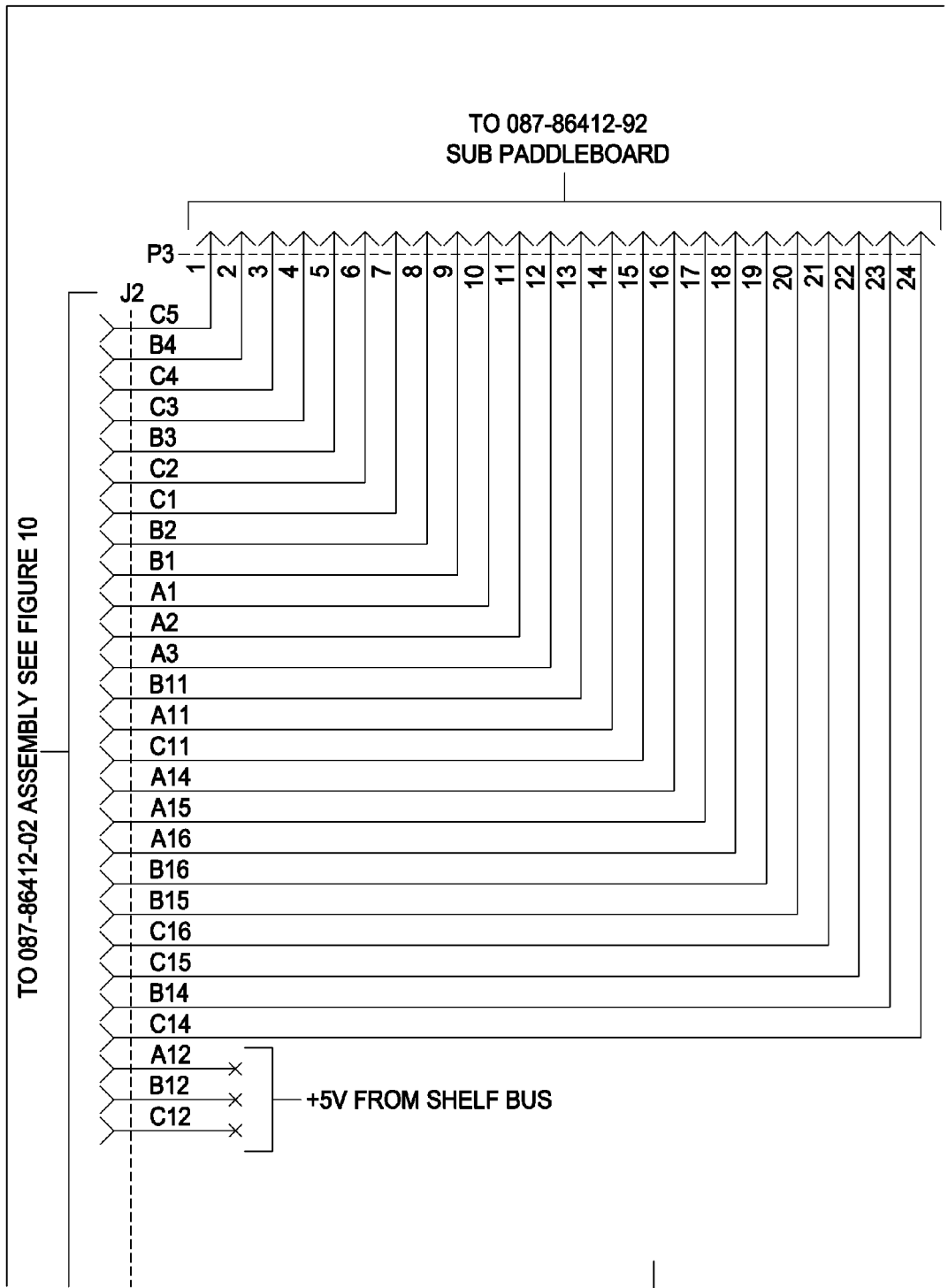
Figure 9D:
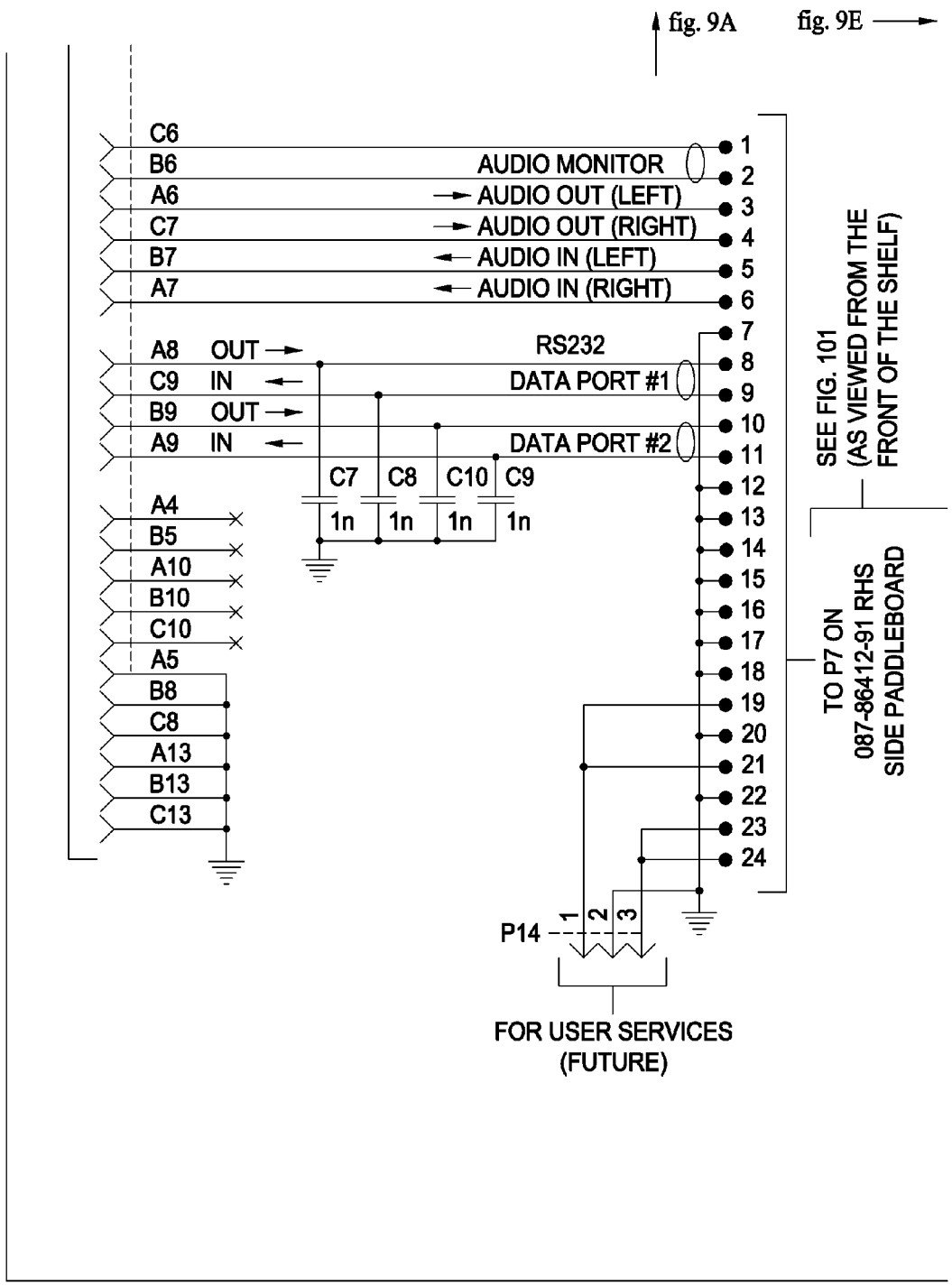
Figure 9E:
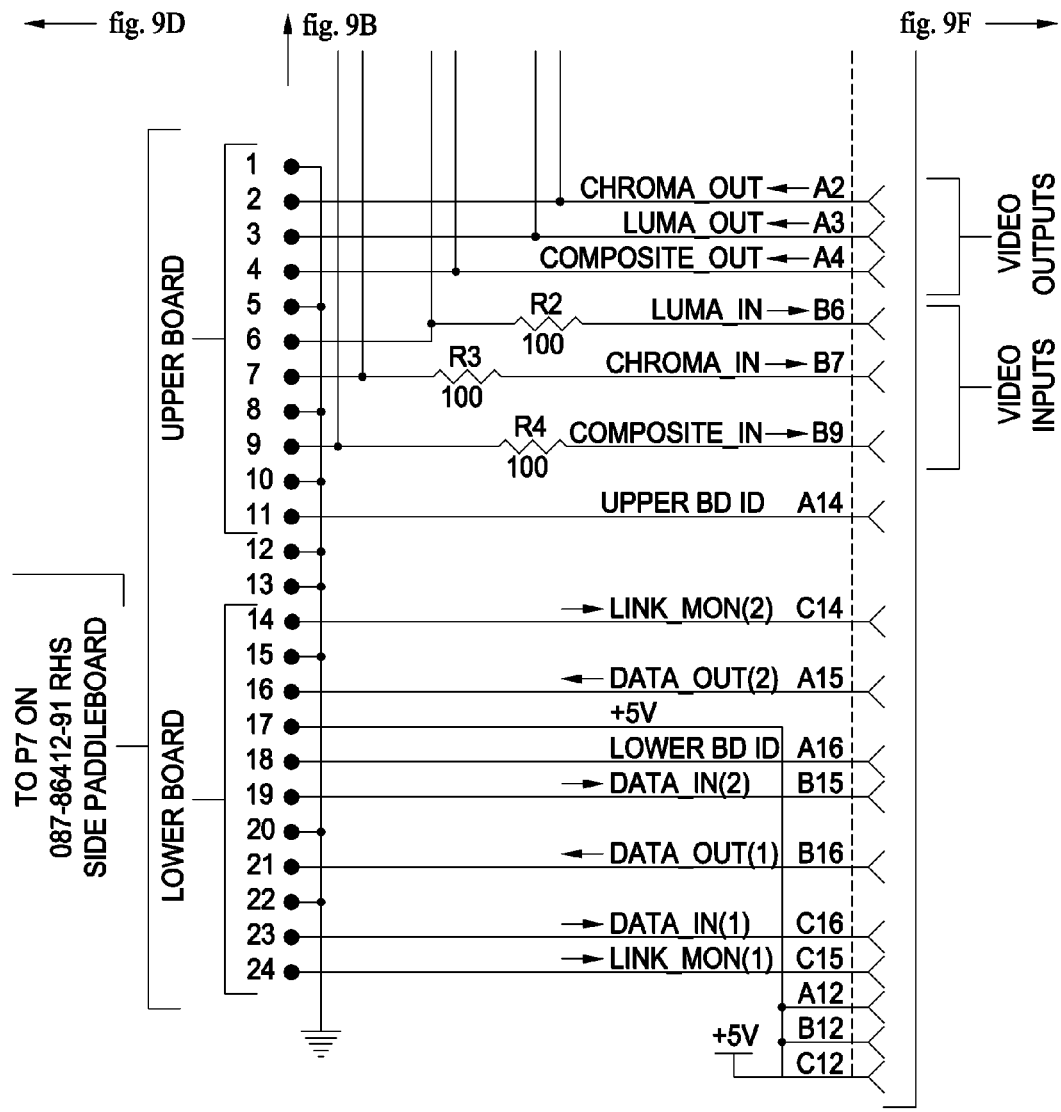
Figure 9F:
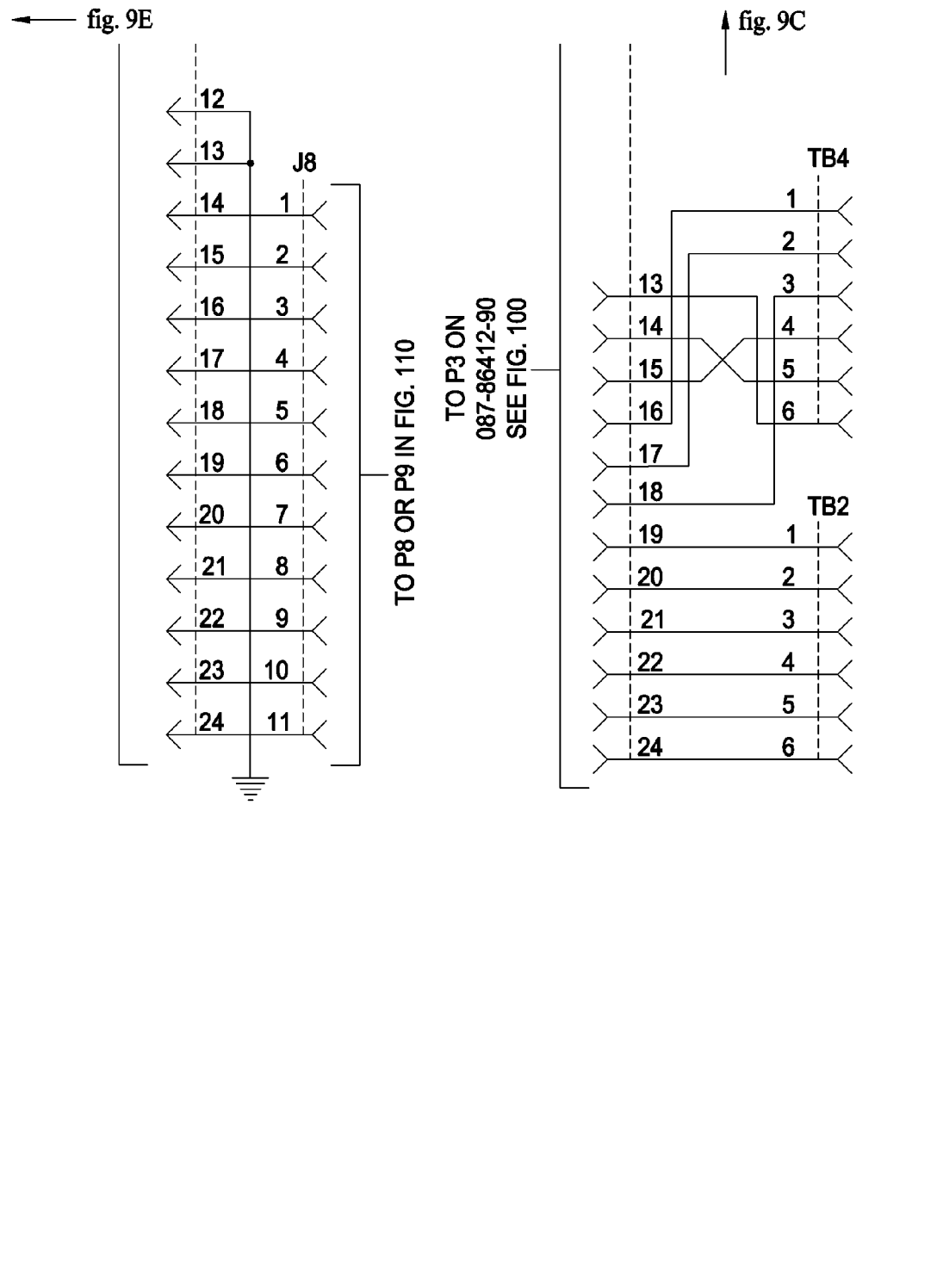
Figure 10A:
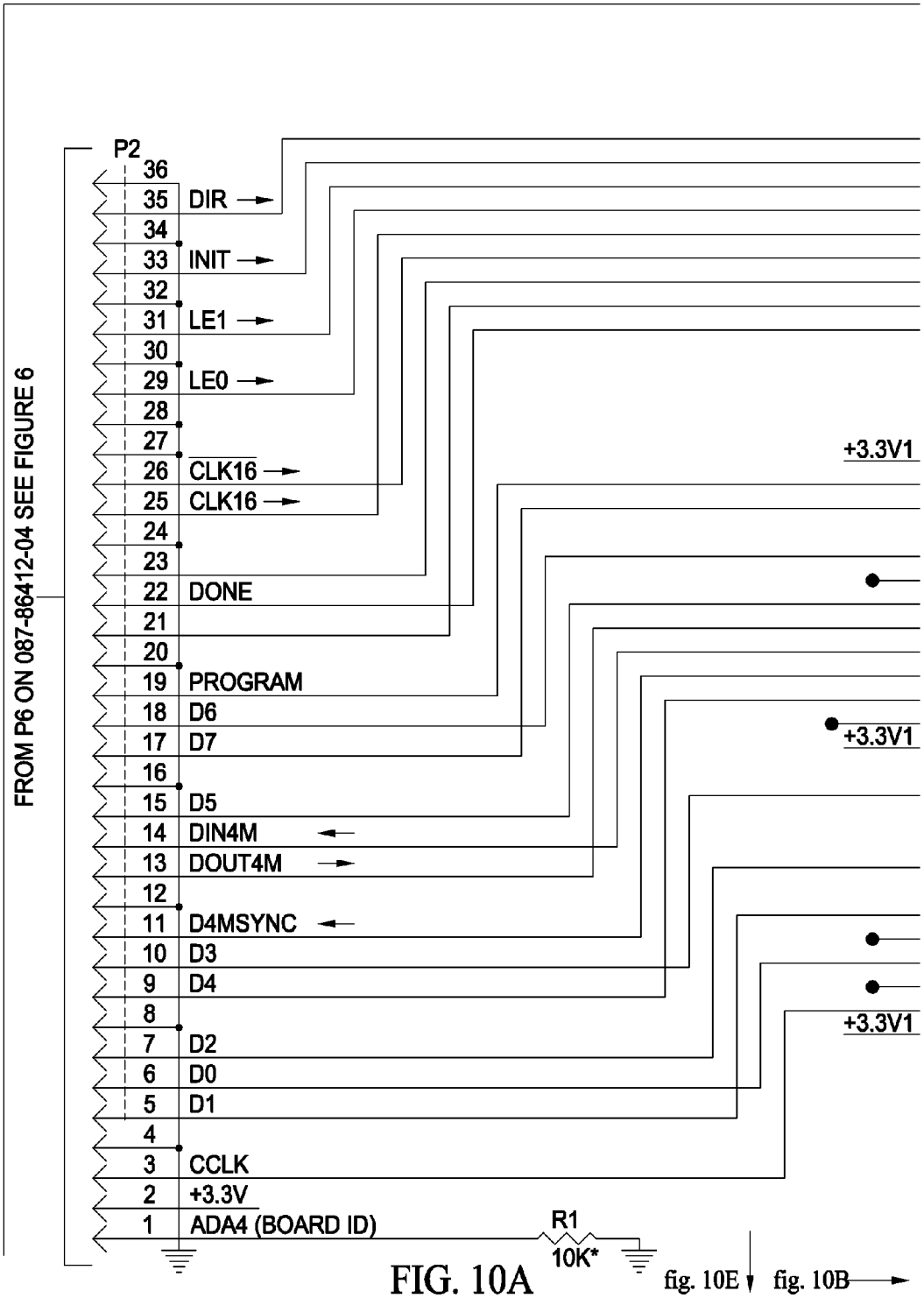
FIGS. 10A through 10H show a schematic for one implementation for the Video I/O shown in FIG. 4.
Figure 10B:
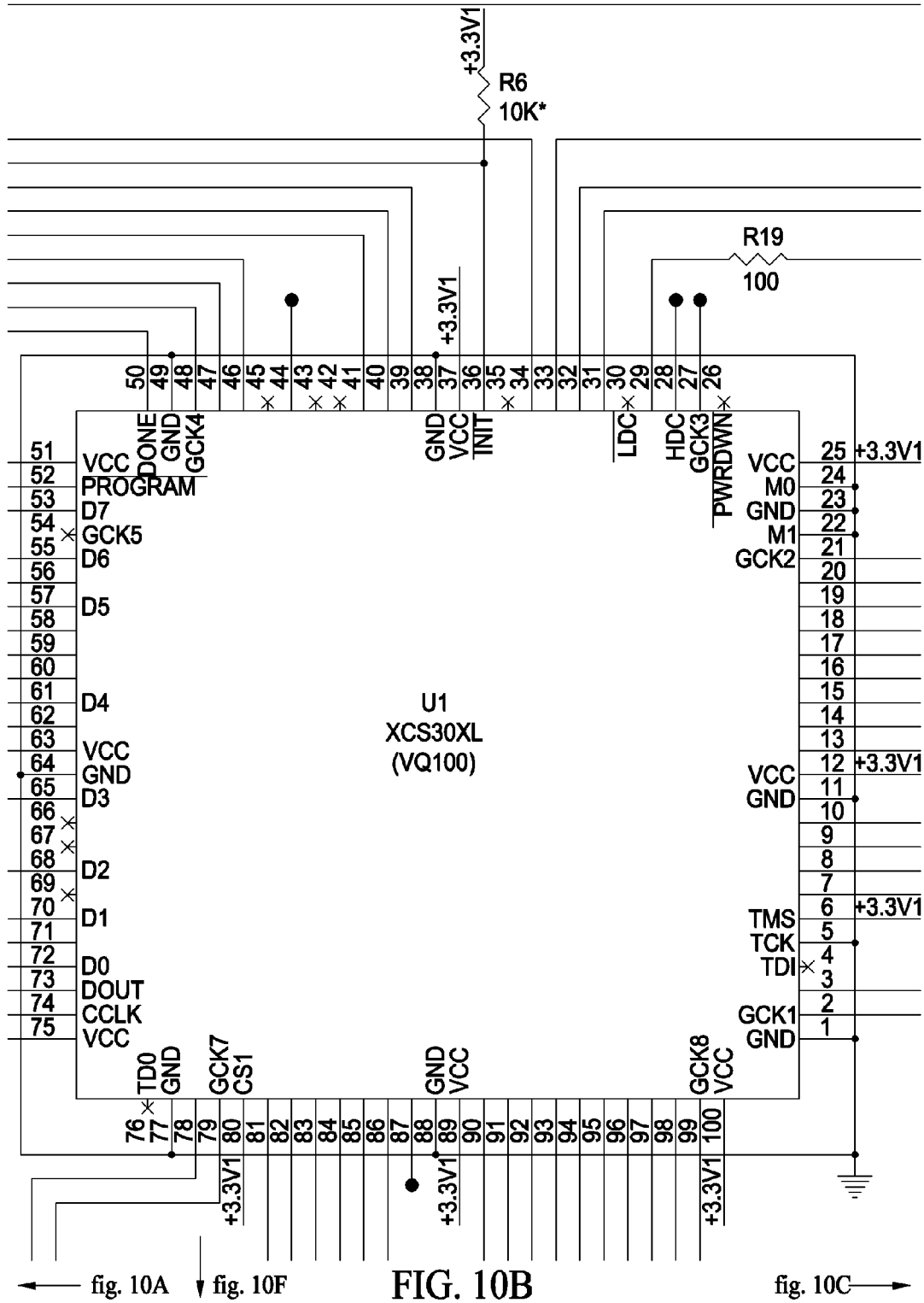
Figure 10C:
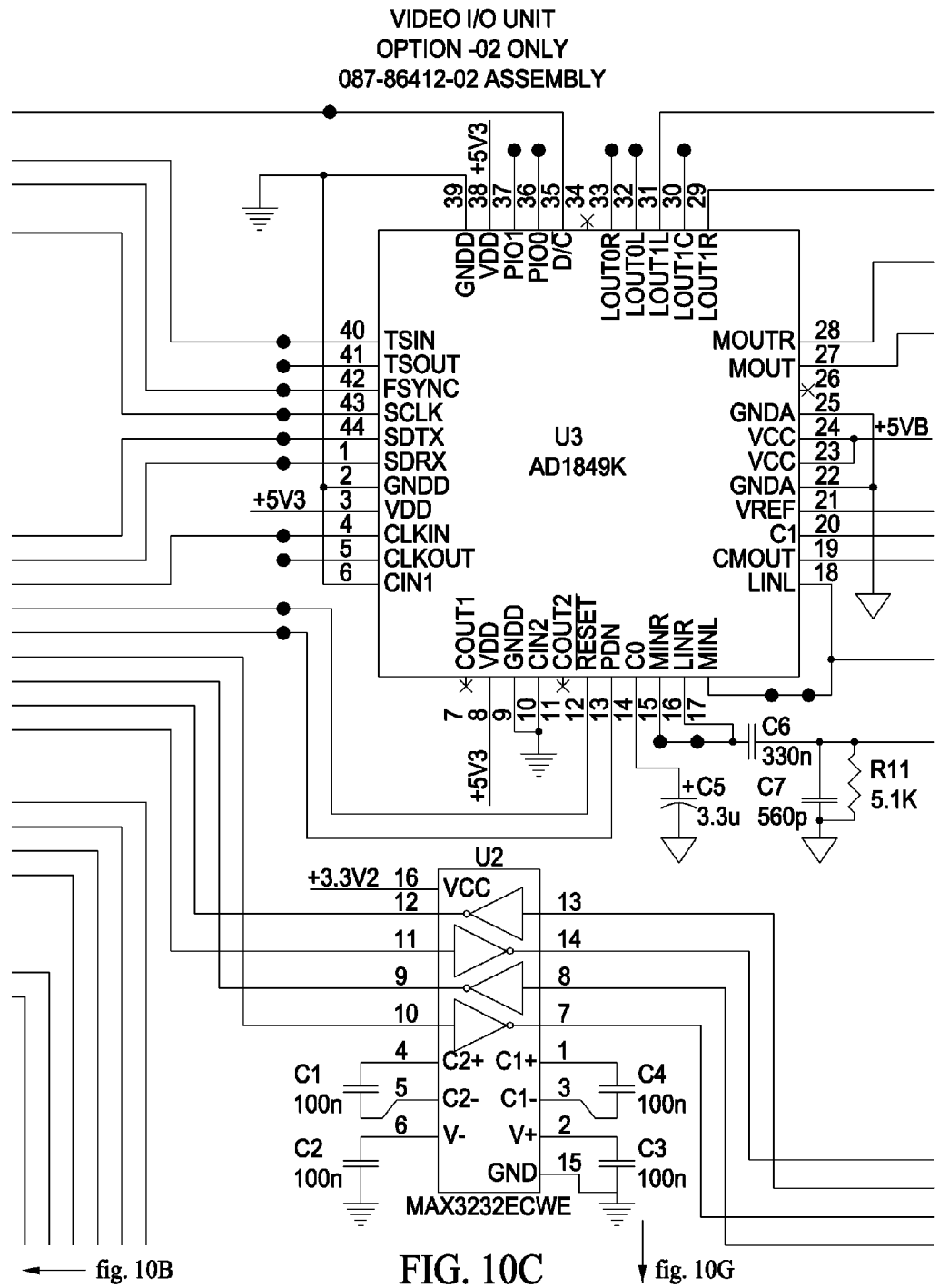
Figure 10D:
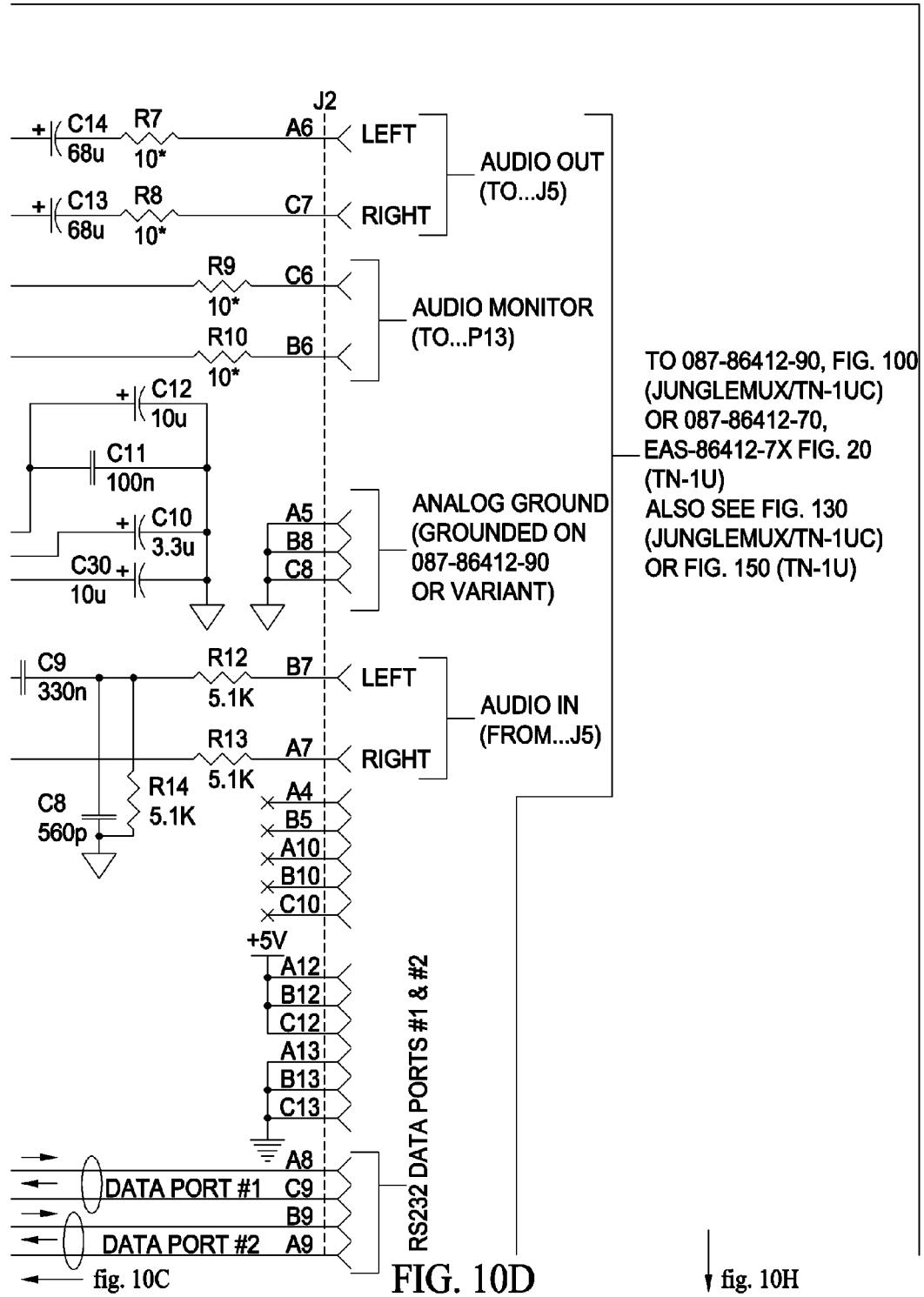
Figure 10E:
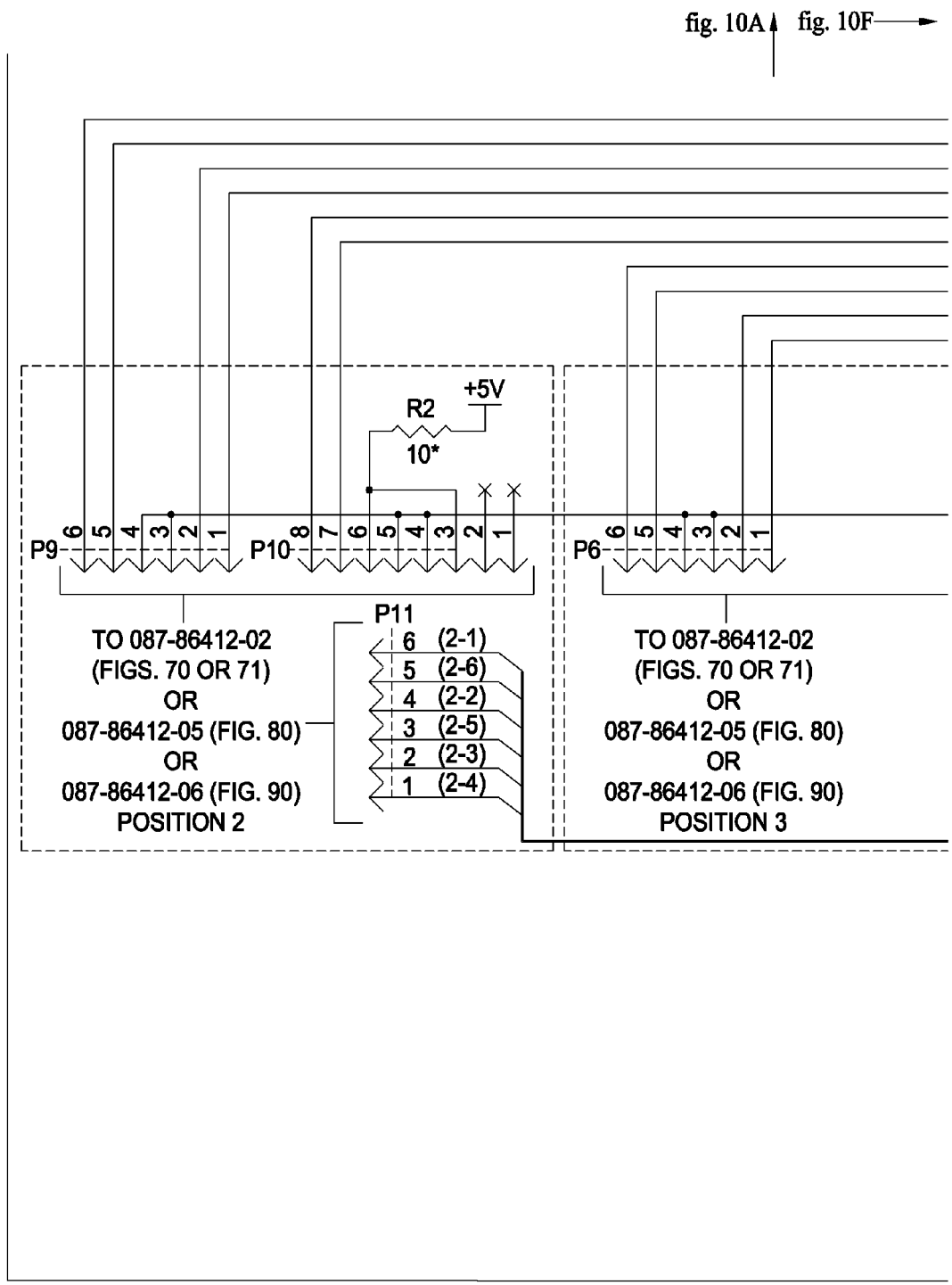
Figure 10F:
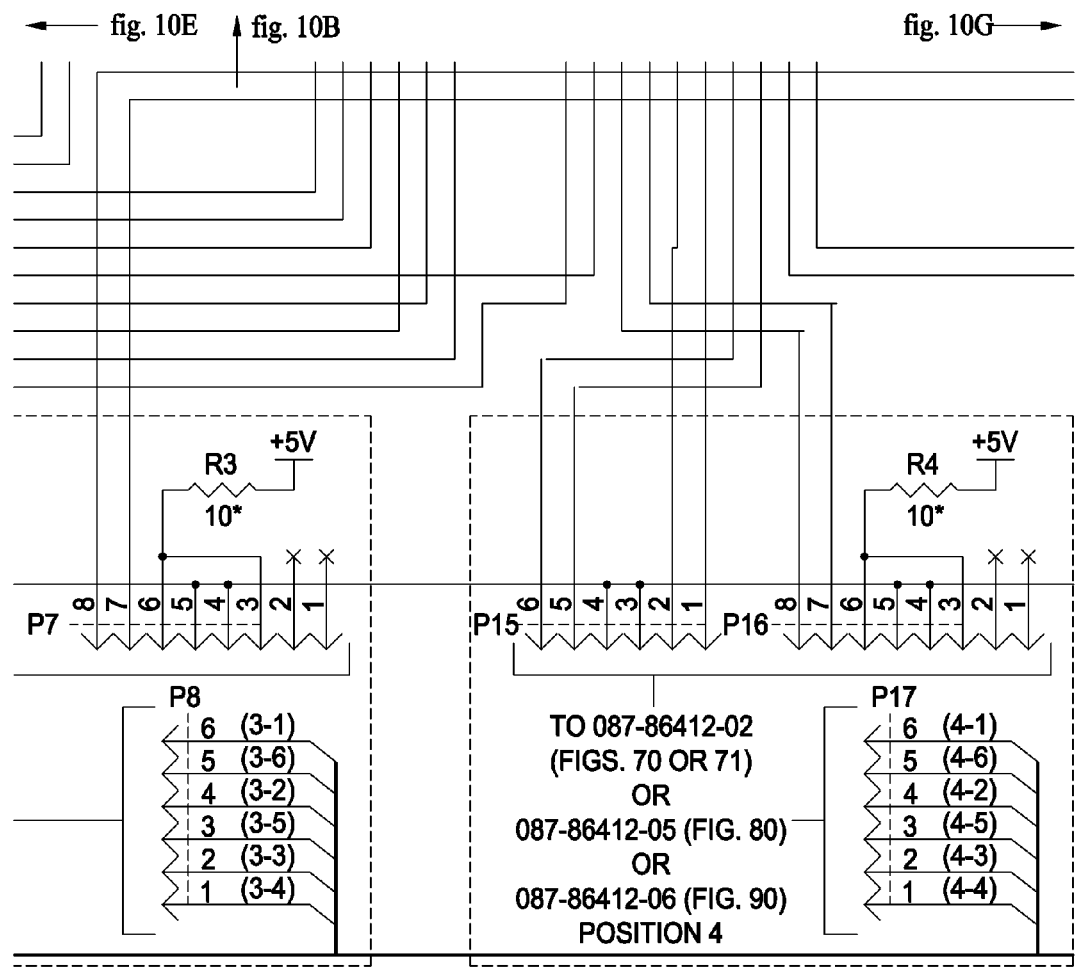
Figure 10G:
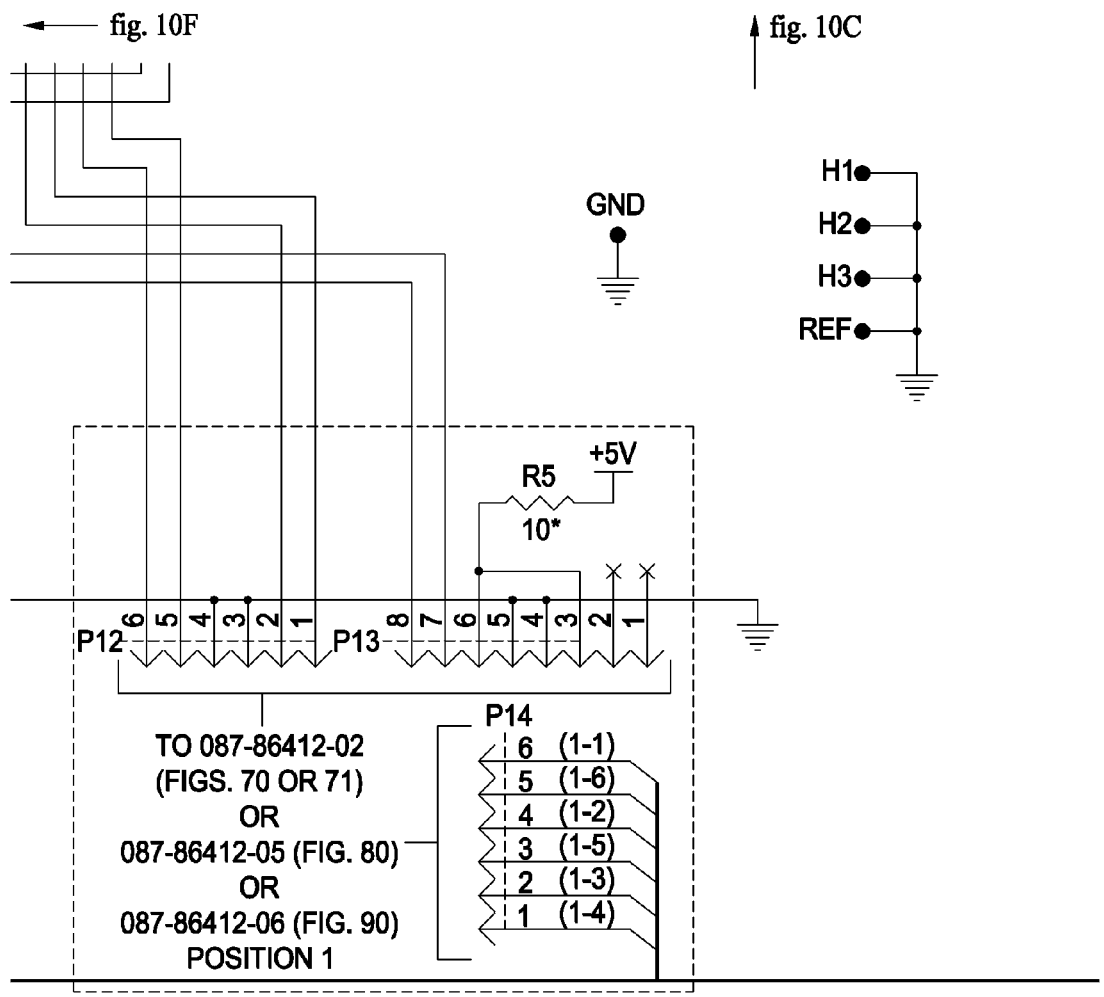
Figure 10H:
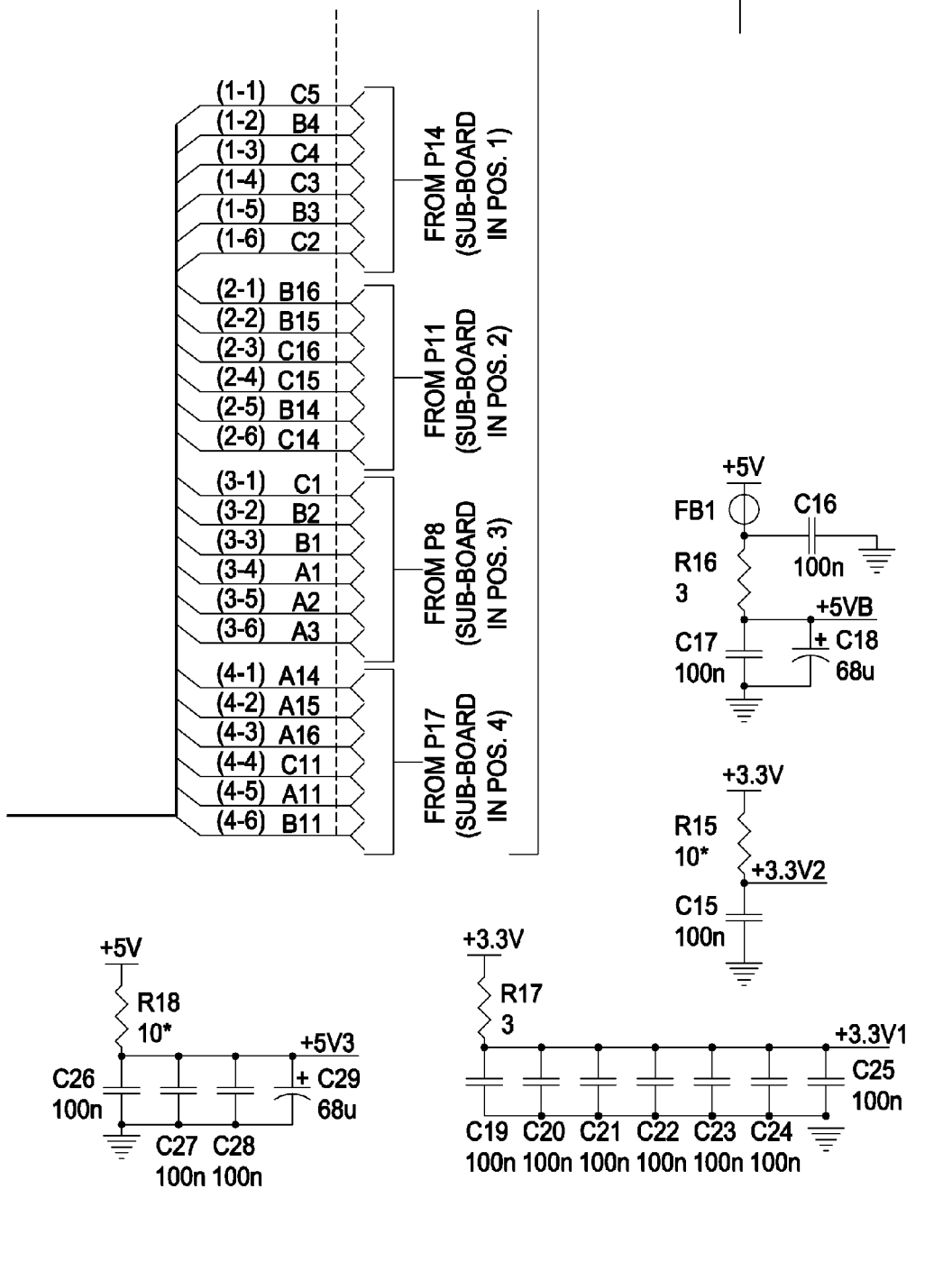
Figure 12A:
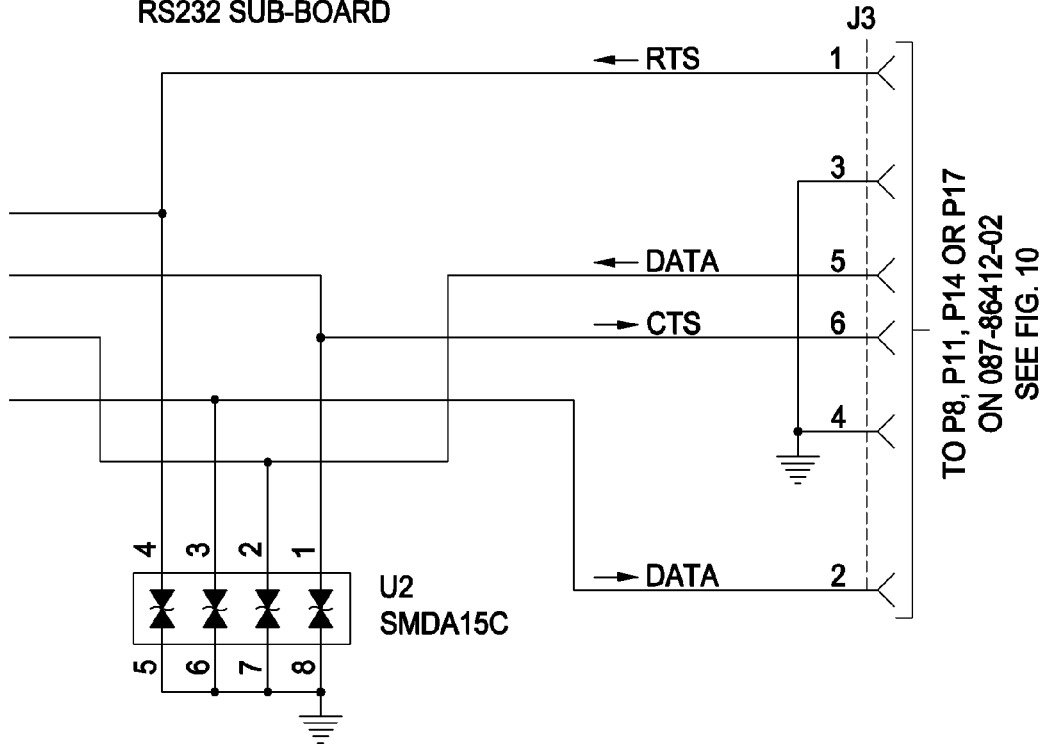
FIGS. 12A through 12C show a schematic for one implementation for the Video I/O shown in FIG. 4.
Figure 12B:
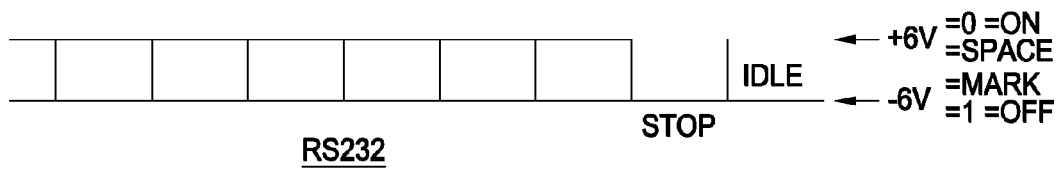
Figure 12C:
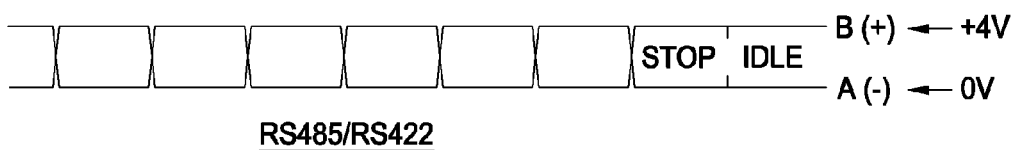
Figure 13A:
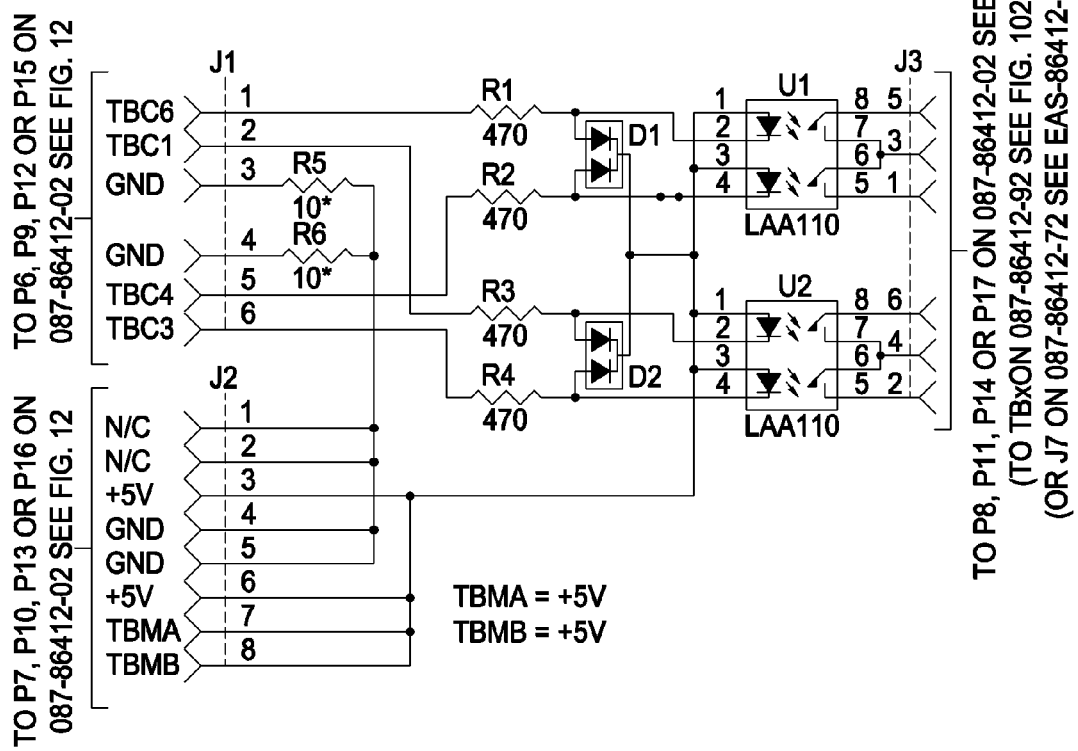
Figure 13B:
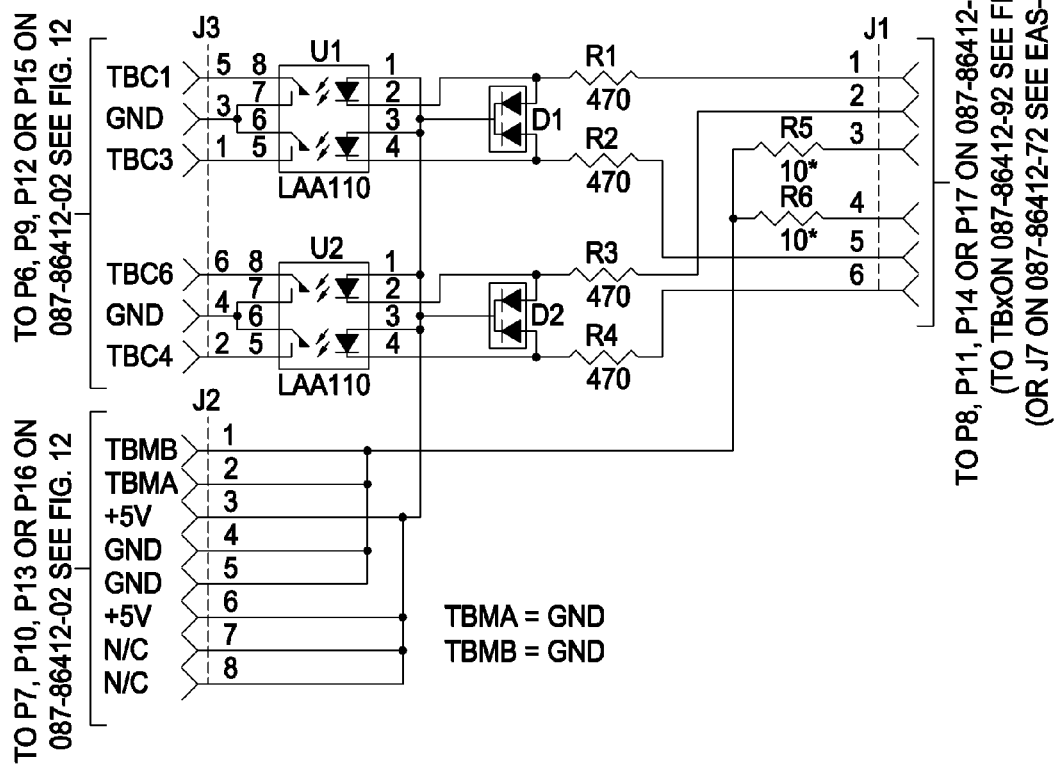
Figure 14A:
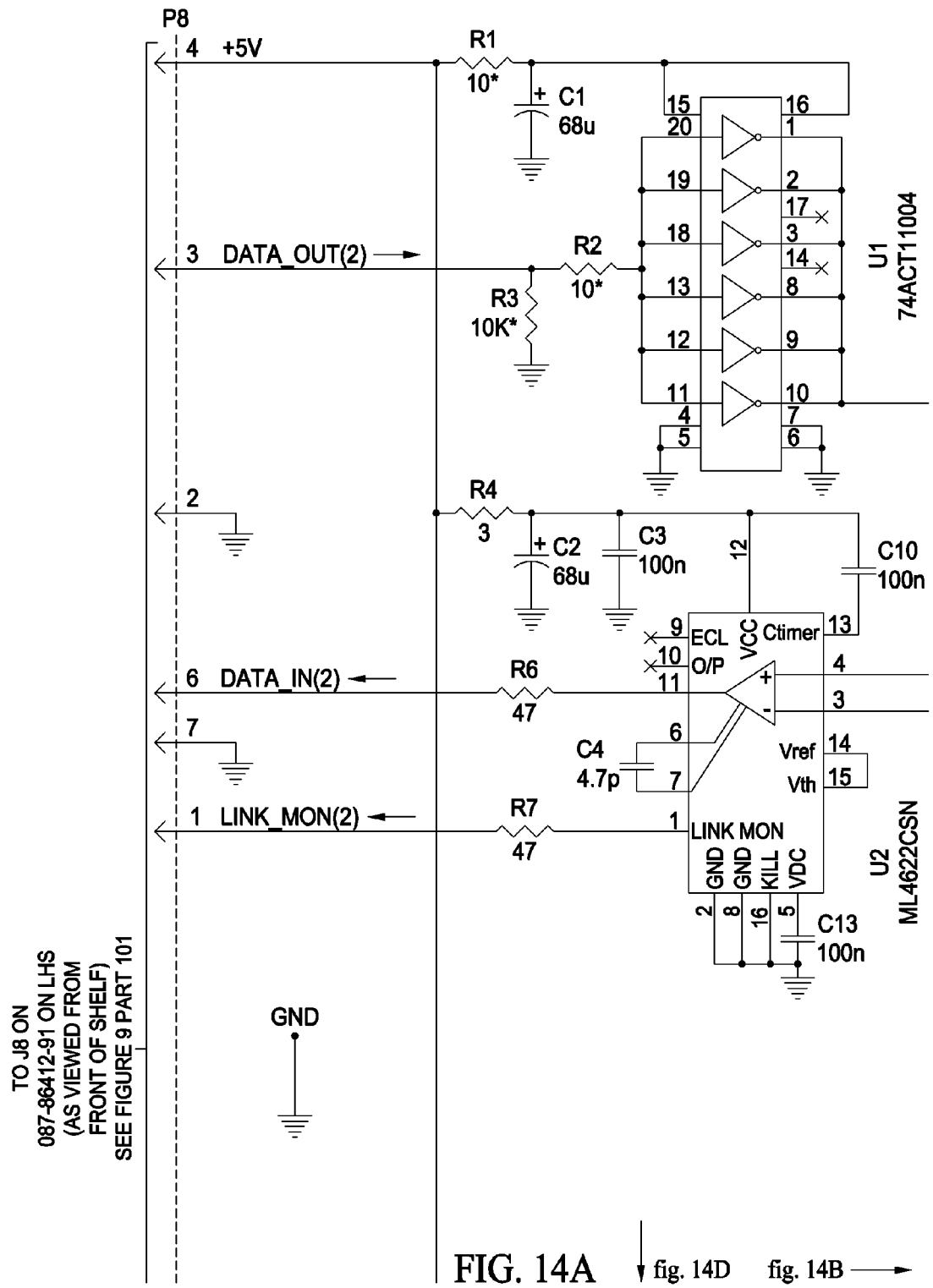
Figure 14B:
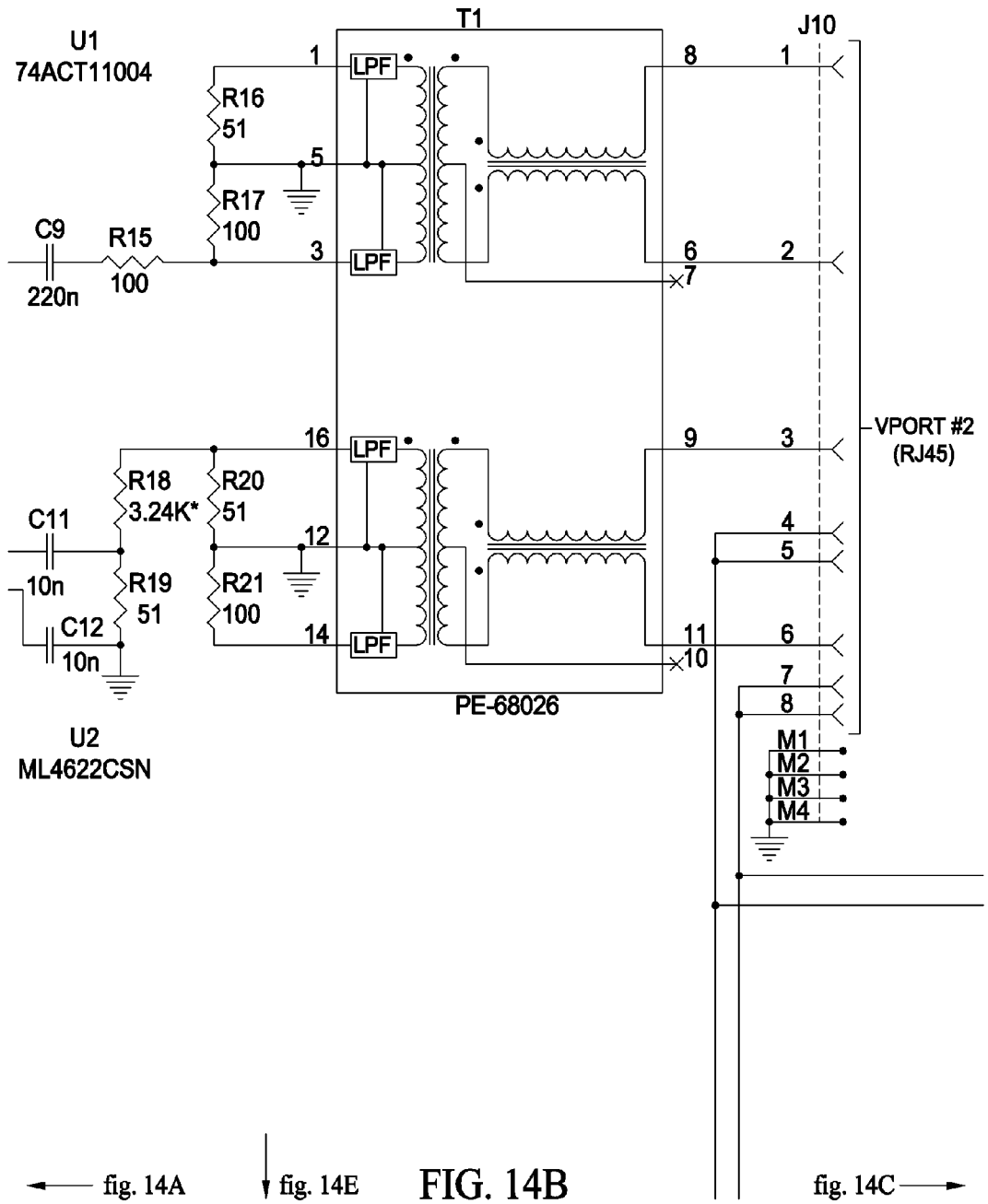
Figure 14D:
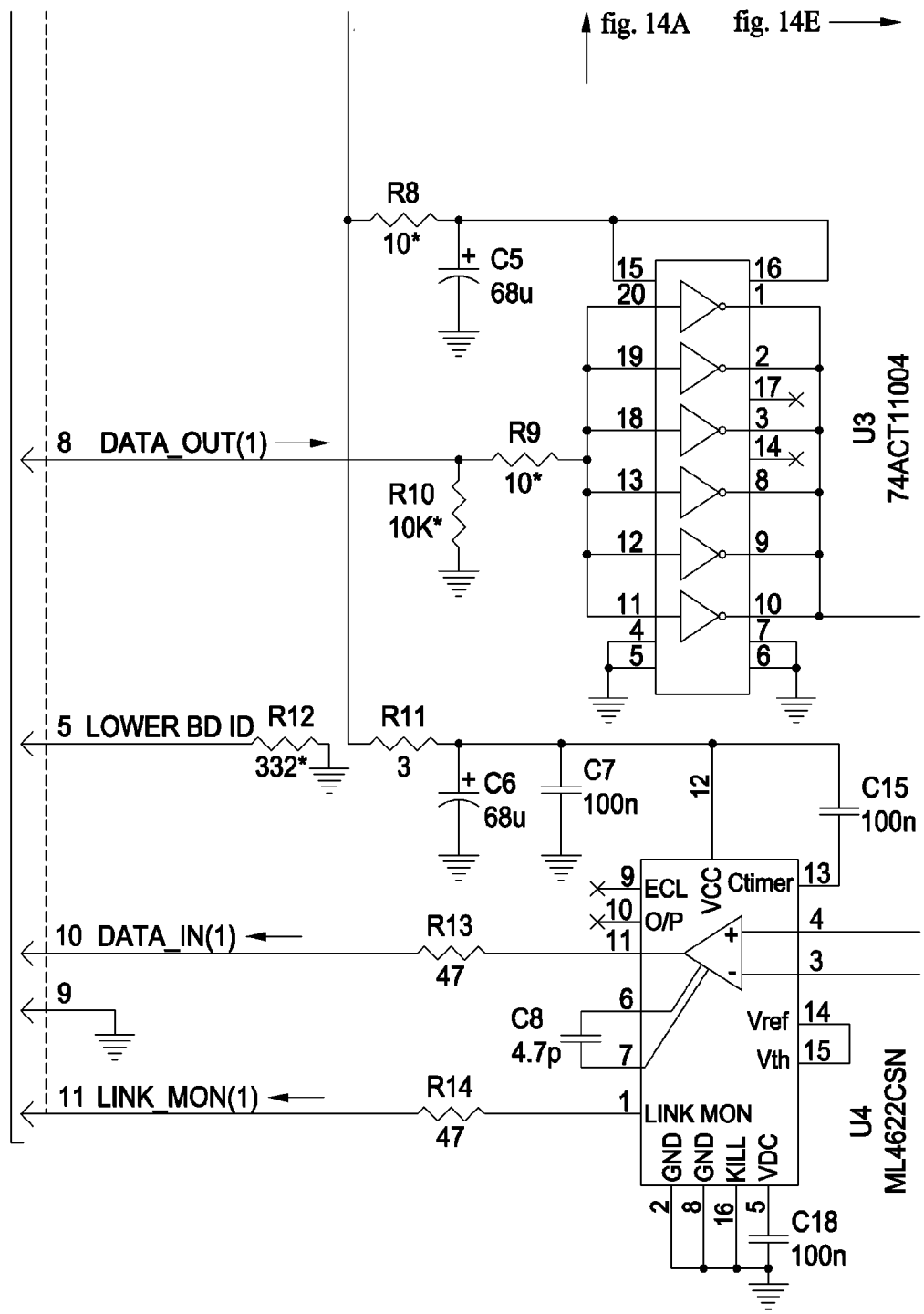
Figure 14E:
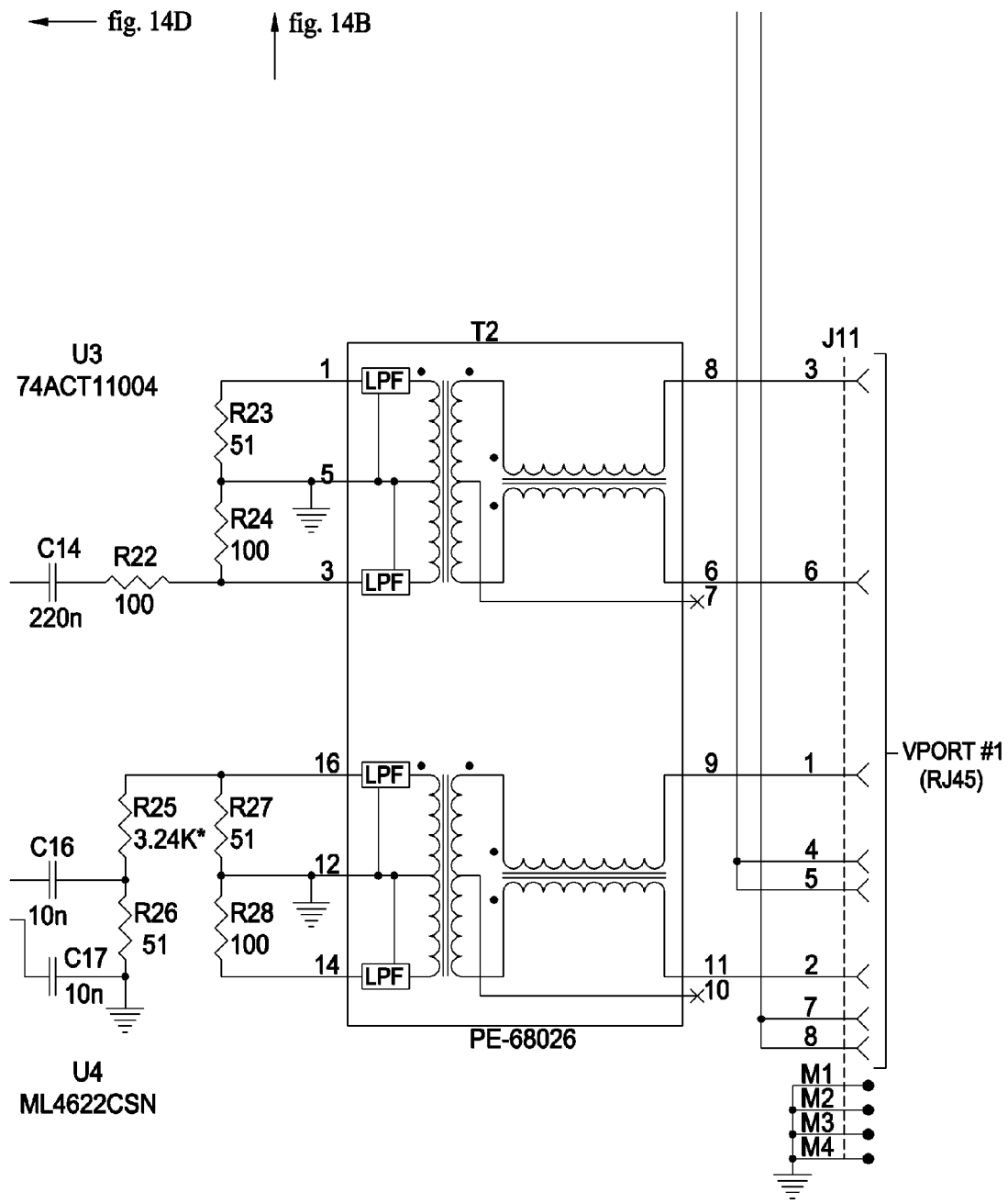
Figure 15A:
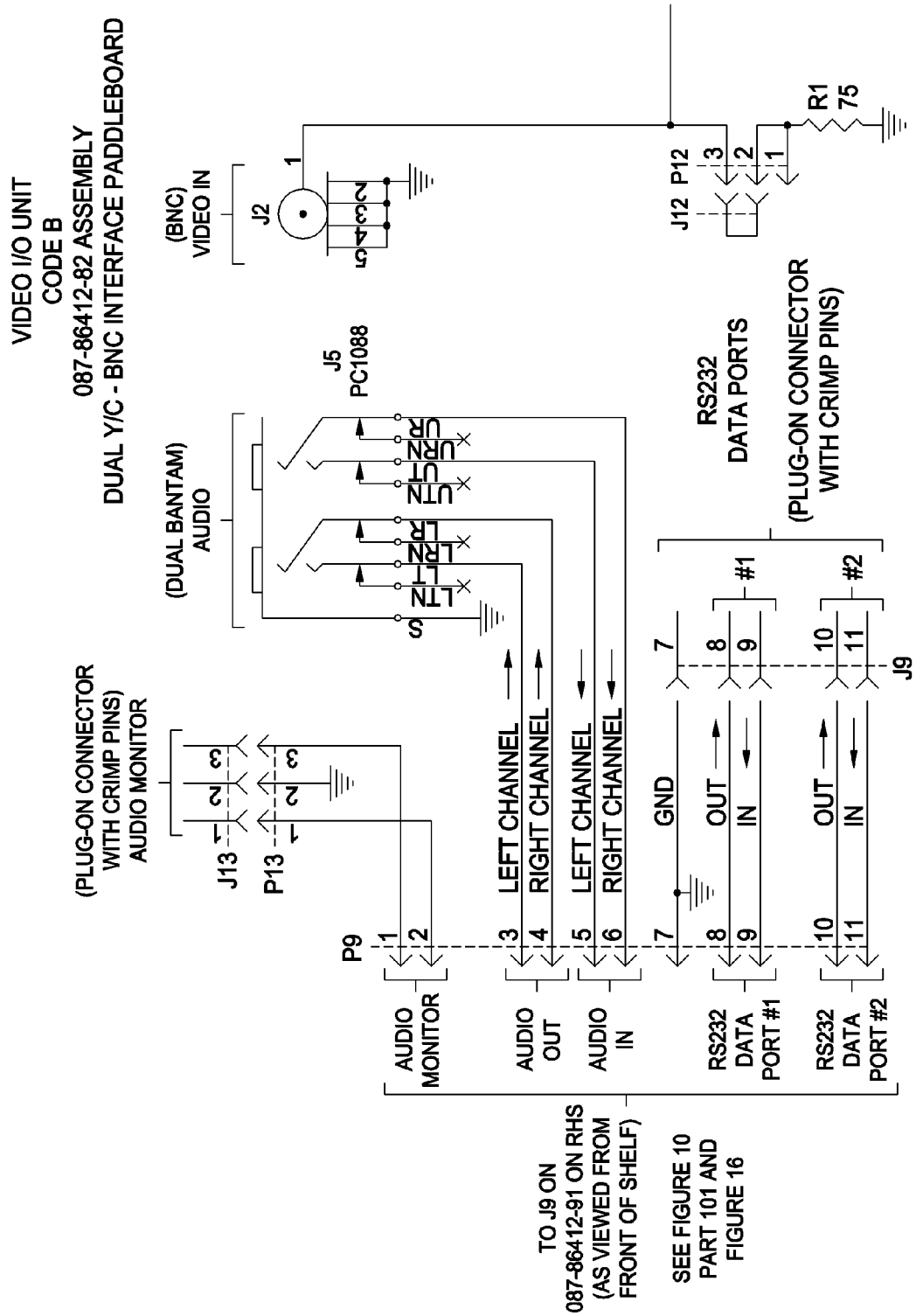
FIGS. 15A through 15B show a schematic for one implementation for the Video I/O shown in FIG. 4.
Figure 15B:
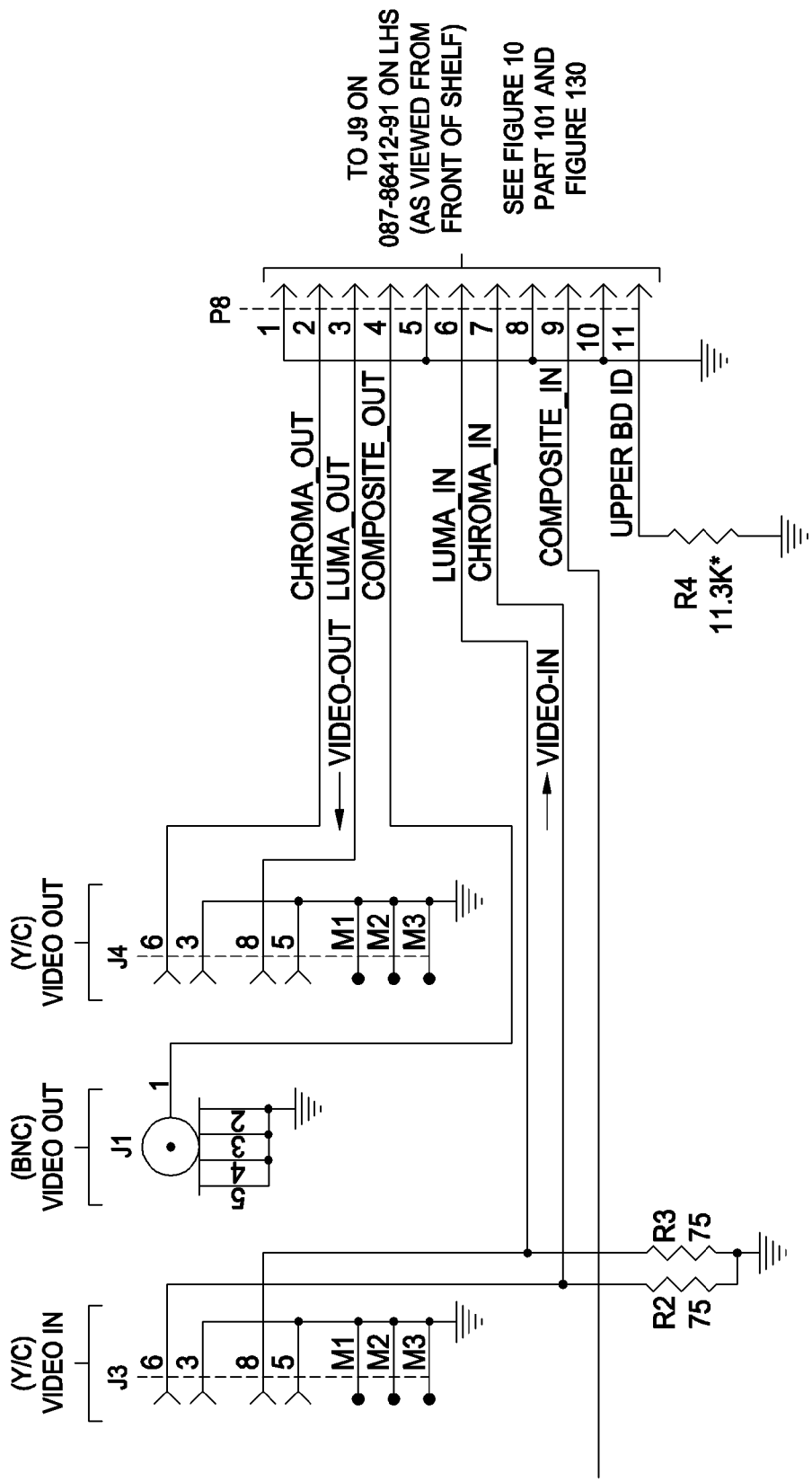
Figure 16A:
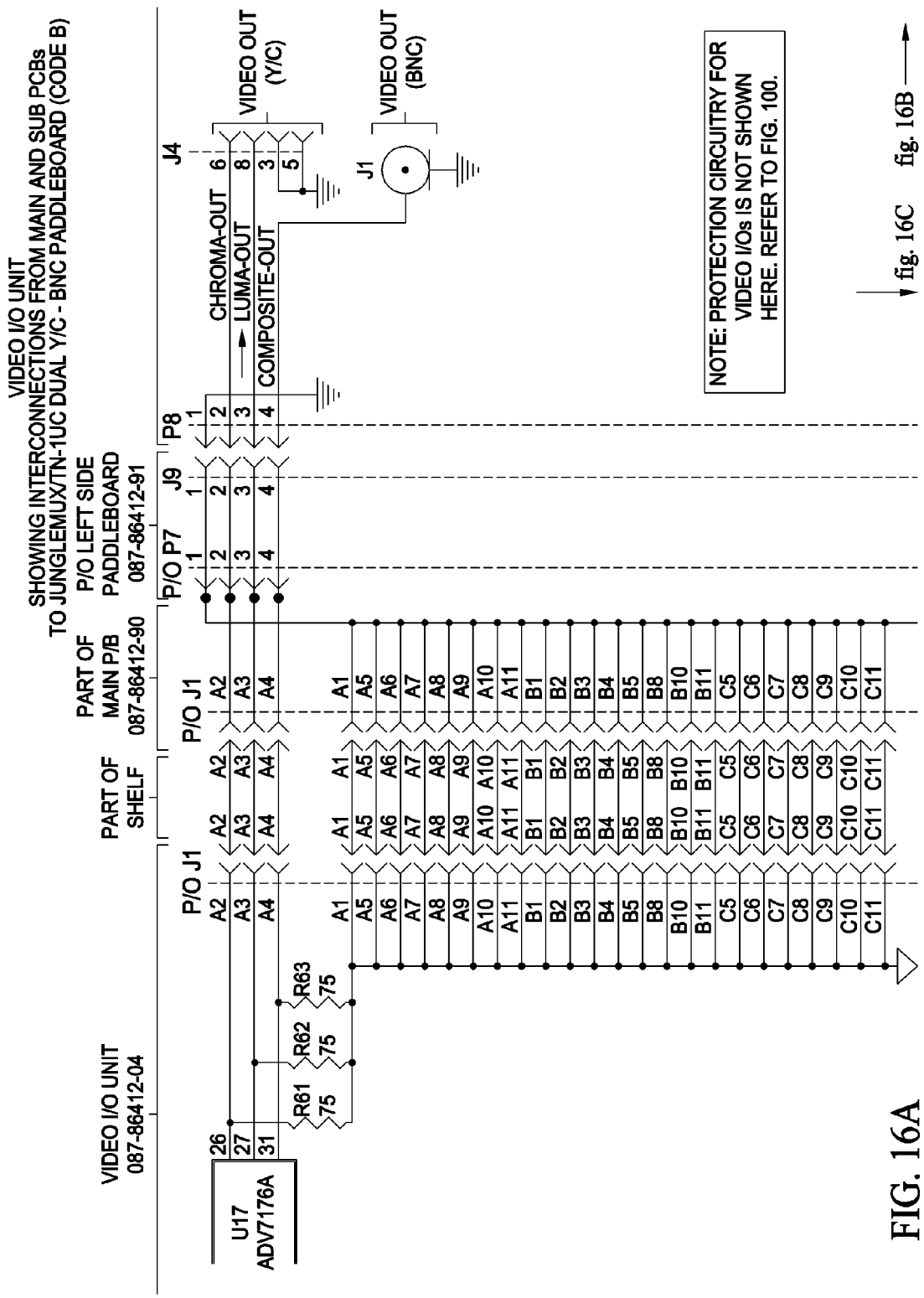
Figure 16B:
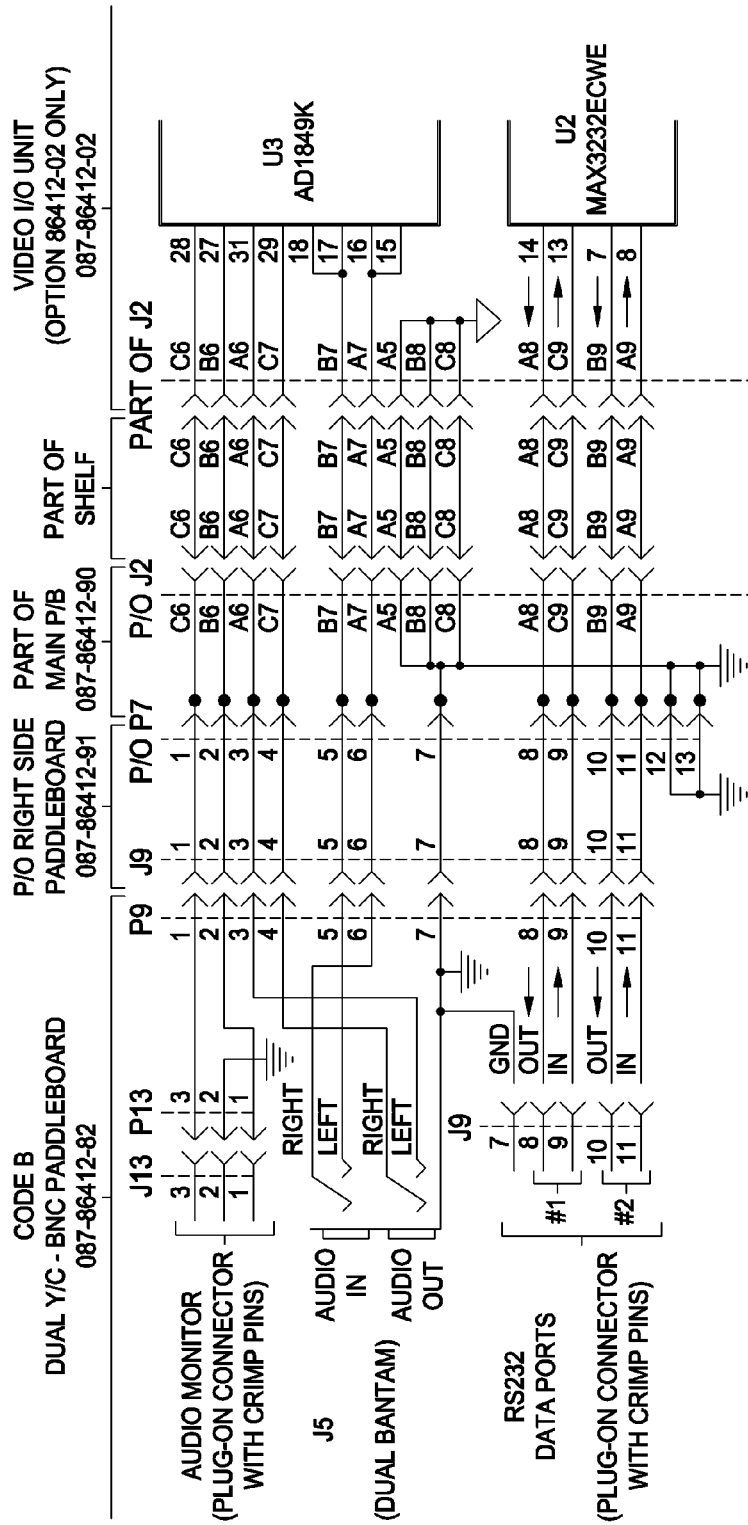
Figure 16C:
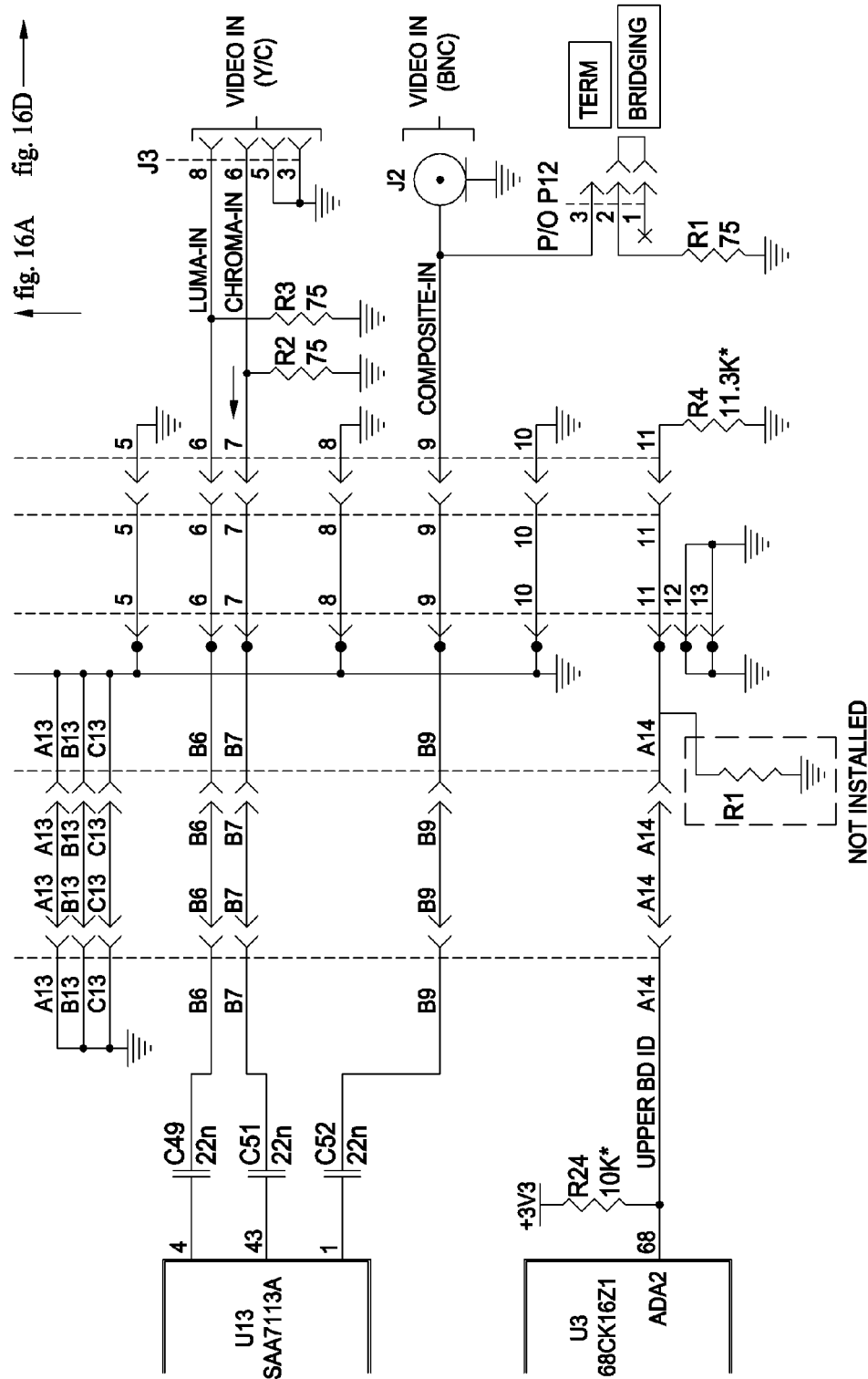
Figure 17A:
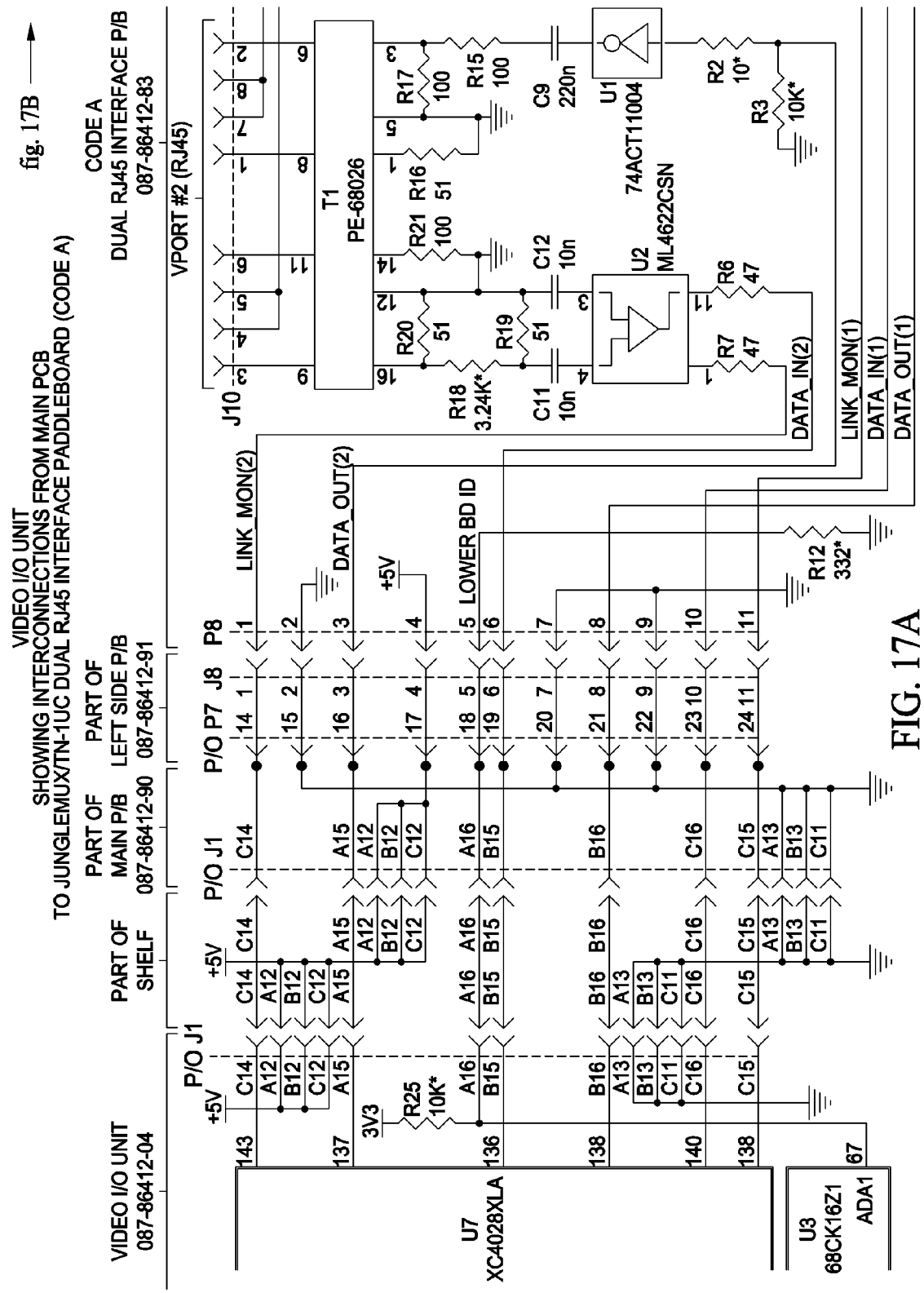
Figure 18A:
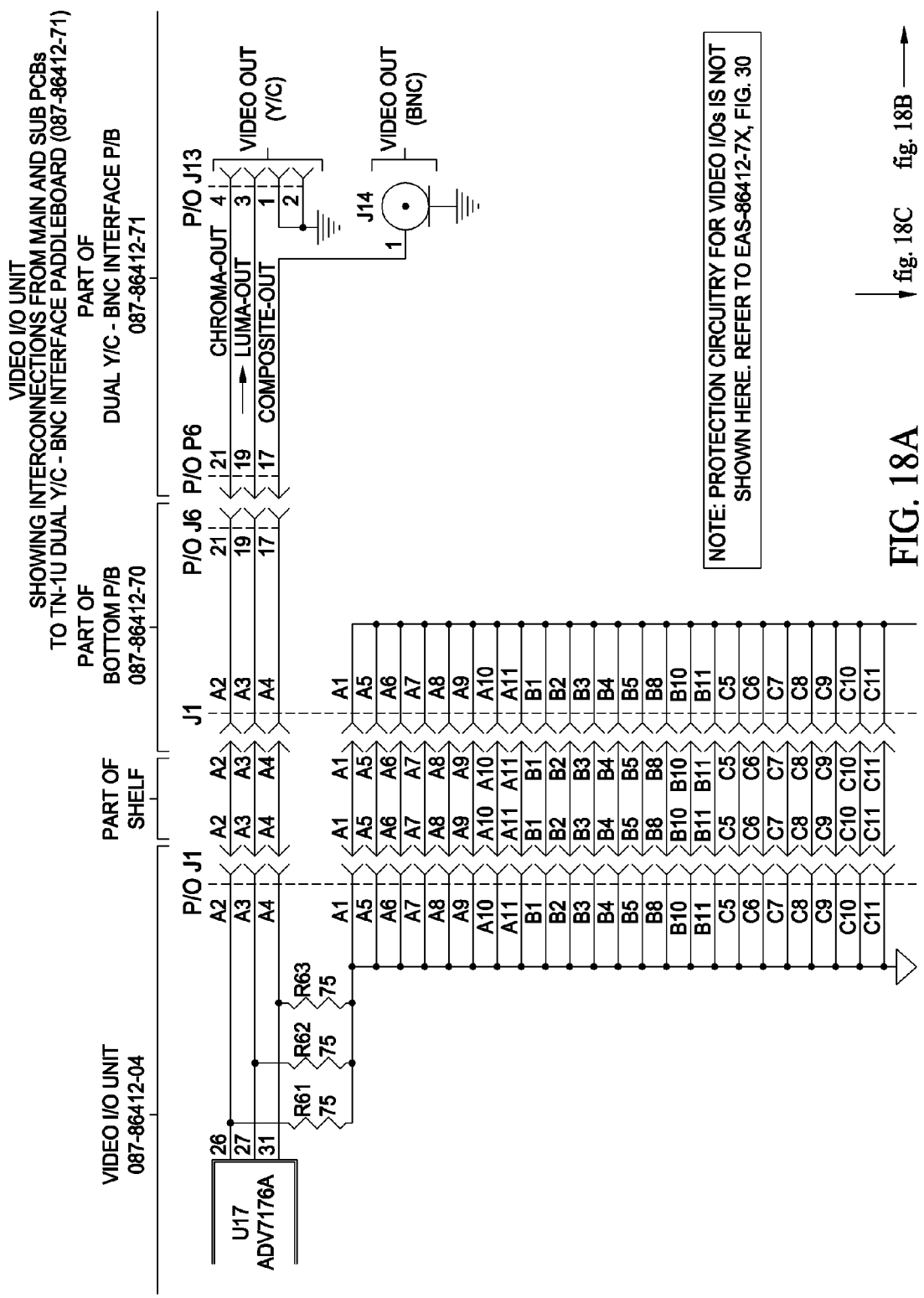
Figure 18B:
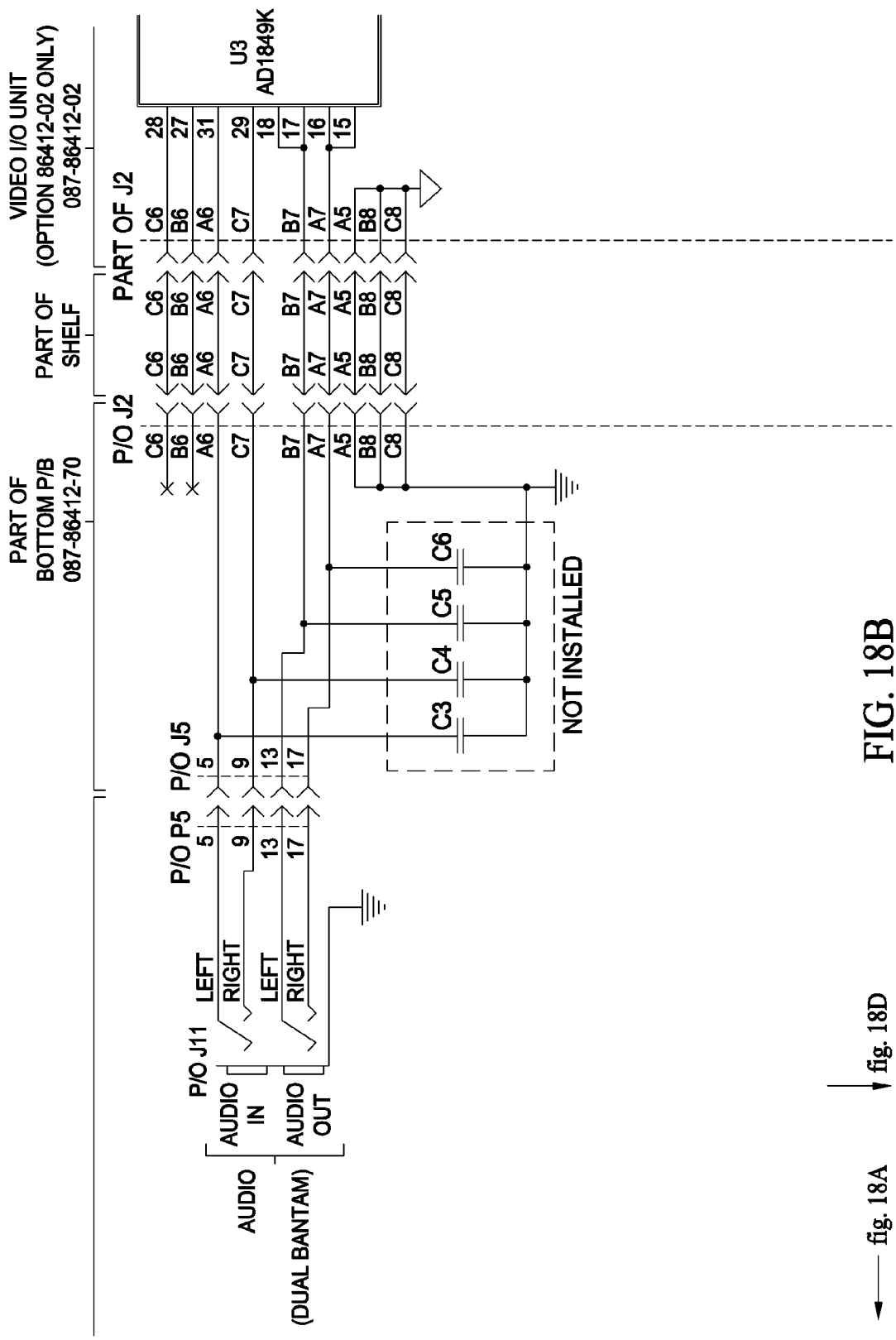
Figure 18C:
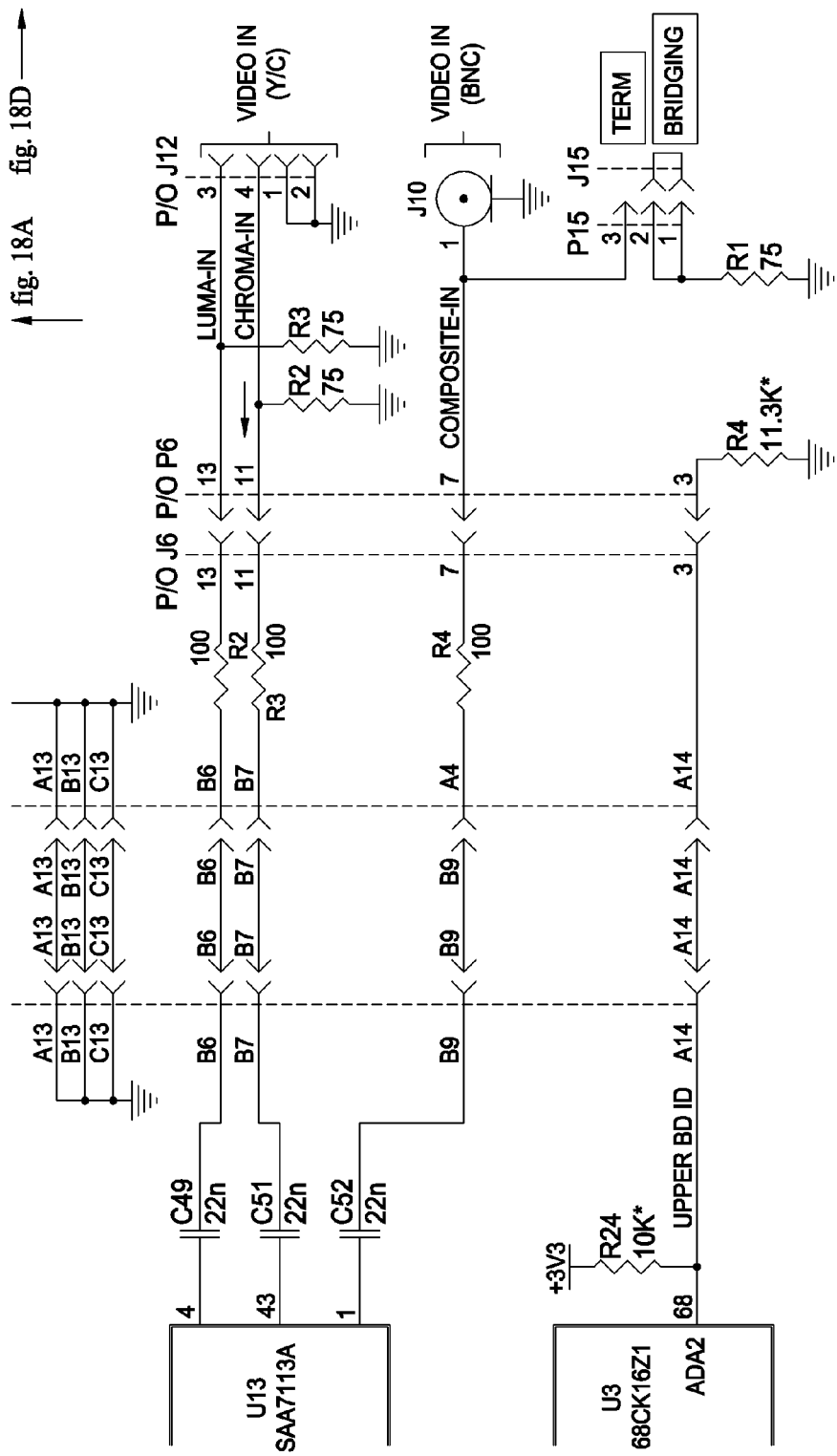
Figure 19A:
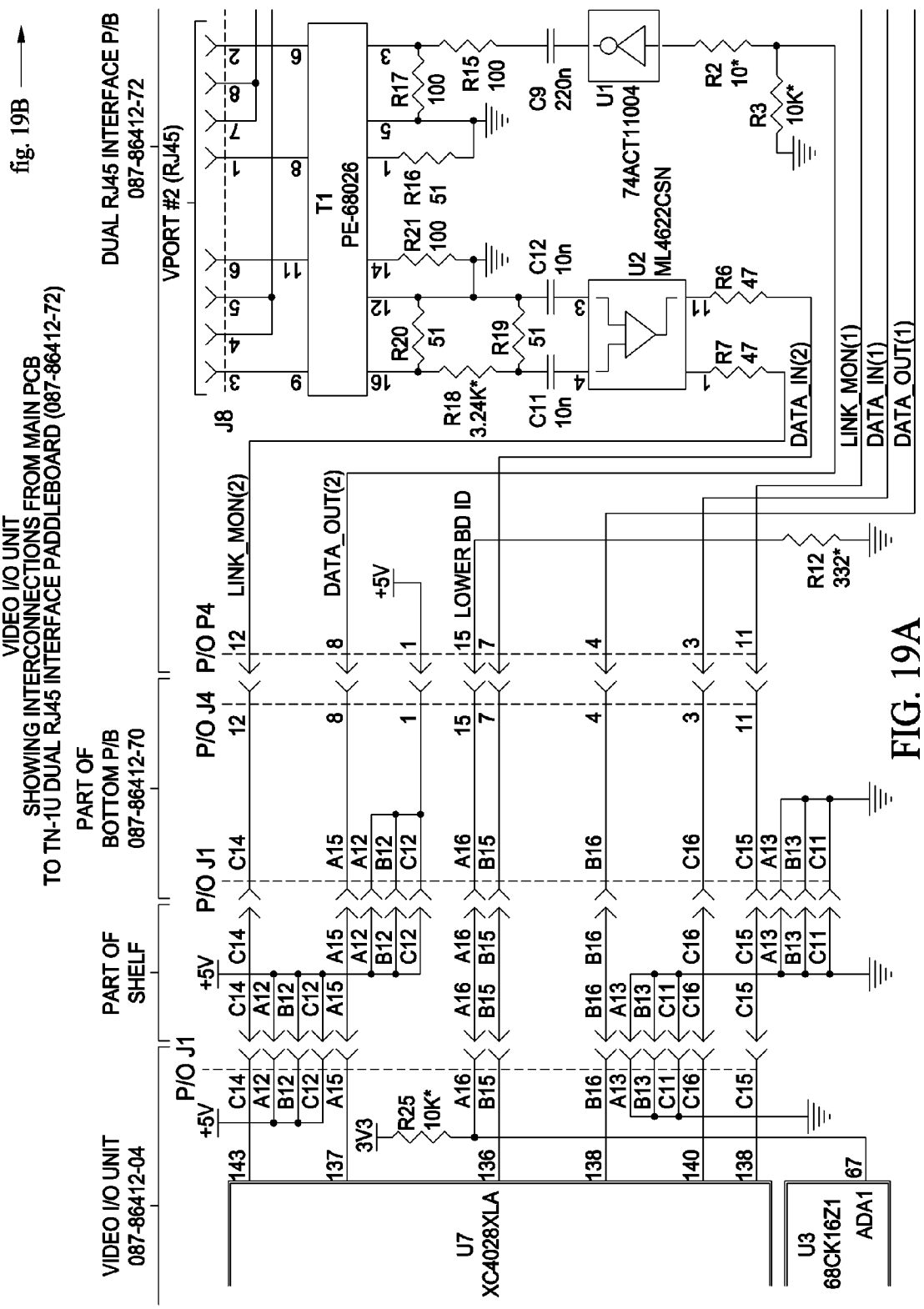
FIGS. 19A through 19C show a schematic for one implementation for the Video I/O shown in FIG. 4.
Figure 19B:
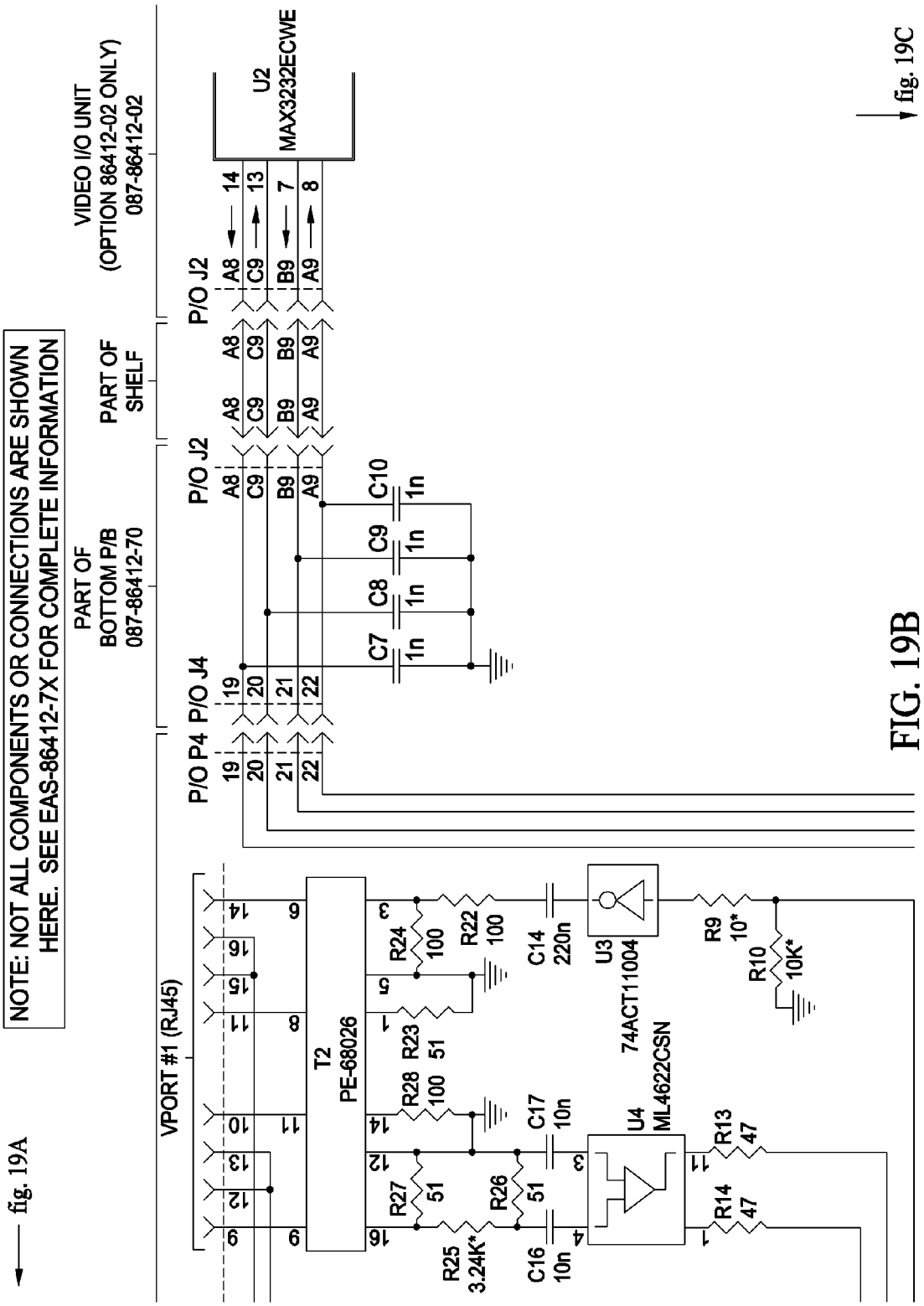
Figure 19C:
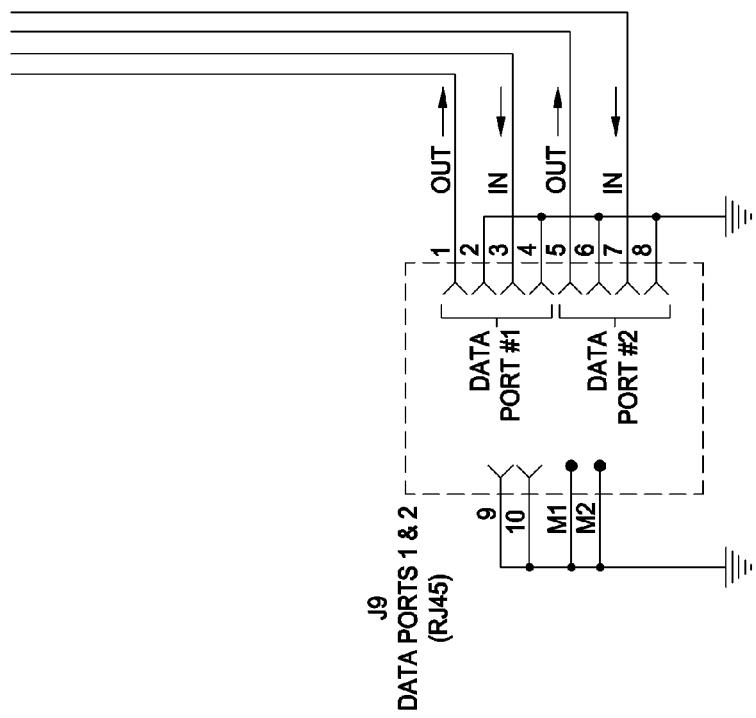
Figure 20C:
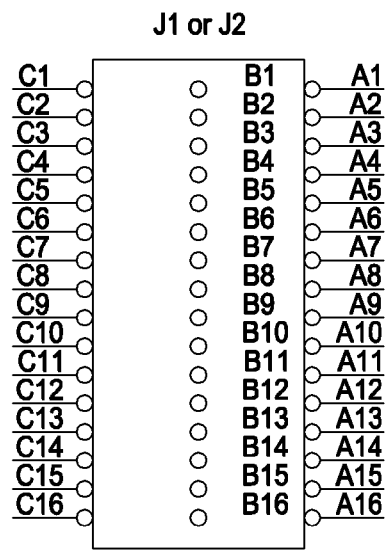
Figure 20D:
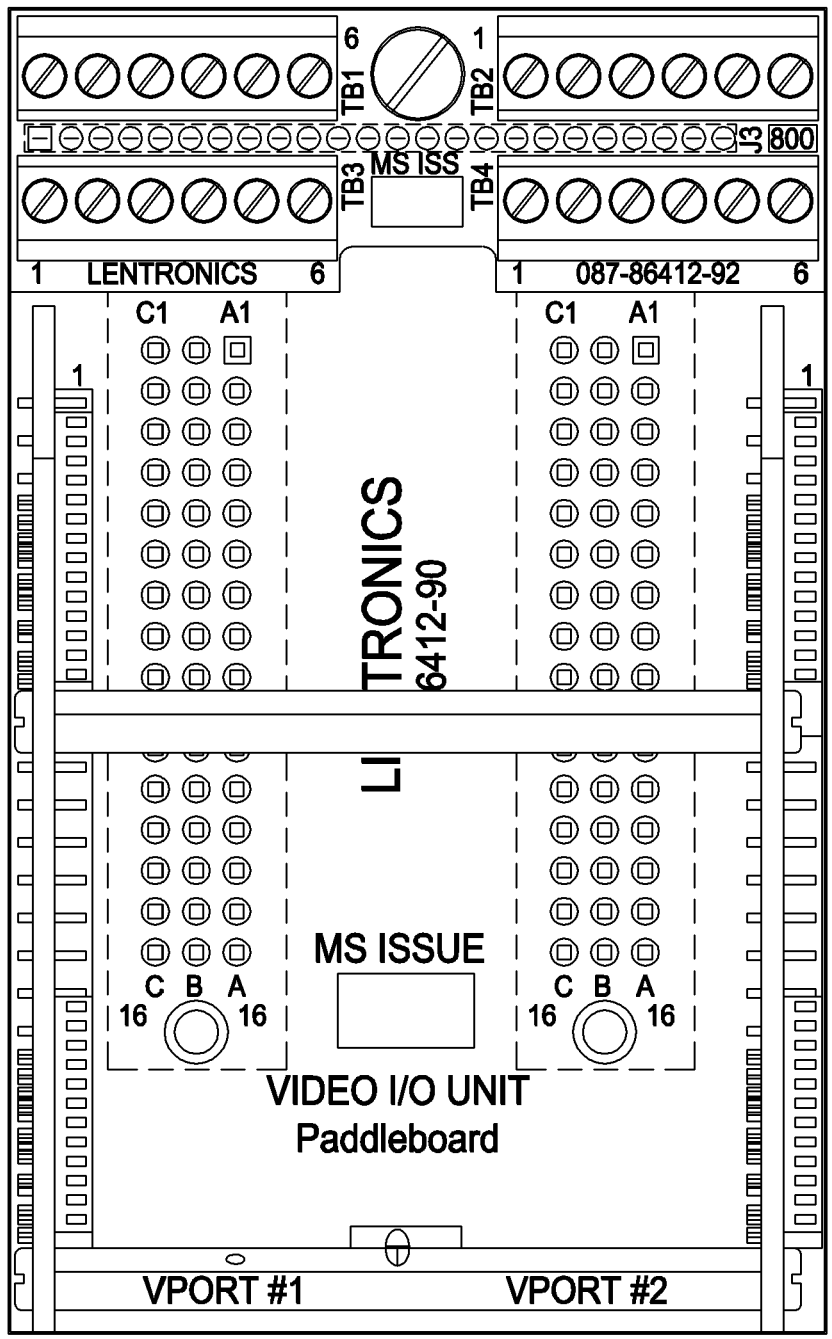
Figure 20E:
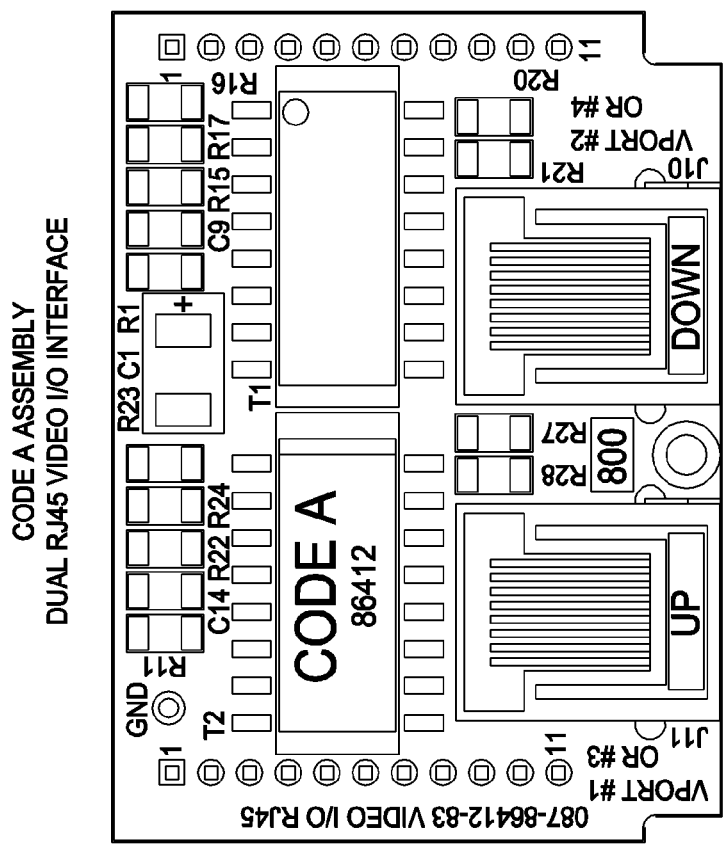
Figure 20F:
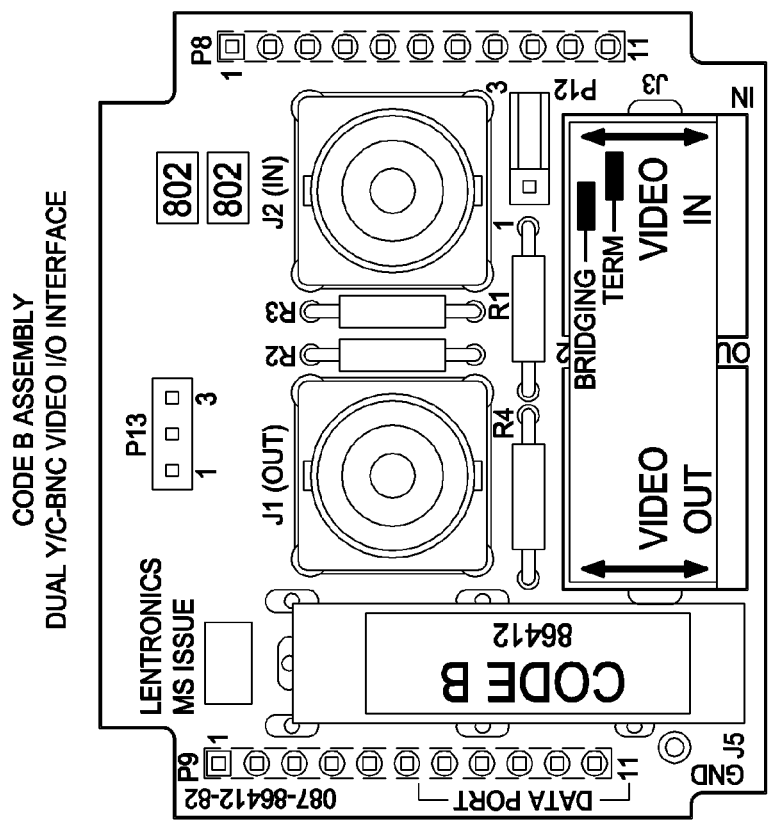
Figure 20H:
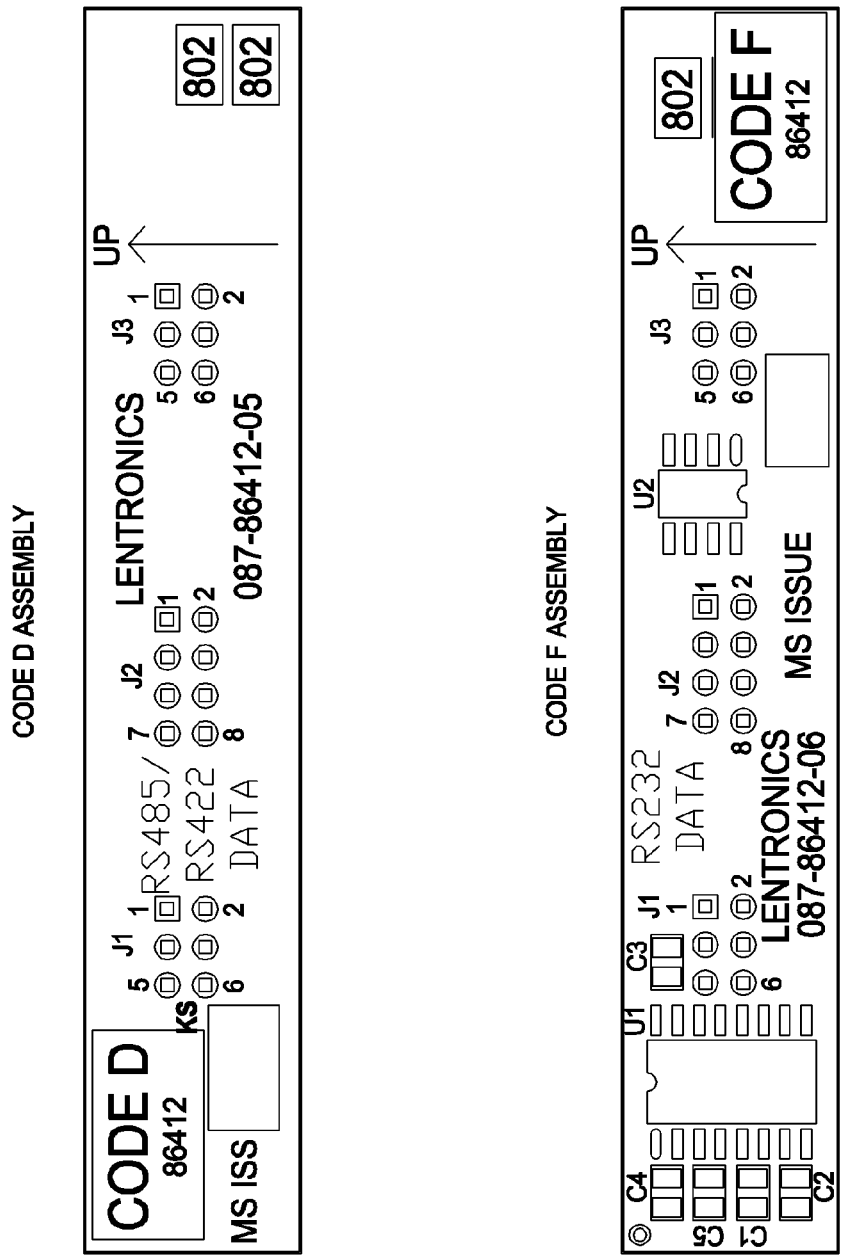

FIG. 4 is a block diagram of Video I/O 12 including a main assembly board 70 and a sub-assembly board 71. As detailed below, the main board houses a microprocessor 72, a Field Programmable Logic Gate Array (FPGA) 74, a Video Input Processor 76, a Video Wavelet Compressor/Decompressor 78, a Video D/A converter 80, a SRAM 82, a VCXO 84, and a DC/DC Converter 86. Sub-board 71 houses a Field Programmable Logic Gate Array 88, an Audio Codec 90, and a R5232 Data Interface 92.

Video I/O unit 12 is configured to perform a plurality of functions including converting the analog video signal to digital video (and vice versa), converting the analog audio signal to digital audio (and vice versa), perform Digital Video Compression and Decompression, buffer the incoming packets between FPGA 74 and video compressor 78, attend to incoming packets and transmits outgoing packets, and convert digital video back to analog video for monitoring at the OUT connector at a Video-IN unit. Video I/O unit 12 is also configured to monitor a temperature sensor 94, control a plurality of front panel LEDs 95 and monitor of an Acknowledge (ACK) push-button 97, report the status of unit 12 and responding to configuration requests from the Craft Interface, and communicate the status of unit 12 and alarm information 99 for unit 12 to Vmapper 30 for the Network Management System (JNCI). Video I/O 12 also provides at least one communication link for visibility of the entire Video Network.

In an exemplary embodiment, all user connections are made on an 86412-90/CodeA/CodeB paddleboard assembly available from The General electric company. And video inputs from the paddleboard connectors are fed via zapbuster protectors to a video processor (not shown in FIG. 4). This processor, with a 24.576 MHz crystal 96, extracts the luminance and two chrominance components in the video input signal, digitizes them at 13.5 MHz and 6.75 MHz sampling frequency respectively with 8-bit quantization, and places the 216 Mbit/sec total on a bus (not shown in FIG. 4), at 27 Mbytes/sec, in CCIR-656 standard format for digitized video signals.

The audio inputs from the paddleboard connectors are fed via a 6 dB attenuator/anti-aliasing filter (not shown in FIG. 4) to audio Codec 90. Audio Codec 90 digitizes inputs, with 16-bit resolution, at a sampling rate determined by clock signals from FPGA 88; a user can chose from four sampling rates, from 32 kHz to 11 kHz, providing cutoff frequencies from 15 to 5 kHz. FPGA 88 selects either 7 or 14 bits from each sample, for either the left or both channels, and with linear or μ-law coding, according to a user-configured setting, for transmission to main-board 70 for packetizing into audio packets.

For test purposes, the input signal can be replaced by synthesized sinusoidal test signal. This originates from a digital pattern generator in FPGA 88 feeding Codec's 90 DACs, and replace the input signal by setting Codec 90 to an analog loopback mode.

For video compression, a 216 Mbit/sec digitized video signal on the bus, with a 27 MHz clock, feeds video compression 78 which stores each received field's 3.6 Mbit of data in a 4 Mbit DRAM 100, analyzing the information by breaking it into 42 sub-bands using a "wavelet" transformation. As the next field is read in, the previous field's data is compressed by reducing a quantization encoding in each sub-band from 8-bits to a lower value (the values for all 42 sub-bands are updated for each field to optimize the compression and maintain a desired bit-rate). A further compression is implemented by using Huffman run-length encoding before outputting the data, which, in one embodiment, is 16-bits wide.

To facilitate video buffering, video compressor's 78 data output is very "bursty" and so must be buffered to the desired unit-output bit-rate. Also, for slow-scan low bit-rate modes, a field should be held for the actual time required for its transmission. In one embodiment, SRAM 82 is a 1 Mbit SRAM 82 that provides these functions for data being written from video compressor 78 and read by FPGA 74.

To facilitate bit-rate management using a desired bit rate, frame rate, and interlacing mode, microprocessor 72 calculates a desired field size. For example, for a 6 Mbit/sec, 30 frames/sec, interlaced transmission, microprocessor 72 determines an actual packet bit-rate for nominal 6 Mbit/sec=6.4 Mbit/sec. For a 23-byte payload per 25-byte packet, microprocessor calculates a payload bit-rate=5.89 Mbit/sec. In one embodiment, a 4% margin is implemented, and, for example, compression for a 5.65 Mbit/sec transfer, with 30 frames/sec interlaced=60 fields/sec, is determined such that field size=5650/60=94 kbits.

Microprocessor 72 also monitors the size of each field and adjusts (60 times/sec) the "Bin-Width" of each of video compressor's 78 forty-two sub-bands accordingly. Additionally, microprocessor 74 calculates and loads the reciprocals of these values as well, for the video decompressor part of wavelet processor 78. The 4% margin means that at 60 fields/sec, SRAM buffer 82 is usually being emptied, which is done on purpose to avoid any excessive latency that would accrue if the buffer started filling up, which would mean storing more fields of data than if the buffer is empty. At lower field rates, a 1.5-frame limited-buffer-size algorithm is implemented instead.

To facilitate frame-rate management, for the video input scene, microprocessor 72 adjusts the compression to maintain the calculated field size, and the desired frame rate will be implemented. However, if with the minimum compression setting the actual field size is still too low, a higher frame rate is implemented. For interlaced modes lower than the normal 30 frames/sec, FPGA 74 typically reads two contiguous fields from SRAM 82 (to avoid a blur at the monitor). Because this reading two contiguous fields may take awhile, a write to SRAM 82 is controlled to not corrupt these fields, and when these fields are completed, the latest written two fields are read.

To facilitate outputting video PAYLOAD packets, and because video packets use 23 bytes per packet, and the data format is 32 bits, unit 12 typically sends these packets four at a time (i.e. no other packet types in between). In one embodiment, unit 12 always sends those packets four at a time. Typically each Vport is a 12.96 Mbit/sec Vport which has a 12.8 Mbit/sec payload, and can handle eight 25-byte packets per 125 µs frame.

In an exemplary embodiment, a "pacer" circuit in FPGA 74 paces the outputting of the 62.5 µs quad video packets. For example, for 8 Mbit/sec, FPGA 74 allows 4 packets in each 6 packet period (94 µs), for 4 Mbit/sec, FPGA 74 allows 4 packets in each 12 packet period (188 s), for 2 Mbit/sec, FPGA 74 allows 4 packets in each 24 packet period (375 µs), for 1 Mbit/sec, it allows 4 packets in each 48 packet period (750 µs), for 400 kbit/sec, FPGA 74 allows 4 packets in each 120 packet period (1.9 ms), for 200 kbit/sec, FPGA 74 allows 4 packets in each 240 packet period (3.8 ms), for 100 kbit/sec, FPGA 74 allows 4 packets in each 480 packet period (7.5 ms), for 50 kbit/sec, FPGA 74 allows 4 packets in each 960 packet period (15 ms), and for 25 kbit/sec, FPGA 74 allows 4 packets in each 1920 packet period (30 ms).

To facilitate outputting audio PAYLOAD packets, audio packets (if user enabled) are also sent four packets at a time, i.e. in 800 bit bursts. Because some stereo audio quality schemes require 31.6 kHz*16*2*25/23=1100 kbit/sec, the "bursts" therefore occur each 730 µs. However, some low monaural audio quality schemes require 10.5 kHz*8*1*25/23=92 kbits/sec, so the "bursts" therefore occur each 9 ms. Additionally, the audio samples are delayed in a buffer to match the unit's video delay (for "lip-sync").

To facilitate outputting HELLO packets, unit 12 typically regularly outputs HELLO packets to provide for the automatic setup and teardown of switching for the desired video paths, provide for the path-protection switching (for recovery from fiber failures), and inform any monitoring units of unit's 12 status. For video rates above 500 kbit/sec, a 120 ms period is used (1600 bit/sec). For lower video rates this is reduced to as low as a 1.8 second period at idle (100 bit/sec).

To facilitate processing WANTED packets, all Video-OUT units return two WANTED packets per each received HELLO packet from the far-end Video-IN unit (if none, the video path will be torn down). Each WANTED packet contains the monitor unit's request bytes including a B&F byte for a desired Video Quality, a Video Source byte for a desired signal source, and an Audio Quality byte for a desired Audio Quality. Unless locally "forced", the unit uses the highest B&F byte received. Also, unless locally "forced", the unit uses the highest Video-Source and highest Audio Quality bytes received.

Video I/O 12 also includes a "Color-Ramp" Test Mode in which, the Video-IN unit may be configured to send a "color-ramp" signal to the far end. This substitutes wavelet processor's 78 data output with a bit-pattern from memory.

Video output 17 can be configured to monitor a CCIR-656 27 Mbyte/sec digitized video signal by converting it into an analog NTSC video signal in both composite (for the BNC) and Y/C (for the 4-pin mini-DIN Y/C) formats. This Loop-back facility is useful for checking that the video signal is getting into the Video-I/O unit. For test purposes, the outputs can be fed from an internal color-bar generator. Additionally, to save power, either or both outputs can be disabled (0.5 W if both disabled). Also audio codec 90 can be utilized to monitor the digitized audio by looping it back to an audio-output Bantam jack 102. Video I/O further includes test modes that allow a 16-bit loopback mode (rather than the 14-bit or 7-bits being transmitted), plus a test-tone (synthesized) output (at 6 dB below full scale).

Regarding video and audio input packets, if a Video-OUT unit is outputting WANTED packets with a VNA# for an alive Video-IN unit, Video and Audio (if enabled) PAYLOAD packets should be being received on the unit paddleboard's Vport-UP. This signal from the paddleboard feeds the FPGA 74, which continuously, or nearly continuously, writes the video and audio data (23 bytes per packet) into 1 Mbit SRAM 82. FPGA 74 also detects the start-of-field#1 (SOF1) data pattern and keeps a list of RAM addresses for the last three SOF1s received.

Because, in some embodiments, video decompressor 78 may be intolerant and become non-operational if decompressor 78 does not receive correct compressed data at 60 fields per second, if SOF2 patterns are also received (interlaced data), then FPGA 74 continually, or at least nearly continually, supplies video decompressor 78 with the last two complete fields received (repeating them if necessary). Accordingly, the output is thus full resolution (525 line) video flicker free. Alternatively if SOF2 patterns are not received (non-interlaced data), then FPGA 74 continually supplies video decompressor 78 with the last complete field received (repeating them if necessary). The output is thus ½ resolution (262 lines) video flicker free.

Additionally, if the data feed is interrupted for any reason, the last frame is repeated indefinitely. For static surveillance applications the on-screen-warning message feature can be enabled using closed-caption technology. Unit 12 is configurable such that this video "freeze" can be invoked on purpose if desired. Alternatively, the user can configure the unit to substitute color-bars during loss of the video bit stream and the frozen image can be viewed by changing back to the "freeze mode".

Video decompressor 78 decompresses each field's data, using 42 Bin-Widths (which are transmitted with the data) and stores the result in 4 Mbit DRAM 100. Video decompressor 78 then outputs this stored result at 27 Mbyte/sec in the CCIR-656 format on the bus to video output 80. Video output 80 converts the CCIR-656 27 Mbyte/sec digitized video signal into an analog NTSC video signal in both composite (for the BNC) and Y/C (for the 4-pin mini-DIN Y/C) formats. In an alternative embodiment, Video output 80 converts the CCIR-656 27 Mbyte/sec digitized video signal into an analog video signal in accordance with a European standard such as European standard $I^2C$ 2-wire bus (SDA & SCL nets). In one embodiment, FPGA 74 includes an $I^2C$ bus. For test purposes, the outputs can be fed from an internal color-bar generator. To save power, either or both outputs can be disabled (0.5 W if both disabled). Communication with video output 80 for configuration (e.g. output selection, NTSC or PAL modes) and closed-caption injection is via the European standard bus (SDA & SCL nets) on FPGA 74.

Audio codec 90 converts the digitized samples back to analog signal and feeds it to audio-output Bantam jack 102 which can use unbalanced outputs. Video I/O includes a test mode that generates a test-tone (synthesized) output (at 6 dB below full scale). An auxiliary mono-mixed audio output is also provided for monitoring purposes, which is capable of directly driving a headphone or (>30 ohm) loudspeaker (typically P13 on the paddleboard).

The VMapper-10 Unit is similar to Vmapper 30. The VMapper-10 provides an interface between Video I/O units 12 and JMUX units (OC-1 or OC-3) available from The General Electric Company and/or SPE-JIF units also available from The General Electric Company, and is responsible for mapping the compressed video signal into the bandwidth available for transport over the network. The VMapper-10 unit is a high speed packet switching router with high speed (<1 second) automatic setup and teardown of virtual circuit paths for maximum bandwidth utilization.

As with Vmapper 30, to transport video signals in a network using VMapper-10 units, a WAN (wide area network) of N×1.6 Mb/s is created. N refers to the number of VTs assigned to the video WAN and may be between 1 and 7. This network WAN is created by equipping all nodes in the system (requiring video access) with a VMapper-10 unit which connects to VMapper-10 units at the adjacent nodes using a portion (a maximum of seven VTs) of the inter-node SONET payload bandwidth. Note that the same set of N VTs is dropped to the VMapper-10 unit at every node.

The WAN comprises a linear topology with only one path between the video source and destination. This linear topology allows for bandwidth to be reused provided the total bandwidth of N×1.6 Mb/s on any link (between VMapper-10 units) is not exceeded. Note that the N×1.6 Mb/s limit is the sum of all the packet types, not just video.

The intelligent bandwidth allocation allows more bandwidth to be nearly instantly assigned to specific video sources/cameras, allowing incident management, a higher resolution and more frames/sec for what is actually being viewed.

Table 2 below details unused bandwidth when the VMapper-10 is arranged as Vmapper-40 was arranged in FIG. 2.

The bandwidth unused between nodes is shown below in Table 4.

time, if [8005]=VIDEO-SOURCE-FORCE is not 00, this is written to [8004]. Otherwise if "Wanted" packets are received, then [8006]=VIDEO-SOURCE-2USE =the highest-VIDEO-SOURCE-WANTED received byte is used. Else [020A]=VIDEO-SOURCE-BOOT is used. For Video-OUT operation, the Video-OUT unit is always, or nearly always, sending the byte [8006]=VIDEO-SOURCE-WANTED. Unless changed after powerup, this has the [020A]=VIDEO-SOURCE-BOOT value.

Video I/O 12 facilitating operating a single wide area data network wherein video applications include a large number of cameras plus several monitors with complete freedom for any monitor to watch any camera at any desired quality (=bit-rate or "bandwidth") within the total bandwidth available on the single network. An exemplary embodiment of Video I/O 12 facilitates providing a single wide-area network with all sources being able to inject their video data to the network, and all monitors being able to extract the desired video data from the network.

More specifically, for a 48 Mbit/sec VideoLANs, each access node has one (or more) Vmapper-40 units, with the SPEports being connected either directly (if co-located) or or via STS#2 (using SPE-Y) or STS#3 (using SPE-Z) of an OC-3 fibre links. And for a 1.5 to 12 Mbit/sec VideoLANs, each access node has one (or more) Vmapper-10 units, with the JIF ports connected to OC-1 or OC-3 Jmux-unit fibre links. In one embodiment, the employed topology is that of a tree; i.e. with one and only one path between any two

TABLE 4

| From Node | To Node | Band Width (MB/s) | Through Nodes | Bandwidth Unused between Nodes in MB/s | | | | | | | | |
|---|---|---|---|---|---|---|---|---|---|---|---|---|
| | | | | A–B | B–C | C–D | D–E | E–F | F–G | G–H | H–I | I–A |
| | | | | 11.2 | 11.2 | 11.2 | 11.2 | 11.2 | 11.2 | 11.2 | 11.2 | 11.2 |
| A | E | 1.5 | B, C, D | 9.7 | 9.7 | 9.7 | 9.7 | 11.2 | 11.2 | 11.2 | 11.2 | 11.2 |
| C | E | 0.2 | D | 9.7 | 9.7 | 9.5 | 9.5 | 11.2 | 11.2 | 11.2 | 11.2 | 11.2 |
| H | F | 1.0 | I, A, B, C, D, E | 8.7 | 8.7 | 8.5 | 8.5 | 10.2 | 11.2 | 11.2 | 10.2 | 11.2 |
| B | F | 2.0 | C, D, E | 8.7 | 6.7 | 6.5 | 6.5 | 8.2 | 11.2 | 11.2 | 10.2 | 11.2 |
| I | E, F | 0.6 | A, B, C, D | 8.1 | 6.1 | 5.9 | 5.9 | 7.6 | 11.2 | 11.2 | 10.2 | 9.6 |

FIGS. 5A through 5H, FIGS. 6A through 6F, FIGS. 7A through 7H, FIGS. 8A through 8B, FIGS. 9A through 9F, FIGS. 10A through 10H, FIGS. 11A through 11C, FIGS. 12A through 12C, FIGS. 13A through 13C, FIGS. 14A through 14E, FIGS. 15A through 15B, FIGS. 16A through 16D, FIGS. 17A through 17B, FIGS. 18A through 18D, FIGS. 19A through 19C and FIGS. 20A through 20H show schematics for implementing an exemplary embodiment of Video I/O 12 (shown in FIG. 1) and are provided to be illustrative of one specific implementation of the invention and not limiting because the invention is not limited to the specific embodiment shown in FIGS. 5A–20H.

In use, Video I/O 20 receives a VIDEO-SOURCE BYTE wherein 01 is for Composite video using a BNC input, 02 is for Composite video using a Y/C connector's chrominance input (red on Belden), 03 is for Composite video using a Y/C connector's luminance input (green on Belden), 04 is for a Y/C (S-Video) video using a Y/C input, 05, 06, and 07=01, 02,03 but with the color killed which saves bandwidth if not needed, and 8× is for Test-mode (Color-Bars to local output, Colour-Ramp (Video-in unit only) to far end Video-out unit). Additionally, a video source is selected such that the Video-IN unit is always, or nearly always, using a VIDEO-SOURCE byte [8004]=VIDEO-SOURCE-INUSE. At any Vmapper units. For network protection, ring paths are available with one of the nodes being configured as a "Ring-Break" node, wherein this node only provides "thru" traffic when it detects a failure in the ring (the POH F2 byte is used for this monitoring function).

For implementing the VNAs, a 13-bit address is allocated providing 8191 choices. Furthermore, in order to separate the types of units, 0001 to 1DFF is assigned to Video-I/O units (1 to 7679 in decimal), and 1FFE to 1E00 is assigned to Vmapper units (1 to 511 in decimal). All data on the network is encoded in 25-byte packets because 25 bytes allows the Vmapper-10 units to efficiently use 1 through 7 Virtual Terminals (VTs), since each VT has 25 usable bytes. In one embodiment, LINK, HELLO, WANTED, and MESSAGE packets use Byte#25 as a checksum byte, which allows the rejection of corrupted packets. Additionally, PAYLOAD (video and audio) packets use all of the 23 non-header bytes for payload data, this is for efficiency and is less disruptive than deleting 23 bytes from the data stream. LINK Packets are regularly broadcast by each unit, and are not passed on. For all LINK packets, the first two bytes are header bytes and include 011 plus the unit's VNA#. Therefore, each unit thus knows the VNA# of all its neighbors (unless it is to the right of a Ring-Break unit).

HELLO Packets are regularly broadcast by each unit, and passed through every other unit, to reach all other units in the network. For all HELLO packets, the two header bytes comprise 001 plus the unit's VNA#1,2,3 . . . 8191. Each unit keeps a table so that it knows the entry port for each and every VNA#. The HELLO packets are only grabbed by Video-Out units whose Wanted-VNA# matches.

WANTED Packets are broadcast by each unit wanting to receive video from another unit. The WANTED packets also have a two byte header wherein the two header bytes are 010 plus the other unit's VNA#. Each Vmapper unit receiving a WANTED packet looks at its table to see if it has an entry for the VNA#, and if so it passes the packet to the recorded port (producing the VNA# HELLO). In this way the WANTED packets find their way directly to the other unit. A further function of the Vmapper units routing these packets is to put a further entry in the table to flag the port producing the WANTED packets. Note that if more than one monitor wants the same source, there will be more than one flagged ports in the table for the particular VNA#. Another function of the Vmapper units is to remove the flags if the WANTED packets cease. This is useful to quickly tear down obsolete paths to maintain the full network bandwidth for the active paths. For this function to work it is helpful that all monitor units emit a WANTED packet for each received HELLO packet. A further function of the Vmapper units is to modify the $3^{rd}$ byte of the WANTED packets. This byte indicates the spare-capacity of the path by having each Vmapper unit compare the byte with its port's idle rate and modify the byte as necessary. This feature allows the source unit to know whether the video paths taken by its output packets can accommodate a higher bit-rate.

PAYLOAD packets are broadcast by each Video-I/O transmitting data. The two header bytes of the PAYLOAD packets include 10X plus the unit's VNA#. Each Vmapper unit receiving a PAYLOAD packet looks at its table to see if it has any flagged ports for the VNA#, and if so it passes the packet to the recorded port(s) producing the VNA# WANTED. In this way the PAYLOAD packets find their way directly to (all) the monitor unit(s).

MESSAGE packets are used for inter-unit messages. The MESSAGE packets include two header bytes which include 110 plus the other unit's VNA#, the next two bytes provide the source unit's VNA# so that the recipient can return a response. Each Vmapper unit receiving a MESSAGE packet looks at its table to see if it has an entry for the VNA#, and if so it passes the packet to the recorded port (producing the VNA# HELLO). In this way the MESSAGE packets find their way directly to the other unit.

IDLE packets are sent to maintain continuous packets on all ports, and each Vmapper and Video-I/O unit transmits IDLE packets as required to maintain continuous packets at all ports. The IDLE packets have a two byte header which is 000 plus 13 more zeroes.

Typical Port Packet-Rate Capacities for SPEports (Vmapper-40) are such that the payload capacity of each SPE is (86 col)*(9 row)=774 bytes per 125 us frame. This allows 30 packets, *(25 bytes/pkt)=750 bytes per frame, =48 Mbit/sec. For Vports (All units), the payload capacity of each Vport is 8 packets per 125 us frame. This is 8 packets, *(25 bytes/pkt)=200 bytes per frame, =12.8 Mbit/sec. For JIFports (Vmapper-10), the payload capacity of each VT1.5 is 1 packet per 125 us frame. So for 7 VTs, *(25 bytes/pkt)=200 bytes per frame, =11.2 Mbit/sec.

While the invention has been described in terms of various specific embodiments, those skilled in the art will recognize that the invention can be practiced with modification within the spirit and scope of the claims.

What is claimed is:

1. A video optical multiplexer that operates in a synchronous optical network (SONET) comprising:
   a plurality of video inputs;
   a processor operationally coupled to said video inputs;
   a plurality of optical video outputs coupled to said video inputs via said processor, said processor configured to:
      receive video data from at least two of said plurality of optical video inputs;
      packetize the received video data; and
      route the packetized video data to at least two of said plurality of optical video outputs, said processor routing each packetized video data package based upon a video network address (VNA) contained in each packet using a VNA lookup table; and
   a mapper coupled to said processor and configured to track a port that outputs a request to receive a video signal, wherein said mapper configured to determine a spare capacity of a path between said mapper and the port by obtaining a value indicated within the request to receive the video signal.

2. A multiplexer in accordance with claim 1 further comprising a Field Programmable Logic Gate Array (FPGA) operationally coupled to said processor, said FPGA configured to detect a start of field (SOF) data pattern for the packetized video data.

3. A multiplexer in accordance with claim 2 wherein said FPGA comprises a pacer circuit configured to pace an output of the routed packetized video data.

4. A multiplexer in accordance with claim 3 wherein said pacer circuit configured to:
   output the routed packetized video data at a first resolution when the packetized video data is interlaced; and
   output the routed packetized video data at a second resolution when the packetized video data is non-interlaced.

5. A multiplexer in accordance with claim 3 wherein said pacer circuit configured to:
   output the routed packetized video data at a first resolution when the packetized video data is interlaced; and
   output the routed packetized video data at a second resolution when the packetized video data is non-interlaced, the second resolution approximately one-half the first resolution.

6. A multiplexer in accordance with claim 1 further comprising:
   at least one optical audio input operationally coupled to said processor; and
   at least one optical audio output operationally coupled to said processor, said processor further configured to packetize audio data received from said optical audio input in a packet of equal size to a packet size of said packetized video data.

7. A multiplexer in accordance with claim 6 wherein each said audio packet and each said video packet comprise between twenty bytes per packet and thirty bytes per packet.

8. A multiplexer in accordance with claim 7 wherein each said audio packet and each said video packet comprise approximately twenty-five bytes per packet.

9. A multiplexer in accordance with claim 7 wherein each said audio packet and each said video packet comprise twenty-five bytes per packet.

10. A multiplexer in accordance with claim 1 wherein said plurality of optical video inputs and said plurality of optical video outputs are connected in a linear topology.

11. A multiplexer in accordance with claim 1 wherein each said optical video input is configured to:
  receive an analog video input from an analog video source; and
  output to said processor an optical digital video signal.

12. A multiplexer in accordance with claim 1 wherein each optical video output is configured to:
  receive from said processor an optical digital video signal; and
  output an analog video signal.

13. A multiplexer in accordance with claim 1 wherein said plurality of optical video inputs and said plurality of optical video outputs are connected in a tree topology.

14. A multiplexer in accordance with claim 1 wherein each VNA comprises thirteen bits.

15. A multiplexer in accordance with claim 1 wherein said mapper configured to determine the spare capacity by comparing the value with a rate at which a port of said mapper remains idle.

16. A method for operating a synchronous optical network (SONET), said method comprising:
  providing a plurality of optical video inputs;
  operationally coupling a processor to the optical video inputs;
  operationally coupling a plurality of optical video outputs to the optical video inputs via the processor;
  configuring the processor to:
    receive video data from at least two of the plurality of optical video inputs;
    packetize the received video data;
    route the packetized video data to at least two of the plurality of optical video outputs; and
    route, by using a video network address (VNA) lookup table, each packet of the packetized video data based upon a VNA contained in each packet of the packetized video data;
  tracking, by a mapper coupled to the processor, a port that outputs a request to receive a video signal; and
  determining, by the mapper, a spare capacity of a path between the mapper and the port by obtaining a value indicated within the request to receive the video signal.

17. A method in accordance with claim 16 further comprising:
  operationally coupling a Field Programmable Logic Gate Array (FPGA) operationally coupled to the processor; and
  configuring the FPGA to detect a start of field (SOF) data pattern for the packetized video data.

18. A method in accordance with claim 17 further comprising:
  providing a pacer circuit in the FPGA; and
  configuring the pacer circuit to pace an output of the routed packetized video data.

19. A method in accordance with claim 18 further comprising configuring the pacer circuit to:
  output the routed packetized video data at a first resolution when the packetized video data is interlaced; and
  output the routed packetized video data at a second resolution when the packetized video data is non-interlaced.

20. A method in accordance with claim 18 further comprising configuring the pacer circuit to:
  output the routed packetized video data at a first resolution when the packetized video data is interlaced; and
  output the routed packetized video data at a second resolution when the packetized video data is non-interlaced, wherein the second resolution is approximately one-half the first resolution.

21. A method in accordance with claim 16 further comprising:
  operationally coupling at least one optical audio input to the processor;
  operationally coupling at least one optical audio output to the processor; and
  configuring the processor to packetized audio data received from the optical audio input in a packet of equal size to a packet size of the packetized video data.

22. A method in accordance with claim 21 wherein each audio packet and each video packet comprise between twenty bytes per packet and thirty bytes per packet.

23. A method in accordance with claim 22 wherein each audio packet and each video packet comprise approximately twenty-five bytes per packet.

24. A method in accordance with claim 23 wherein each audio packet and each video packet comprise twenty-five bytes per packet.

25. A method in accordance with claim 16 further comprising connecting the plurality of optical video inputs and the plurality of optical video outputs in a linear topology.

26. A method in accordance with claim 16 further comprising configuring each optical video input to:
  receive an analog video input from an analog video source; and
  output to the processor an optical digital video signal.

27. A method in accordance with claim 16 further comprising configuring each optical video output to:
  receive from the processor an optical digital video signal; and output an analog video signal.

28. A method in accordance with claim 16 further comprising connecting the plurality of optical video inputs and the plurality of optical video outputs in a tree topology.

29. A method in accordance with claim 16 wherein each VNA comprises thirteen bits.

30. A method in accordance with claim 16, wherein said tracking the port comprises at least one of:
  generating a flag indicating that the port generates a request to receive a video signal; and
  removing the flag upon determining that the port does not generate a request to receive a video signal.

31. An optical system comprising:
  a plurality of cameras;
  a plurality of optical video inputs operationally coupled to said cameras;
  a processor operationally coupled to said optical video inputs;
  a plurality of optical video outputs coupled to said optical video inputs via said processor, said optical video outputs also coupled to a plurality of video monitors, said processor configured to:
    receive video data from at least two of said plurality of optical video inputs;
    packetize the received video data;
    route the packetized video data to at least two of said plurality of optical video outputs; and
    route, by using a video network address (VNA) lookup table, each packet of the packetized video data based upon a VNA contained in each packet of the packetized video data; and
  a mapper coupled to said processor and configured to track a port that outputs a request to receive a video signal, wherein said mapper configured to determine a spare capacity of a path between said mapper and the port by obtaining a value indicated within the request to receive the video signal.

32. A system in accordance with claim 31 further comprising a Field Programmable Logic Gate Array (FPGA) operationally coupled to said processor, said FPGA configured to detect a start of field (SOF) data pattern for the packetized video data.

33. A system in accordance with claim 32 wherein said FPGA comprises a pacer circuit configured to pace an output of the routed packetized video data.

34. A system in accordance with claim 33 wherein said pacer circuit configured to:
output the routed packetized video data at a first resolution when the packetized video data is interlaced; and
output the routed packetized video data at a second resolution when the packetized video data is non-interlaced.

35. A system in accordance with claim 33 wherein said pacer circuit configured to:
output the routed packetized video data at a first resolution when the packetized video data is interlaced; and
output the routed packetized video data at a second resolution when the packetized video data is non-interlaced, the second resolution approximately one-half the first resolution.

36. A system in accordance with claim 31 further comprising:
at least one optical audio input operationally coupled to said processor; and
at least one optical audio output operationally coupled to said processor, said processor further configured to packetize audio data received from said optical audio input in a packet of equal size to a packet size of said packetized video data.

37. A system in accordance with claim 36 wherein each said audio packet and each said video packet comprise between twenty bytes per packet and thirty bytes per packet.

38. A system in accordance with claim 37 wherein each said audio packet and each said video packet comprise approximately twenty-five bytes per packet.

39. A system in accordance with claim 37 wherein each said audio packet and each said video packet comprise twenty-five bytes per packet.

40. A system in accordance with claim 31 wherein said plurality of optical video inputs and said plurality of optical video outputs are connected in a linear topology.

41. A system in accordance with claim 31 wherein each said optical video input is configured to:
receive an analog video input from an analog video source; and
output to said processor an optical digital video signal.

42. A system in accordance with claim 31 wherein each optical video output is configured to:
receive from said processor an optical digital video signal; and
output an analog video signal.

43. A system in accordance with claim 31 wherein said plurality of optical video inputs and said plurality of optical video outputs are connected in a tree topology.

44. A system in accordance with claim 31 wherein each VNA comprises thirteen bits.

45. A optical multiplexer comprising:
a plurality of inputs;
a processor operationally coupled to said inputs; and
a plurality of optical outputs coupled to said inputs via said processor, said processor configured to:
receive data from at least two of said plurality of inputs;
packetize the received data;
route the packetized data to at least two of said plurality of optical outputs; and
determine whether a first one of a plurality of nodes of a network including said processor generates a broadcast configured to receive video signals from a second one of the nodes, wherein the second one of the nodes transmits the video signals in response to the broadcast; and
a mapper coupled to said processor and configured to determine a spare capacity of a path between said mapper and a port that outputs a request to receive a video signal, wherein said mapper configured to determine the spare capacity by obtaining a value indicated within the request to receive the video signal.

46. A multiplexer in accordance with claim 45 wherein said multiplexer is operating a synchronous optical network.

47. A multiplexer in accordance with claim 46 where said optical inputs operationally coupled to at least one of an analog source and a digital source.

48. A multiplexer in accordance with claim 46 wherein said optical inputs operationally coupled to at least one optical source.

49. A multiplexer in accordance with claim 46 wherein said inputs are configured to receive an analog input and convert the analog input to an optical signal and send the optical signal to said processor.

50. A multiplexer in accordance with claim 49 wherein said processor further configured to send the converted optical signal to said optical outputs which convert the optical signal to a non-optical signal.

51. A multiplexer in accordance with claim 45, said processor further configured to determine an amount of network bandwidth available to the nodes other than the first node based on said determining whether the first one of the nodes generates the broadcast.

* * * * *